US011594902B2

(12) United States Patent
Johnston et al.

(10) Patent No.: US 11,594,902 B2
(45) Date of Patent: Feb. 28, 2023

(54) CIRCUIT FOR MANAGING MULTI-BAND OPERATIONS OF A WIRELESS POWER TRANSMITTING DEVICE

(71) Applicant: Energous Corporation, San Jose, CA (US)

(72) Inventors: Cesar Johnston, Sunnyvale, CA (US); Brian Bosso, Santa Clara, CA (US)

(73) Assignee: Energous Corporation, San Jose, CA (US)

( * ) Notice: Subject to any disclaimer, the term of this patent is extended or adjusted under 35 U.S.C. 154(b) by 0 days.

(21) Appl. No.: 17/667,445

(22) Filed: Feb. 8, 2022

(65) Prior Publication Data

US 2022/0271567 A1 Aug. 25, 2022

Related U.S. Application Data

(63) Continuation of application No. 16/950,080, filed on Nov. 17, 2020, now Pat. No. 11,245,289, which is a (Continued)

(51) Int. Cl.

*H02J 7/00* (2006.01)
*H02J 50/20* (2016.01)

(Continued)

(52) U.S. Cl.

CPC ........... *H02J 7/0042* (2013.01); *H02J 7/025* (2013.01); *H02J 50/20* (2016.02); *H02J 50/23* (2016.02);

(Continued)

(58) Field of Classification Search

CPC ......... H02J 7/0042; H02J 50/20; H04W 4/80; Y02B 40/00

(Continued)

(56) References Cited

U.S. PATENT DOCUMENTS

| | | | |
|---|---|---|---|
| 787,412 | A | 4/1905 | Tesla |
| 2,811,624 | A | 10/1957 | Haagensen |

(Continued)

FOREIGN PATENT DOCUMENTS

| | | | |
|---|---|---|---|
| CN | 101496222 | A | 7/2009 |
| CN | 201278367 | Y | 7/2009 |

(Continued)

OTHER PUBLICATIONS

Energous Corp., IPRP, PCT/US2014/037072, Nov. 10, 2015, 6 pgs.

(Continued)

*Primary Examiner* — Suchin Parihar
(74) *Attorney, Agent, or Firm* — Morgan, Lewis & Bockius LLP

(57) ABSTRACT

Techniques are described for managing operations of a wireless-power-transmitting device, capable of operating in multiple radio-frequency (RF) bands. An example integrated circuit includes (i) an interface to couple with a power amplifier, (ii) an encryption block configured to authorize wireless-power-receiving devices, and (iii) a processing subsystem. The processing subsystem is configured to determine, using the encryption block, that multiple wireless-power-receiving devices are authorized to receive wirelessly-delivered power at multiple distinct frequencies. And after determining that the multiple wireless-power-receiving devices are authorized to receive wirelessly-delivered power, the processing subsystem provides multiple input signals, including signals having different respective frequencies, to the power amplifiers via the interface, to be amplified such that, when the amplified signals are sent to antennas, the antennas transmit RF signals to multiple receivers at multiple frequencies. The processing subsystem, interface, and encryption block are on a single integrated circuit.

51 Claims, 30 Drawing Sheets

Related U.S. Application Data continuation of application No. 16/513,607, filed on Jul. 16, 2019, now Pat. No. 10,840,743, which is a continuation of application No. 15/963,959, filed on Apr. 26, 2018, now Pat. No. 10,355,534, which is a continuation-in-part of application No. PCT/US2017/065886, filed on Dec. 12, 2017.

(51) Int. Cl.
*H04W 4/80* (2018.01)
*H02J 50/40* (2016.01)
*H02J 50/23* (2016.01)
*H02J 7/02* (2016.01)
*H04B 5/00* (2006.01)

(52) U.S. Cl.
CPC ............ *H02J 50/40* (2016.02); *H04B 5/0037* (2013.01); *H04W 4/80* (2018.02); *Y02B 40/00* (2013.01)

(58) Field of Classification Search
USPC .......................................................... 320/108
See application file for complete search history.

(56) References Cited

U.S. PATENT DOCUMENTS 2,863,148 A 12/1958 Gammon et al.
3,167,775 A 1/1965 Guertler
3,434,678 A 3/1969 Brown et al.
3,696,384 A 10/1972 Lester
3,754,269 A 8/1973 Gavin
4,101,895 A 7/1978 Jones, Jr.
4,360,741 A 11/1982 Fitzsimmons et al.
4,944,036 A 7/1990 Hyatt
4,995,010 A 2/1991 Knight
5,200,759 A 4/1993 McGinnis
5,211,471 A 5/1993 Rohrs
5,276,455 A 1/1994 Fitzsimmons et al.
5,548,292 A 8/1996 Hirshfield et al.
5,556,749 A 9/1996 Mitsuhashi et al.
5,568,088 A 10/1996 Dent et al.
5,631,572 A 5/1997 Sheen et al.
5,646,633 A 7/1997 Dahlberg
5,697,063 A 12/1997 Kishigami et al.
5,712,642 A 1/1998 Hulderman
5,936,527 A 8/1999 Isaacman et al.
5,982,139 A 11/1999 Parise
6,046,708 A 4/2000 MacDonald, Jr. et al.
6,061,025 A 5/2000 Jackson et al.
6,127,799 A 10/2000 Krishnan
6,127,942 A 10/2000 Welle
6,163,296 A 12/2000 Lier et al.
6,271,799 B1 8/2001 Rief
6,289,237 B1 9/2001 Mickle et al.
6,329,908 B1 12/2001 Frecska
6,400,586 B2 6/2002 Raddi et al.
6,421,235 B2 7/2002 Ditzik
6,437,685 B2 8/2002 Hanaki
6,456,253 B1 9/2002 Rummeli et al.
6,476,795 B1 11/2002 Derocher et al.
6,501,414 B2 12/2002 Amdt et al.
6,583,723 B2 6/2003 Watanabe et al.
6,597,897 B2 7/2003 Tang
6,615,074 B2 9/2003 Mickle et al.
6,650,376 B1 11/2003 Obitsu
6,664,920 B1 12/2003 Mott et al.
6,680,700 B2 1/2004 Hilgers
6,798,716 B1 9/2004 Charych
6,803,744 B1 10/2004 Sabo
6,853,197 B1 2/2005 McFarland
6,856,291 B2 2/2005 Mickle et al.
6,911,945 B2 6/2005 Korva
6,960,968 B2 11/2005 Odendaal et al.
6,967,462 B1 * 11/2005 Landis .................... H02J 50/80 320/109
6,988,026 B2 1/2006 Breed et al.
7,003,350 B2 2/2006 Denker et al.
7,027,311 B2 4/2006 Vanderelli et al.
7,068,234 B2 6/2006 Sievenpiper
7,068,991 B2 6/2006 Parise
7,079,079 B2 7/2006 Jo et al.
7,183,748 B1 2/2007 Unno et al.
7,191,013 B1 3/2007 Miranda et al.
7,193,644 B2 3/2007 Carter
7,196,663 B2 3/2007 Bolzer et al.
7,205,749 B2 4/2007 Hagen et al.
7,215,296 B2 5/2007 Abramov et al.
7,222,356 B1 5/2007 Yonezawa et al.
7,274,334 B2 9/2007 O'Riordan et al.
7,274,336 B2 9/2007 Carson
7,351,975 B2 4/2008 Brady et al.
7,359,730 B2 4/2008 Dennis et al.
7,372,408 B2 5/2008 Gaucher
7,392,068 B2 6/2008 Dayan
7,403,803 B2 7/2008 Mickle et al.
7,443,057 B2 10/2008 Nunally
7,451,839 B2 11/2008 Perlman
7,463,201 B2 12/2008 Chiang et al.
7,471,247 B2 12/2008 Saily
7,535,195 B1 5/2009 Horovitz et al.
7,614,556 B2 11/2009 Overhultz et al.
7,639,994 B2 12/2009 Greene et al.
7,643,312 B2 1/2010 Vanderelli et al.
7,652,577 B1 1/2010 Madhow et al.
7,679,576 B2 3/2010 Riedel et al.
7,702,771 B2 4/2010 Ewing et al.
7,786,419 B2 8/2010 Hyde et al.
7,812,771 B2 10/2010 Greene et al.
7,830,312 B2 11/2010 Choudhury et al.
7,844,306 B2 11/2010 Shearer et al.
7,868,482 B2 1/2011 Greene et al.
7,898,105 B2 3/2011 Greene et al.
7,904,117 B2 3/2011 Doan et al.
7,911,386 B1 3/2011 Ito et al.
7,925,308 B2 4/2011 Greene et al.
7,948,208 B2 5/2011 Partovi et al.
8,049,676 B2 11/2011 Yoon et al.
8,055,003 B2 11/2011 Mittleman et al.
8,070,595 B2 12/2011 Alderucci et al.
8,072,380 B2 12/2011 Crouch
8,092,301 B2 1/2012 Alderucci et al.
8,099,140 B2 1/2012 Arai
8,115,448 B2 2/2012 John
8,159,090 B2 4/2012 Greene et al.
8,159,364 B2 4/2012 Zeine
8,180,286 B2 5/2012 Yamasuge
8,184,454 B2 5/2012 Mao
8,228,194 B2 7/2012 Mickle
8,234,509 B2 7/2012 Gioscia et al.
8,264,101 B2 9/2012 Hyde et al.
8,264,291 B2 9/2012 Morita
8,276,325 B2 10/2012 Clifton et al.
8,278,784 B2 10/2012 Cook et al.
8,284,101 B2 10/2012 Fusco
8,310,201 B1 11/2012 Wright
8,338,991 B2 12/2012 Von Novak et al.
8,362,745 B2 1/2013 Tinaphong
8,380,255 B2 2/2013 Shearer et al.
8,384,600 B2 2/2013 Huang et al.
8,410,953 B2 4/2013 Zeine
8,411,963 B2 4/2013 Luff
8,432,062 B2 4/2013 Greene et al.
8,432,071 B2 4/2013 Huang et al.
8,446,248 B2 5/2013 Zeine
8,447,234 B2 5/2013 Cook et al.
8,451,189 B1 5/2013 Fluhler
8,452,235 B2 5/2013 Kirby et al.
8,457,656 B2 * 6/2013 Perkins ................ G01S 5/0257 455/456.1
8,461,817 B2 6/2013 Martin et al.
8,467,733 B2 6/2013 Leabman
8,497,601 B2 7/2013 Hall et al.

(56) References Cited

U.S. PATENT DOCUMENTS 8,497,658 B2 7/2013 Von Novak et al.
8,552,597 B2 8/2013 Song et al.
8,558,661 B2 10/2013 Zeine
8,560,026 B2 10/2013 Chanterac
8,564,485 B2 10/2013 Milosavljevic et al.
8,604,746 B2 12/2013 Lee
8,614,643 B2 12/2013 Leabman
8,621,245 B2 12/2013 Shearer et al.
8,626,249 B2 1/2014 Kuusilinna et al.
8,629,576 B2 1/2014 Levine
8,653,966 B2 2/2014 Rao et al.
8,655,272 B2 2/2014 Saunamäki
8,674,551 B2 3/2014 Low et al.
8,686,685 B2 4/2014 Moshfeghi
8,686,905 B2 4/2014 Shtrom
8,712,355 B2 4/2014 Black et al.
8,712,485 B2 4/2014 Tam
8,718,773 B2 5/2014 Wills et al.
8,729,737 B2 5/2014 Schatz et al.
8,736,228 B1 5/2014 Freed et al.
8,760,113 B2 6/2014 Keating
8,770,482 B2 7/2014 Ackermann et al.
8,772,960 B2 7/2014 Yoshida
8,823,319 B2 9/2014 Von Novak, III et al.
8,832,646 B1 9/2014 Wendling
8,854,176 B2 10/2014 Zeine
8,860,364 B2 10/2014 Low et al.
8,897,770 B1 11/2014 Frolov et al.
8,903,456 B2 12/2014 Chu et al.
8,917,057 B2 12/2014 Hui
8,923,189 B2 12/2014 Leabman
8,928,544 B2 1/2015 Massie et al.
8,937,408 B2 1/2015 Ganem et al.
8,946,940 B2 2/2015 Kim et al.
8,963,486 B2 2/2015 Kirby et al.
8,970,070 B2 3/2015 Sada et al.
8,989,053 B1 3/2015 Skaaksrud et al.
9,000,616 B2 4/2015 Greene et al.
9,001,622 B2 4/2015 Perry
9,006,934 B2 4/2015 Kozakai et al.
9,021,277 B2 4/2015 Shearer et al.
9,030,161 B2 5/2015 Lu et al.
9,059,598 B2 6/2015 Kang et al.
9,059,599 B2 * 6/2015 Won ........................ H02J 50/50
9,077,188 B2 7/2015 Moshfeghi
9,083,595 B2 7/2015 Rakib et al.
9,088,216 B2 7/2015 Garrity et al.
9,124,125 B2 * 9/2015 Leabman ................ H02J 50/70
9,130,397 B2 9/2015 Leabman et al.
9,130,602 B2 9/2015 Cook
9,142,998 B2 9/2015 Yu et al.
9,143,000 B2 9/2015 Leabman et al.
9,143,010 B2 9/2015 Urano
9,153,074 B2 10/2015 Zhou et al.
9,178,389 B2 11/2015 Hwang
9,225,196 B2 12/2015 Huang et al.
9,240,469 B2 1/2016 Sun et al.
9,242,411 B2 1/2016 Kritchman et al.
9,244,500 B2 1/2016 Cain et al.
9,252,628 B2 2/2016 Leabman et al.
9,270,344 B2 2/2016 Rosenberg
9,276,329 B2 3/2016 Jones et al.
9,282,582 B1 3/2016 Dunsbergen et al.
9,294,840 B1 3/2016 Anderson et al.
9,297,896 B1 3/2016 Andrews
9,318,898 B2 4/2016 John
9,368,020 B1 6/2016 Bell et al.
9,401,977 B1 7/2016 Gaw
9,409,490 B2 8/2016 Kawashima
9,419,335 B2 8/2016 Pintos
9,419,443 B2 8/2016 Leabman
9,438,045 B1 9/2016 Leabman
9,438,046 B1 9/2016 Leabman
9,444,283 B2 9/2016 Son et al.
9,450,449 B1 9/2016 Leabman et al.
9,461,502 B2 10/2016 Lee et al.
9,520,725 B2 12/2016 Masaoka et al.
9,520,748 B2 12/2016 Hyde et al.
9,522,270 B2 12/2016 Perryman et al.
9,532,748 B2 1/2017 Denison et al.
9,537,354 B2 1/2017 Bell et al.
9,537,357 B2 1/2017 Leabman
9,537,358 B2 1/2017 Leabman
9,538,382 B2 1/2017 Bell et al.
9,544,640 B2 1/2017 Lau
9,559,553 B2 1/2017 Bae
9,564,773 B2 2/2017 Pogorelik et al.
9,571,974 B2 2/2017 Choi et al.
9,590,317 B2 3/2017 Zimmerman et al.
9,590,444 B2 3/2017 Walley
9,620,996 B2 4/2017 Zeine
9,635,625 B2 4/2017 Russell et al.
9,647,328 B2 5/2017 Dobric
9,706,137 B2 7/2017 Scanlon et al.
9,711,999 B2 7/2017 Hietala et al.
9,723,635 B2 8/2017 Nambord et al.
9,793,758 B2 10/2017 Leabman
9,793,764 B2 10/2017 Perry
9,800,080 B2 10/2017 Leabman et al.
9,800,172 B1 10/2017 Leabman
9,806,564 B2 10/2017 Leabman
9,819,230 B2 11/2017 Petras et al.
9,824,815 B2 11/2017 Leabman et al.
9,825,674 B1 11/2017 Leabman
9,831,718 B2 11/2017 Leabman et al.
9,838,083 B2 12/2017 Bell et al.
9,843,213 B2 12/2017 Leabman et al.
9,843,229 B2 12/2017 Leabman
9,843,763 B2 12/2017 Leabman et al.
9,847,669 B2 12/2017 Leabman
9,847,677 B1 12/2017 Leabman
9,847,679 B2 12/2017 Bell et al.
9,853,361 B2 12/2017 Chen et al.
9,859,756 B2 1/2018 Leabman et al.
9,859,758 B1 1/2018 Leabman
9,859,797 B1 1/2018 Leabman
9,866,279 B2 1/2018 Bell et al.
9,867,032 B2 1/2018 Verma et al.
9,867,062 B1 1/2018 Bell et al.
9,871,301 B2 1/2018 Contopanagos
9,871,387 B1 1/2018 Bell et al.
9,876,379 B1 1/2018 Leabman et al.
9,876,380 B1 1/2018 Leabman et al.
9,876,394 B1 1/2018 Leabman
9,876,536 B1 1/2018 Bell et al.
9,876,648 B2 1/2018 Bell
9,882,394 B1 1/2018 Bell et al.
9,882,427 B2 1/2018 Leabman et al.
9,887,584 B1 2/2018 Bell et al.
9,887,739 B2 2/2018 Leabman et al.
9,891,669 B2 2/2018 Bell
9,893,554 B2 2/2018 Bell et al.
9,893,555 B1 2/2018 Leabman et al.
9,893,564 B2 2/2018 de Rochemont
9,899,744 B1 2/2018 Contopanagos et al.
9,899,844 B1 2/2018 Bell et al.
9,899,861 B1 2/2018 Leabman et al.
9,899,873 B2 2/2018 Bell et al.
9,906,065 B2 2/2018 Leabman et al.
9,906,275 B2 2/2018 Leabman
9,912,199 B2 3/2018 Leabman et al.
9,916,485 B1 3/2018 Lilly et al.
9,917,477 B1 3/2018 Bell et al.
9,923,386 B1 3/2018 Leabman et al.
9,939,864 B1 4/2018 Bell et al.
9,941,747 B2 4/2018 Bell et al.
9,941,754 B2 4/2018 Leabman et al.
9,948,135 B2 4/2018 Leabman et al.
9,965,009 B1 5/2018 Bell et al.
9,966,765 B1 5/2018 Leabman
9,966,784 B2 5/2018 Leabman
9,967,743 B1 5/2018 Bell et al.
9,973,008 B1 5/2018 Leabman
10,003,211 B1 6/2018 Leabman et al.

(56) References Cited

U.S. PATENT DOCUMENTS 10,008,889 B2 6/2018 Bell et al.
10,014,728 B1 7/2018 Leabman
10,027,159 B2 7/2018 Hosseini
10,038,337 B1 7/2018 Leabman et al.
10,050,462 B1 8/2018 Leabman et al.
10,056,782 B1 8/2018 Leabman
10,063,064 B1 8/2018 Bell et al.
10,063,105 B2 8/2018 Leabman
10,063,106 B2 8/2018 Bell et al.
10,068,703 B1 9/2018 Contopanagos
10,075,008 B1 9/2018 Bell et al.
10,079,515 B2 9/2018 Hosseini et al.
10,090,699 B1 10/2018 Leabman
10,090,886 B1 10/2018 Bell et al.
10,103,552 B1 10/2018 Leabman et al.
10,103,582 B2 10/2018 Leabman et al.
10,116,143 B1 10/2018 Leabman et al.
10,116,170 B1 10/2018 Leabman
10,122,219 B1 11/2018 Hosseini et al.
10,122,415 B2 11/2018 Bell et al.
10,124,754 B1 11/2018 Leabman
10,128,686 B1 11/2018 Leabman et al.
10,128,693 B2 11/2018 Bell et al.
10,128,695 B2 11/2018 Leabman et al.
10,128,699 B2 11/2018 Leabman
10,134,260 B1 11/2018 Bell et al.
10,135,112 B1 11/2018 Hosseini
10,135,286 B2 11/2018 Hosseini et al.
10,135,294 B1 11/2018 Leabman
10,135,295 B2 11/2018 Leabman
10,141,768 B2 11/2018 Leabman et al.
10,141,771 B1 11/2018 Hosseini et al.
10,141,791 B2 11/2018 Bell et al.
10,148,097 B1 12/2018 Leabman et al.
10,153,645 B1 12/2018 Bell et al.
10,153,653 B1 12/2018 Bell et al.
10,153,660 B1 12/2018 Leabman et al.
10,158,257 B2 12/2018 Leabman
10,158,259 B1 12/2018 Leabman
10,164,478 B2 12/2018 Leabman
10,170,917 B1 1/2019 Bell et al.
10,177,594 B2 1/2019 Contopanagos
10,181,756 B2 1/2019 Bae et al.
10,186,892 B2 1/2019 Hosseini et al.
10,186,893 B2 1/2019 Bell et al.
10,186,911 B2 1/2019 Leabman
10,186,913 B2 1/2019 Leabman et al.
10,193,396 B1 1/2019 Bell et al.
10,199,835 B2 2/2019 Bell
10,199,849 B1 2/2019 Bell
10,199,850 B2 2/2019 Leabman
10,205,239 B1 2/2019 Contopanagos et al.
10,206,185 B2 2/2019 Leabman et al.
10,211,674 B1 2/2019 Leabman et al.
10,211,680 B2 2/2019 Leabman et al.
10,211,682 B2 2/2019 Bell et al.
10,211,685 B2 2/2019 Bell et al.
10,218,207 B2 2/2019 Hosseini et al.
10,218,227 B2 2/2019 Leabman et al.
10,223,717 B1 3/2019 Bell
10,224,758 B2 3/2019 Leabman et al.
10,224,982 B1 3/2019 Leabman
10,230,266 B1 3/2019 Leabman et al.
10,243,414 B1 3/2019 Leabman et al.
10,256,657 B2 4/2019 Hosseini et al.
10,256,677 B2 4/2019 Hosseini et al.
10,263,432 B1 4/2019 Leabman et al.
10,263,476 B2 4/2019 Leabman
10,270,261 B2 4/2019 Bell et al.
10,277,054 B2 4/2019 Hosseini
10,291,055 B1 5/2019 Bell et al.
10,291,056 B2 5/2019 Bell et al.
10,291,066 B1 5/2019 Leabman
10,291,294 B2 5/2019 Leabman
10,298,024 B2 5/2019 Leabman
10,298,133 B2 5/2019 Leabman
10,305,315 B2 5/2019 Leabman et al.
10,312,715 B2 6/2019 Leabman
10,320,446 B2 6/2019 Hosseini
10,333,332 B1 6/2019 Hosseini
10,355,534 B2 7/2019 Johnston et al.
10,381,880 B2 8/2019 Leabman et al.
10,389,161 B2 8/2019 Hosseini et al.
10,396,588 B2 8/2019 Leabman
10,396,604 B2 8/2019 Bell et al.
10,439,442 B2 10/2019 Hosseini et al.
10,439,448 B2 10/2019 Bell et al.
10,447,093 B2 10/2019 Hosseini
10,476,312 B2 11/2019 Johnston et al.
10,483,768 B2 11/2019 Bell et al.
10,490,346 B2 11/2019 Contopanagos
10,491,029 B2 11/2019 Hosseini
10,498,144 B2 12/2019 Leabman et al.
10,511,097 B2 12/2019 Kornaros et al.
10,511,196 B2 12/2019 Hosseini
10,516,289 B2 12/2019 Leabman et al.
10,516,301 B2 12/2019 Leabman
10,523,033 B2 12/2019 Leabman
10,523,058 B2 12/2019 Leabman
10,615,647 B2 4/2020 Johnston et al.
10,680,319 B2 6/2020 Hosseini et al.
10,714,984 B2 7/2020 Hosseini et al.
10,734,717 B2 8/2020 Hosseini
10,778,041 B2 9/2020 Leabman
10,790,674 B2 9/2020 Bell et al.
10,840,743 B2 11/2020 Johnston et al.
10,848,853 B2 11/2020 Leabman et al.
10,879,740 B2 12/2020 Hosseini
10,923,954 B2 2/2021 Leabman
10,965,164 B2 3/2021 Leabman et al.
10,985,617 B1 4/2021 Johnston et al.
10,992,185 B2 4/2021 Leabman
10,992,187 B2 4/2021 Leabman
11,011,942 B2 5/2021 Liu
11,056,929 B2 7/2021 Bell et al.
11,114,885 B2 9/2021 Hosseini et al.
11,159,057 B2 10/2021 Kabiri et al.
11,233,425 B2 1/2022 Leabman
11,245,289 B2 2/2022 Johnston et al.
11,342,798 B2 5/2022 Johnston et al.
2001/0027876 A1 10/2001 Tsukamoto et al.
2002/0001307 A1 1/2002 Nguyen et al.
2002/0024471 A1 2/2002 Ishitobi
2002/0028655 A1 3/2002 Rosener et al.
2002/0034958 A1 3/2002 Oberschmidt et al.
2002/0054330 A1 5/2002 Jinbo et al.
2002/0065052 A1 5/2002 Pande et al.
2002/0072784 A1 6/2002 Sheppard et al.
2002/0095980 A1 7/2002 Breed et al.
2002/0103447 A1 8/2002 Terry
2002/0123776 A1 9/2002 Von Arx
2002/0133592 A1 9/2002 Matsuda
2002/0171594 A1 11/2002 Fang
2002/0172223 A1 11/2002 Stilp
2003/0005759 A1 1/2003 Breed et al.
2003/0038750 A1 2/2003 Chen
2003/0058187 A1 3/2003 Billiet et al.
2003/0076274 A1 4/2003 Phelan et al.
2003/0179152 A1 9/2003 Watada et al.
2003/0179573 A1 9/2003 Chun
2003/0192053 A1 10/2003 Sheppard et al.
2004/0019624 A1 1/2004 Sukegawa
2004/0020100 A1 2/2004 O'Brian et al.
2004/0036657 A1 2/2004 Forster et al.
2004/0066251 A1 4/2004 Eleftheriades et al.
2004/0107641 A1 6/2004 Walton et al.
2004/0113543 A1 6/2004 Daniels
2004/0119675 A1 6/2004 Washio et al.
2004/0130425 A1 7/2004 Dayan et al.
2004/0130442 A1 7/2004 Breed
2004/0142733 A1 7/2004 Parise
2004/0145342 A1 7/2004 Lyon
2004/0155832 A1 8/2004 Yuanzhu
2004/0196190 A1 10/2004 Mendolia et al.

(56) References Cited

U.S. PATENT DOCUMENTS

2004/0203979 A1 10/2004 Attar et al.
2004/0207559 A1 10/2004 Milosavljevic
2004/0218759 A1 11/2004 Yacobi
2004/0241402 A1 12/2004 Kawate
2004/0259604 A1 12/2004 Mickle et al.
2004/0263124 A1 12/2004 Wieck et al.
2005/0007276 A1 1/2005 Barrick et al.
2005/0030118 A1 2/2005 Wang
2005/0046584 A1 3/2005 Breed
2005/0055316 A1 3/2005 Williams
2005/0077872 A1 4/2005 Single
2005/0093766 A1 5/2005 Turner
2005/0116683 A1 6/2005 Cheng
2005/0117660 A1 6/2005 Vialle et al.
2005/0134517 A1 6/2005 Gottl
2005/0171411 A1 8/2005 KenKnight
2005/0198673 A1 9/2005 Kit et al.
2005/0227619 A1 10/2005 Lee et al.
2005/0232469 A1 10/2005 Schofield
2005/0237249 A1 10/2005 Nagel
2005/0237258 A1 10/2005 Abramov et al.
2005/0282591 A1 12/2005 Shaff
2006/0013335 A1 1/2006 Leabman
2006/0019712 A1 1/2006 Choi
2006/0030279 A1 2/2006 Leabman et al.
2006/0033674 A1 2/2006 Essig et al.
2006/0071308 A1 4/2006 Tang et al.
2006/0092079 A1 5/2006 de Rochemont
2006/0094425 A1 5/2006 Mickle et al.
2006/0113955 A1 6/2006 Nunally
2006/0119532 A1 6/2006 Yun et al.
2006/0136004 A1 6/2006 Cowan et al.
2006/0160517 A1 7/2006 Yoon
2006/0183473 A1 8/2006 Ukon
2006/0190063 A1 8/2006 Kanzius
2006/0192913 A1 8/2006 Shutou et al.
2006/0199620 A1 9/2006 Greene et al.
2006/0238365 A1 10/2006 Vecchione et al.
2006/0266564 A1 11/2006 Perlman et al.
2006/0266917 A1 11/2006 Baldis et al.
2006/0278706 A1 12/2006 Hatakayama et al.
2006/0284593 A1 12/2006 Nagy et al.
2006/0287094 A1 12/2006 Mahaffey et al.
2007/0007821 A1 1/2007 Rossetti
2007/0019693 A1 1/2007 Graham
2007/0021140 A1 1/2007 Keyes
2007/0060185 A1 3/2007 Simon et al.
2007/0070490 A1 3/2007 Tsunoda et al.
2007/0090997 A1 4/2007 Brown et al.
2007/0093269 A1 4/2007 Leabman et al.
2007/0097653 A1 5/2007 Gilliland et al.
2007/0103110 A1 5/2007 Sagoo
2007/0106894 A1 5/2007 Zhang
2007/0109121 A1 5/2007 Cohen
2007/0139000 A1 6/2007 Kozuma
2007/0149162 A1 6/2007 Greene et al.
2007/0149237 A1 6/2007 Russell et al.
2007/0164868 A1 7/2007 Deavours et al.
2007/0173196 A1 7/2007 Gallic
2007/0173214 A1 7/2007 Mickle et al.
2007/0178857 A1 8/2007 Greene et al.
2007/0178945 A1 8/2007 Cook et al.
2007/0182367 A1 8/2007 Partovi
2007/0191074 A1 8/2007 Harrist et al.
2007/0191075 A1 8/2007 Greene et al.
2007/0197281 A1 8/2007 Stronach
2007/0210960 A1 9/2007 Rofougaran et al.
2007/0222681 A1 9/2007 Greene et al.
2007/0228833 A1 10/2007 Stevens et al.
2007/0229261 A1 10/2007 Zimmerman et al.
2007/0240297 A1 10/2007 Yang et al.
2007/0257634 A1 11/2007 Leschin et al.
2007/0273486 A1 11/2007 Shiotsu
2007/0291165 A1 12/2007 Wang
2007/0296639 A1 12/2007 Hook et al.
2007/0298846 A1 12/2007 Greene et al.
2008/0014897 A1 1/2008 Cook et al.
2008/0024376 A1 1/2008 Norris et al.
2008/0048917 A1 2/2008 Achour et al.
2008/0062062 A1 3/2008 Borau et al.
2008/0062255 A1 3/2008 Gal
2008/0067874 A1 3/2008 Tseng
2008/0074324 A1 3/2008 Puzella et al.
2008/0089277 A1 4/2008 Alexander et al.
2008/0110263 A1 5/2008 Klessel et al.
2008/0113816 A1 5/2008 Mahaffey et al.
2008/0122297 A1 5/2008 Arai
2008/0123383 A1 5/2008 Shionoiri
2008/0129536 A1 6/2008 Randall et al.
2008/0140278 A1 6/2008 Breed
2008/0169910 A1 7/2008 Greene et al.
2008/0197802 A1 8/2008 Onishi
2008/0204342 A1 8/2008 Kharadly
2008/0204350 A1 8/2008 Tam et al.
2008/0210762 A1 9/2008 Osada et al.
2008/0211458 A1 9/2008 Lawther et al.
2008/0233890 A1 9/2008 Baker
2008/0248758 A1 10/2008 Schedelbeck et al.
2008/0248846 A1 10/2008 Stronach et al.
2008/0258993 A1 10/2008 Gummalla et al.
2008/0266191 A1 10/2008 Hilgers
2008/0278378 A1 11/2008 Chang et al.
2008/0309452 A1 12/2008 Zeine
2009/0002493 A1 1/2009 Kates
2009/0010316 A1 1/2009 Rofougaran et al.
2009/0019183 A1 1/2009 Wu et al.
2009/0036065 A1 2/2009 Siu
2009/0039828 A1 2/2009 Jakubowski
2009/0047998 A1 2/2009 Alberth, Jr.
2009/0058354 A1 3/2009 Harrison
2009/0058361 A1 3/2009 John
2009/0058731 A1 3/2009 Geary et al.
2009/0060012 A1 3/2009 Gresset et al.
2009/0067198 A1 3/2009 Graham et al.
2009/0067208 A1 3/2009 Martin et al.
2009/0073066 A1 3/2009 Jordon et al.
2009/0096412 A1 4/2009 Huang
2009/0096413 A1 4/2009 Partovi
2009/0102292 A1 4/2009 Cook et al.
2009/0102296 A1 4/2009 Greene et al.
2009/0108679 A1 4/2009 Porwal
2009/0122847 A1 5/2009 Nysen et al.
2009/0128262 A1 5/2009 Lee et al.
2009/0152954 A1* 6/2009 Le .......................... H02J 50/12 307/110
2009/0157911 A1 6/2009 Aihara
2009/0174604 A1 7/2009 Keskitalo
2009/0180653 A1 7/2009 Sjursen et al.
2009/0200985 A1 8/2009 Zane et al.
2009/0206791 A1 8/2009 Jung
2009/0207090 A1 8/2009 Pettus et al.
2009/0207092 A1 8/2009 Nysen et al.
2009/0218884 A1 9/2009 Soar
2009/0218891 A1 9/2009 McCollough
2009/0219903 A1 9/2009 Alamouti et al.
2009/0243397 A1 10/2009 Cook et al.
2009/0256752 A1 10/2009 Akkermans et al.
2009/0264069 A1 10/2009 Yamasuge
2009/0271048 A1 10/2009 Wakamatsu
2009/0280866 A1 11/2009 Lo et al.
2009/0281678 A1 11/2009 Wakamatsu
2009/0284082 A1 11/2009 Mohammadian
2009/0284083 A1 11/2009 Karalis et al.
2009/0284220 A1 11/2009 Toncich et al.
2009/0284227 A1 11/2009 Mohammadian et al.
2009/0284325 A1 11/2009 Rossiter et al.
2009/0286475 A1 11/2009 Toncich et al.
2009/0286476 A1 11/2009 Toncich et al.
2009/0291634 A1 11/2009 Saarisalo
2009/0299175 A1 12/2009 Bernstein et al.
2009/0308936 A1 12/2009 Nitzan et al.
2009/0312046 A1 12/2009 Clevenger et al.
2009/0315412 A1 12/2009 Yamamoto et al.
2009/0322281 A1 12/2009 Kamijo et al.

(56) References Cited

U.S. PATENT DOCUMENTS

2010/0001683 A1 1/2010 Huang et al.
2010/0007307 A1 1/2010 Baarman et al.
2010/0007569 A1 1/2010 Sim et al.
2010/0019686 A1 1/2010 Gutierrez, Jr.
2010/0019908 A1 1/2010 Cho et al.
2010/0026605 A1 2/2010 Yang et al.
2010/0027379 A1 2/2010 Saulnier et al.
2010/0029383 A1 2/2010 Dai
2010/0033021 A1 2/2010 Bennett
2010/0033390 A1 2/2010 Alamouti et al.
2010/0034238 A1 2/2010 Bennett
2010/0041453 A1 2/2010 Grimm, Jr.
2010/0044123 A1 2/2010 Perlman et al.
2010/0054200 A1 3/2010 Tsai
2010/0060534 A1 3/2010 Oodachi
2010/0066631 A1 3/2010 Puzella et al.
2010/0075607 A1 3/2010 Hosoya
2010/0079005 A1 4/2010 Hyde et al.
2010/0079011 A1 4/2010 Hyde et al.
2010/0082193 A1 4/2010 Chiappetta
2010/0087227 A1 4/2010 Francos et al.
2010/0090524 A1 4/2010 Obayashi
2010/0090656 A1 4/2010 Shearer et al.
2010/0109443 A1 5/2010 Cook et al.
2010/0117596 A1 5/2010 Cook et al.
2010/0117926 A1 5/2010 DeJean, II
2010/0119234 A1 5/2010 Suematsu et al.
2010/0123618 A1 5/2010 Martin et al.
2010/0123624 A1 5/2010 Minear et al.
2010/0124040 A1 5/2010 Diebel et al.
2010/0127660 A1 5/2010 Cook et al.
2010/0142418 A1 6/2010 Nishioka et al.
2010/0142509 A1 6/2010 Zhu et al.
2010/0148723 A1 6/2010 Cook et al.
2010/0151808 A1 6/2010 Toncich et al.
2010/0156721 A1 6/2010 Alamouti et al.
2010/0156741 A1 6/2010 Vazquez et al.
2010/0164296 A1 7/2010 Kurs et al.
2010/0164433 A1 7/2010 Janefalker et al.
2010/0167664 A1 7/2010 Szini
2010/0171461 A1 7/2010 Baarman et al.
2010/0171676 A1 7/2010 Tani et al.
2010/0174629 A1 7/2010 Taylor et al.
2010/0176934 A1 7/2010 Chou et al.
2010/0181961 A1 7/2010 Novak et al.
2010/0181964 A1 7/2010 Huggins et al.
2010/0194206 A1 8/2010 Burdo et al.
2010/0201189 A1 8/2010 Kirby et al.
2010/0201201 A1 8/2010 Mobarhan et al.
2010/0201314 A1 8/2010 Toncich et al.
2010/0207572 A1 8/2010 Kirby et al.
2010/0210233 A1 8/2010 Cook et al.
2010/0213895 A1 8/2010 Keating et al.
2010/0214177 A1 8/2010 Parsche
2010/0222010 A1 9/2010 Ozaki et al.
2010/0225270 A1 9/2010 Jacobs et al.
2010/0227570 A1 9/2010 Hendin
2010/0231470 A1 9/2010 Lee et al.
2010/0237709 A1 9/2010 Hall et al.
2010/0244576 A1 9/2010 Hillan et al.
2010/0253281 A1 10/2010 Li
2010/0256831 A1 10/2010 Abramo et al.
2010/0259110 A1 10/2010 Kurs et al.
2010/0259447 A1 10/2010 Crouch
2010/0264747 A1 10/2010 Hall et al.
2010/0277003 A1 11/2010 Von Novak et al.
2010/0277121 A1 11/2010 Hall et al.
2010/0279606 A1 11/2010 Hillan et al.
2010/0289341 A1 11/2010 Ozaki et al.
2010/0295372 A1 11/2010 Hyde et al.
2010/0308767 A1 12/2010 Rofougaran et al.
2010/0309079 A1 12/2010 Rofougaran et al.
2010/0309088 A1 12/2010 Hyvonen et al.
2010/0315045 A1 12/2010 Zeine
2010/0316163 A1 12/2010 Forenza et al.
2010/0327766 A1 12/2010 Recker et al.
2010/0328044 A1 12/2010 Waffenschmidt et al.
2010/0332401 A1 12/2010 Prahlad et al.
2011/0009057 A1 1/2011 Saunamäki
2011/0013198 A1 1/2011 Shirley
2011/0018360 A1 1/2011 Baarman et al.
2011/0028114 A1 2/2011 Kerselaers
2011/0031928 A1 2/2011 Soar
2011/0032149 A1 2/2011 Leabman
2011/0032866 A1 2/2011 Leabman
2011/0034190 A1 2/2011 Leabman
2011/0034191 A1 2/2011 Leabman
2011/0043047 A1 2/2011 Karalis et al.
2011/0043163 A1 2/2011 Baarman et al.
2011/0043327 A1 2/2011 Baarman et al.
2011/0050166 A1 3/2011 Cook et al.
2011/0055037 A1 3/2011 Hayashigawa et al.
2011/0056215 A1 3/2011 Ham
2011/0057607 A1 3/2011 Carobolante
2011/0057853 A1 3/2011 Kim et al.
2011/0062788 A1 3/2011 Chen et al.
2011/0074342 A1 3/2011 MacLaughlin
2011/0074349 A1 3/2011 Ghovanloo
2011/0074620 A1 3/2011 Wintermantel
2011/0078092 A1 3/2011 Kim et al.
2011/0090126 A1 4/2011 Szini et al.
2011/0109167 A1 5/2011 Park et al.
2011/0114401 A1 5/2011 Kanno
2011/0115303 A1 5/2011 Baarman et al.
2011/0115432 A1 5/2011 El-Maleh
2011/0115605 A1 5/2011 Dimig et al.
2011/0121660 A1 5/2011 Azancot et al.
2011/0122018 A1 5/2011 Tarng et al.
2011/0122026 A1 5/2011 DeLaquil et al.
2011/0127845 A1 6/2011 Walley et al.
2011/0127952 A1 6/2011 Walley et al.
2011/0133655 A1 6/2011 Recker et al.
2011/0133691 A1 6/2011 Hautanen
2011/0148578 A1 6/2011 Aioi et al.
2011/0148595 A1 6/2011 Miller et al.
2011/0151789 A1 6/2011 Viglione et al.
2011/0154429 A1 6/2011 Stantchev
2011/0156493 A1 6/2011 Bennett
2011/0156494 A1 6/2011 Mashinsky
2011/0156640 A1 6/2011 Moshfeghi
2011/0163128 A1 7/2011 Taguchi et al.
2011/0175455 A1 7/2011 Hashiguchi
2011/0175461 A1 7/2011 Tinaphong
2011/0181120 A1 7/2011 Liu et al.
2011/0182245 A1 7/2011 Malkamaki et al.
2011/0184842 A1 7/2011 Melen
2011/0188207 A1 8/2011 Won et al.
2011/0193688 A1 8/2011 Forsell
2011/0194543 A1 8/2011 Zhao et al.
2011/0195722 A1 8/2011 Walter et al.
2011/0199046 A1 8/2011 Tsai et al.
2011/0215086 A1 9/2011 Yeh
2011/0217923 A1 9/2011 Ma
2011/0220634 A1 9/2011 Yeh
2011/0221389 A1 9/2011 Won et al.
2011/0222272 A1 9/2011 Yeh
2011/0227725 A1 9/2011 Muirhead
2011/0243040 A1 10/2011 Khan et al.
2011/0243050 A1 10/2011 Yanover
2011/0244913 A1 10/2011 Kim et al.
2011/0248573 A1 10/2011 Kanno et al.
2011/0248575 A1 10/2011 Kim et al.
2011/0249678 A1 10/2011 Bonicatto
2011/0254377 A1 10/2011 Widmer et al.
2011/0254503 A1 10/2011 Widmer et al.
2011/0259953 A1 10/2011 Baarman et al.
2011/0273977 A1 11/2011 Shapira et al.
2011/0278941 A1 11/2011 Krishna et al.
2011/0279226 A1 11/2011 Chen et al.
2011/0281535 A1 11/2011 Low et al.
2011/0282415 A1 11/2011 Eckhoff et al.
2011/0285213 A1 11/2011 Kowalewski
2011/0286374 A1 11/2011 Shin et al.
2011/0291489 A1 12/2011 Tsai et al.

(56) References Cited

U.S. PATENT DOCUMENTS

2011/0302078 A1 12/2011 Failing
2011/0304216 A1 12/2011 Baarman
2011/0304437 A1 12/2011 Beeler
2011/0304521 A1 12/2011 Ando et al.
2012/0007441 A1 1/2012 John
2012/0013196 A1 1/2012 Kim et al.
2012/0013198 A1 1/2012 Uramoto et al.
2012/0013296 A1 1/2012 Heydari et al.
2012/0019419 A1 1/2012 Prat et al.
2012/0025622 A1 2/2012 Kim et al.
2012/0043887 A1 2/2012 Mesibov
2012/0051109 A1 3/2012 Kim et al.
2012/0051294 A1 3/2012 Guillouard
2012/0056486 A1 3/2012 Endo et al.
2012/0056741 A1 3/2012 Zhu et al.
2012/0068906 A1 3/2012 Asher et al.
2012/0074891 A1 3/2012 Anderson et al.
2012/0075072 A1 3/2012 Pappu
2012/0080944 A1 4/2012 Recker et al.
2012/0080957 A1 4/2012 Cooper et al.
2012/0086284 A1 4/2012 Capanella et al.
2012/0086615 A1 4/2012 Norair
2012/0095617 A1 4/2012 Martin et al.
2012/0098350 A1 4/2012 Campanella et al.
2012/0098485 A1 4/2012 Kang et al.
2012/0099675 A1 4/2012 Kitamura et al.
2012/0103562 A1 5/2012 Clayton
2012/0104849 A1 5/2012 Jackson
2012/0105252 A1 5/2012 Wang
2012/0112532 A1 5/2012 Kesler et al.
2012/0119914 A1 5/2012 Uchida
2012/0126743 A1 5/2012 Rivers, Jr.
2012/0132647 A1 5/2012 Beverly et al.
2012/0133214 A1 5/2012 Yun et al.
2012/0142291 A1 6/2012 Rath et al.
2012/0146426 A1 6/2012 Sabo
2012/0146576 A1 6/2012 Partovi
2012/0146577 A1 6/2012 Tanabe
2012/0147802 A1 6/2012 Ukita et al.
2012/0149307 A1 6/2012 Terada et al.
2012/0150670 A1 6/2012 Taylor et al.
2012/0153894 A1 6/2012 Widmer et al.
2012/0157019 A1 6/2012 Li
2012/0161531 A1 6/2012 Kim et al.
2012/0161544 A1 6/2012 Kashiwagi et al.
2012/0169276 A1 7/2012 Wang
2012/0169278 A1 7/2012 Choi
2012/0173418 A1 7/2012 Beardsmore et al.
2012/0179004 A1 7/2012 Roesicke et al.
2012/0181973 A1 7/2012 Lyden
2012/0182427 A1 7/2012 Marshall
2012/0188142 A1 7/2012 Shashi et al.
2012/0187851 A1 8/2012 Huggins et al.
2012/0193999 A1 8/2012 Zeine
2012/0200399 A1 8/2012 Chae
2012/0201153 A1 8/2012 Bharadia et al.
2012/0201173 A1 8/2012 Jian et al.
2012/0206299 A1 8/2012 Valdes-Garcia
2012/0211214 A1 8/2012 Phan
2012/0212071 A1 8/2012 Miyabayashi et al.
2012/0212072 A1 8/2012 Miyabayashi et al.
2012/0214462 A1 8/2012 Chu et al.
2012/0214536 A1 8/2012 Kim et al.
2012/0228392 A1 9/2012 Cameron et al.
2012/0228956 A1 9/2012 Kamata
2012/0231856 A1 9/2012 Lee et al.
2012/0235636 A1 9/2012 Partovi
2012/0242283 A1 9/2012 Kim et al.
2012/0248886 A1 10/2012 Kesler et al.
2012/0248888 A1 10/2012 Kesler et al.
2012/0248891 A1 10/2012 Drennen
2012/0249051 A1 10/2012 Son et al.
2012/0262002 A1 10/2012 Widmer et al.
2012/0265272 A1 10/2012 Judkins
2012/0267900 A1 10/2012 Huffman et al.
2012/0268238 A1 10/2012 Park et al.
2012/0274154 A1 11/2012 DeLuca
2012/0280650 A1 11/2012 Kim et al.
2012/0286582 A1 11/2012 Kim et al.
2012/0292993 A1 11/2012 Mettler et al.
2012/0293021 A1 11/2012 Teggatz et al.
2012/0293119 A1 11/2012 Park et al.
2012/0299389 A1 11/2012 Lee et al.
2012/0299540 A1 11/2012 Perry
2012/0299541 A1 11/2012 Perry
2012/0299542 A1 11/2012 Perry
2012/0300588 A1 11/2012 Perry
2012/0300592 A1 11/2012 Perry
2012/0300593 A1 11/2012 Perry
2012/0306284 A1 12/2012 Lee et al.
2012/0306433 A1 12/2012 Kim et al.
2012/0306572 A1 12/2012 Hietala et al.
2012/0306705 A1 12/2012 Sakurai et al.
2012/0306707 A1 12/2012 Yang et al.
2012/0306720 A1 12/2012 Tanmi et al.
2012/0307873 A1 12/2012 Kim et al.
2012/0309295 A1 12/2012 Maguire
2012/0309308 A1 12/2012 Kim et al.
2012/0309332 A1 12/2012 Liao
2012/0313446 A1 12/2012 Park et al.
2012/0313449 A1 12/2012 Kurs
2012/0313835 A1 12/2012 Gebretnsae
2012/0326660 A1* 12/2012 Lu .......................... H02J 50/20
320/108
2013/0002550 A1 1/2013 Zalewski
2013/0018439 A1 1/2013 Chow et al.
2013/0024059 A1 1/2013 Miller et al.
2013/0026981 A1 1/2013 Van Der Lee
2013/0026982 A1 1/2013 Rothenbaum
2013/0032589 A1 2/2013 Chung
2013/0033571 A1 2/2013 Steen
2013/0038124 A1 2/2013 Newdoll et al.
2013/0038136 A1 2/2013 Wheatley et al.
2013/0038402 A1 2/2013 Karalis et al.
2013/0043738 A1 2/2013 Park et al.
2013/0044035 A1 2/2013 Zhuang
2013/0049471 A1 2/2013 Oleynik
2013/0049475 A1 2/2013 Kim et al.
2013/0049484 A1 2/2013 Weissentem et al.
2013/0057078 A1 3/2013 Lee
2013/0057205 A1 3/2013 Lee et al.
2013/0057210 A1 3/2013 Negaard et al.
2013/0057364 A1 3/2013 Kesler et al.
2013/0058379 A1 3/2013 Kim et al.
2013/0062959 A1 3/2013 Lee et al.
2013/0063082 A1 3/2013 Lee et al.
2013/0063143 A1 3/2013 Adalsteinsson et al.
2013/0063266 A1 3/2013 Yunker et al.
2013/0069444 A1 3/2013 Waffenschmidt et al.
2013/0076308 A1 3/2013 Niskala et al.
2013/0077650 A1 3/2013 Traxler et al.
2013/0078918 A1 3/2013 Crowley et al.
2013/0082651 A1 4/2013 Park et al.
2013/0082653 A1 4/2013 Lee et al.
2013/0083774 A1 4/2013 Son et al.
2013/0088082 A1 4/2013 Kang et al.
2013/0088090 A1 4/2013 Wu
2013/0088192 A1 4/2013 Eaton
2013/0088331 A1 4/2013 Cho
2013/0093388 A1 4/2013 Partovi
2013/0099389 A1 4/2013 Hong et al.
2013/0099586 A1 4/2013 Kato
2013/0106197 A1 5/2013 Bae et al.
2013/0107023 A1 5/2013 Tanaka et al.
2013/0119777 A1 5/2013 Rees
2013/0119778 A1 5/2013 Jung
2013/0119929 A1 5/2013 Partovi
2013/0120052 A1 5/2013 Siska
2013/0120205 A1 5/2013 Thomson et al.
2013/0120206 A1 5/2013 Biancotto et al.
2013/0120217 A1 5/2013 Ueda et al.
2013/0130621 A1 5/2013 Kim et al.
2013/0132010 A1 5/2013 Winger et al.
2013/0134923 A1 5/2013 Smith

(56) References Cited

U.S. PATENT DOCUMENTS

2013/0137455 A1 5/2013 Xia
2013/0141037 A1 6/2013 Jenwatanavet et al.
2013/0148341 A1 6/2013 Williams
2013/0149975 A1 6/2013 Yu et al.
2013/0154387 A1 6/2013 Lee et al.
2013/0155748 A1 6/2013 Sundstrom
2013/0157729 A1 6/2013 Tabe
2013/0162335 A1 6/2013 Kim et al.
2013/0169061 A1 7/2013 Microshnichenko et al.
2013/0169219 A1 7/2013 Gray
2013/0169348 A1 7/2013 Shi
2013/0171939 A1 7/2013 Tian et al.
2013/0175877 A1 7/2013 Abe et al.
2013/0178253 A1 7/2013 Karaoguz
2013/0181881 A1 7/2013 Christie et al.
2013/0187475 A1 7/2013 Vendik
2013/0190031 A1 7/2013 Persson et al.
2013/0193769 A1 8/2013 Mehta et al.
2013/0197320 A1 8/2013 Albert et al.
2013/0200064 A1 8/2013 Alexander
2013/0207477 A1 8/2013 Nam et al.
2013/0207604 A1 8/2013 Zeine
2013/0207879 A1 8/2013 Rada et al.
2013/0210357 A1 8/2013 Qin et al.
2013/0221757 A1 8/2013 Cho et al.
2013/0222201 A1 8/2013 Ma et al.
2013/0234530 A1 9/2013 Miyauchi
2013/0234536 A1 9/2013 Chemishkian et al.
2013/0234658 A1 9/2013 Endo et al.
2013/0241306 A1 9/2013 Aber et al.
2013/0241468 A1 9/2013 Moshfeghi
2013/0241474 A1 9/2013 Moshfeghi
2013/0249478 A1 9/2013 Hirano
2013/0249479 A1 9/2013 Partovi
2013/0250102 A1 9/2013 Scanlon et al.
2013/0254578 A1 9/2013 Huang et al.
2013/0264997 A1 10/2013 Lee et al.
2013/0268782 A1 10/2013 Tam et al.
2013/0270923 A1 10/2013 Cook et al.
2013/0278076 A1 10/2013 Proud
2013/0278209 A1 10/2013 Von Novak
2013/0285464 A1 10/2013 Miwa
2013/0285477 A1 10/2013 Lo et al.
2013/0285606 A1 10/2013 Ben-Shalom et al.
2013/0288600 A1 10/2013 Kuusilinna et al.
2013/0288617 A1 10/2013 Kim et al.
2013/0293423 A1 11/2013 Moshfeghi
2013/0307751 A1 11/2013 Yu-Juin et al.
2013/0310020 A1 11/2013 Kazuhiro
2013/0311798 A1 11/2013 Sultenfuss
2013/0328417 A1 12/2013 Takeuchi
2013/0334883 A1 12/2013 Kim et al.
2013/0339108 A1 12/2013 Ryder et al.
2013/0343208 A1 12/2013 Sexton et al.
2013/0343251 A1 12/2013 Zhang
2014/0001608 A1 1/2014 McPartlin
2014/0001846 A1 1/2014 Mosebrook
2014/0001875 A1 1/2014 Nahidipour
2014/0001876 A1 1/2014 Fujiwara et al.
2014/0006017 A1 1/2014 Sen
2014/0008993 A1 1/2014 Leabman
2014/0009110 A1 1/2014 Lee
2014/0011531 A1 1/2014 Burstrom et al.
2014/0015336 A1 1/2014 Weber et al.
2014/0015344 A1 1/2014 Mohamadi
2014/0021907 A1 1/2014 Yu et al.
2014/0021908 A1 1/2014 McCool
2014/0024325 A1 1/2014 Iun et al.
2014/0035524 A1 2/2014 Zeine
2014/0035526 A1 2/2014 Tripathi et al.
2014/0035786 A1 2/2014 Ley
2014/0043248 A1 2/2014 Yeh
2014/0049422 A1 2/2014 Von Novak et al.
2014/0054971 A1 2/2014 Kissin
2014/0055098 A1* 2/2014 Lee ........................ H02J 50/12 320/137
2014/0057618 A1 2/2014 Zirwas et al.
2014/0062395 A1 3/2014 Kwon et al.
2014/0082435 A1 3/2014 Kitgawa
2014/0086125 A1 3/2014 Polo et al.
2014/0086592 A1 3/2014 Nakahara et al.
2014/0091756 A1 4/2014 Ofstein et al.
2014/0091968 A1 4/2014 Harel et al.
2014/0091974 A1 4/2014 Desclos et al.
2014/0103869 A1 4/2014 Radovic
2014/0104157 A1 4/2014 Burns
2014/0111147 A1 4/2014 Soar
2014/0113689 A1 4/2014 Lee
2014/0117946 A1 5/2014 Muller et al.
2014/0118140 A1 5/2014 Amis
2014/0128107 A1 5/2014 An
2014/0132210 A1 5/2014 Partovi
2014/0133279 A1 5/2014 Khuri-Yakub
2014/0139034 A1 5/2014 Sankar et al.
2014/0139039 A1 5/2014 Cook et al.
2014/0139180 A1 5/2014 Kim et al.
2014/0141838 A1 5/2014 Cai et al.
2014/0142876 A1 5/2014 John et al.
2014/0143933 A1 5/2014 Low et al.
2014/0145879 A1 5/2014 Pan
2014/0145884 A1 5/2014 Dang et al.
2014/0152117 A1 6/2014 Sanker
2014/0159646 A1 6/2014 Sankar et al.
2014/0159651 A1* 6/2014 Von Novak .......... H04B 5/0037 320/108
2014/0159652 A1 6/2014 Hall et al.
2014/0159662 A1 6/2014 Furui
2014/0159667 A1 6/2014 Kim et al.
2014/0169385 A1 6/2014 Hadani et al.
2014/0175893 A1 6/2014 Sengupta et al.
2014/0176054 A1 6/2014 Porat et al.
2014/0176061 A1 6/2014 Cheatham, III et al.
2014/0176082 A1 6/2014 Visser
2014/0177399 A1 6/2014 Teng et al.
2014/0183964 A1 7/2014 Walley
2014/0184148 A1 7/2014 Van Der Lee et al.
2014/0184155 A1 7/2014 Cha
2014/0184163 A1 7/2014 Das et al.
2014/0184170 A1 7/2014 Jeong
2014/0191568 A1 7/2014 Partovi
2014/0191818 A1 7/2014 Waffenschmidt et al.
2014/0194092 A1 7/2014 Wanstedt et al.
2014/0194095 A1 7/2014 Wanstedt et al.
2014/0197691 A1 7/2014 Wang
2014/0203629 A1 7/2014 Hoffman et al.
2014/0206384 A1 7/2014 Kim et al.
2014/0210281 A1 7/2014 Ito et al.
2014/0217955 A1 8/2014 Lin
2014/0217967 A1 8/2014 Zeine et al.
2014/0225805 A1 8/2014 Pan et al.
2014/0232320 A1 8/2014 Ento July et al.
2014/0232610 A1 8/2014 Shigemoto et al.
2014/0239733 A1 8/2014 Mach et al.
2014/0241231 A1 8/2014 Zeine
2014/0245036 A1 8/2014 Oishi
2014/0246416 A1 9/2014 White
2014/0247152 A1 9/2014 Proud
2014/0252813 A1 9/2014 Lee et al.
2014/0252866 A1 9/2014 Walsh et al.
2014/0265725 A1 9/2014 Angle et al.
2014/0265727 A1 9/2014 Berte
2014/0265943 A1 9/2014 Angle et al.
2014/0266025 A1 9/2014 Jakubowski
2014/0266946 A1 9/2014 Bily et al.
2014/0273819 A1 9/2014 Nadakuduti et al.
2014/0273892 A1 9/2014 Nourbakhsh
2014/0281655 A1 9/2014 Angle et al.
2014/0292090 A1* 10/2014 Cordeiro ................ H02J 50/40 307/104
2014/0292451 A1 10/2014 Zimmerman
2014/0300452 A1 10/2014 Rofe et al.
2014/0312706 A1 10/2014 Fiorello et al.
2014/0325218 A1 10/2014 Shimizu et al.

(56) References Cited

U.S. PATENT DOCUMENTS

2014/0327320 A1 11/2014 Muhs et al.
2014/0327390 A1 11/2014 Park et al.
2014/0333142 A1 11/2014 Desrosiers
2014/0346860 A1 11/2014 Aubry et al.
2014/0354063 A1 12/2014 Leabman et al.
2014/0354221 A1 12/2014 Leabman et al.
2014/0355718 A1 12/2014 Guan et al.
2014/0368048 A1 12/2014 Leabman et al.
2014/0368161 A1 12/2014 Leabman et al.
2014/0368405 A1 12/2014 Ek et al.
2014/0375139 A1 12/2014 Tsukamoto
2014/0375253 A1 12/2014 Leabman et al.
2014/0375258 A1 12/2014 Arkhipenkov
2014/0375261 A1 12/2014 Manova-Elssibony et al.
2015/0001949 A1 1/2015 Leabman et al.
2015/0002086 A1 1/2015 Matos et al.
2015/0003207 A1 1/2015 Lee et al.
2015/0008980 A1 1/2015 Kim et al.
2015/0011160 A1 1/2015 Uurgovan et al.
2015/0015180 A1 1/2015 Miller et al.
2015/0015182 A1 1/2015 Brandtman et al.
2015/0015192 A1 1/2015 Leabman et al.
2015/0021990 A1 1/2015 Myer et al.
2015/0022008 A1 1/2015 Leabman et al.
2015/0022009 A1 1/2015 Leabman et al.
2015/0022010 A1 1/2015 Leabman et al.
2015/0022194 A1 1/2015 Almalki et al.
2015/0023204 A1 1/2015 Wil et al.
2015/0028688 A1 1/2015 Masaoka
2015/0028694 A1 1/2015 Leabman et al.
2015/0028697 A1 1/2015 Leabman et al.
2015/0028875 A1 1/2015 Irie et al.
2015/0035378 A1 2/2015 Calhoun et al.
2015/0035715 A1 2/2015 Kim et al.
2015/0039482 A1 2/2015 Fuinaga
2015/0041459 A1 2/2015 Leabman et al.
2015/0042265 A1 2/2015 Leabman et al.
2015/0044977 A1 2/2015 Ramasamy et al.
2015/0046526 A1 2/2015 Bush et al.
2015/0061404 A1 3/2015 Lamenza et al.
2015/0076917 A1 3/2015 Leabman et al.
2015/0076927 A1 3/2015 Leabman et al.
2015/0077036 A1 3/2015 Leabman et al.
2015/0077037 A1 3/2015 Leabman et al.
2015/0091520 A1 4/2015 Blum et al.
2015/0091706 A1 4/2015 Chemishkian et al.
2015/0097442 A1 4/2015 Muurinen
2015/0097663 A1 4/2015 Sloo et al.
2015/0102764 A1 4/2015 Leabman et al.
2015/0102769 A1 4/2015 Leabman et al.
2015/0102942 A1 4/2015 Houser et al.
2015/0102973 A1 4/2015 Hand et al.
2015/0108848 A1 4/2015 Joehren
2015/0109181 A1 4/2015 Hyde et al.
2015/0115877 A1 4/2015 Aria et al.
2015/0115878 A1 4/2015 Park
2015/0116153 A1 4/2015 Chen et al.
2015/0128733 A1 5/2015 Taylor et al.
2015/0130285 A1 5/2015 Leabman et al.
2015/0130293 A1 5/2015 Hajimiri et al.
2015/0137612 A1 5/2015 Yamakawa et al.
2015/0148664 A1 5/2015 Stolka et al.
2015/0155737 A1 6/2015 Mayo
2015/0155738 A1 6/2015 Leabman et al.
2015/0162662 A1 6/2015 Chen et al.
2015/0162751 A1 6/2015 Leabman et al.
2015/0162779 A1 6/2015 Lee et al.
2015/0171512 A1 6/2015 Chen et al.
2015/0171513 A1 6/2015 Chen et al.
2015/0171656 A1 6/2015 Leabman et al.
2015/0171658 A1 6/2015 Manova-Elssibony et al.
2015/0171931 A1 6/2015 Won et al.
2015/0177326 A1 6/2015 Chakraborty et al.
2015/0180133 A1 6/2015 Hunt
2015/0180249 A1 6/2015 Jeon et al.
2015/0181117 A1 6/2015 Park et al.
2015/0187491 A1 7/2015 Anagawa
2015/0188352 A1 7/2015 Peek et al.
2015/0199665 A1 7/2015 Chu
2015/0201385 A1 7/2015 Mercer et al.
2015/0207333 A1 7/2015 Baarman et al.
2015/0207542 A1 7/2015 Zeine
2015/0222126 A1 8/2015 Leabman et al.
2015/0233987 A1* 8/2015 Von Novak, III ...... H02J 50/60 324/701
2015/0234144 A1 8/2015 Cameron et al.
2015/0236520 A1 8/2015 Baarman
2015/0236877 A1 8/2015 Peng et al.
2015/0244070 A1 8/2015 Cheng et al.
2015/0244080 A1 8/2015 Gregoire
2015/0244187 A1 8/2015 Horie
2015/0244201 A1 8/2015 Chu
2015/0244341 A1 8/2015 Ritter et al.
2015/0249484 A1 9/2015 Mach et al.
2015/0255989 A1 9/2015 Walley et al.
2015/0256097 A1 9/2015 Gudan et al.
2015/0260835 A1 9/2015 Widmer et al.
2015/0262465 A1 9/2015 Pritchett
2015/0263534 A1 9/2015 Lee et al.
2015/0263548 A1 9/2015 Cooper
2015/0270618 A1 9/2015 Zhu et al.
2015/0270622 A1 9/2015 Takasaki et al.
2015/0270741 A1 9/2015 Leabman et al.
2015/0278558 A1 10/2015 Priev et al.
2015/0280429 A1 10/2015 Makita et al.
2015/0280484 A1 10/2015 Radziemski et al.
2015/0288074 A1 10/2015 Harper et al.
2015/0288438 A1 10/2015 Maltsev et al.
2015/0311585 A1 10/2015 Church et al.
2015/0312721 A1 10/2015 Singh
2015/0318729 A1 11/2015 Leabman
2015/0326024 A1 11/2015 Bell et al.
2015/0326070 A1 11/2015 Petras et al.
2015/0326072 A1 11/2015 Petras et al.
2015/0326143 A1 11/2015 Petras et al.
2015/0327085 A1 11/2015 Hadani
2015/0333528 A1 11/2015 Leabman
2015/0333573 A1 11/2015 Leabman
2015/0333800 A1 11/2015 Perry et al.
2015/0339497 A1 11/2015 Kurian
2015/0340759 A1 11/2015 Bridgelall et al.
2015/0340903 A1 11/2015 Bell et al.
2015/0341087 A1 11/2015 Moore et al.
2015/0358222 A1 12/2015 Berger et al.
2015/0365137 A1 12/2015 Miller et al.
2015/0365138 A1 12/2015 Miller et al.
2016/0005068 A1 1/2016 Im et al.
2016/0012695 A1 1/2016 Bell et al.
2016/0013560 A1 1/2016 Daniels
2016/0013661 A1 1/2016 Kurs et al.
2016/0013677 A1 1/2016 Bell et al.
2016/0013855 A1 1/2016 Campos
2016/0020636 A1 1/2016 Khlat
2016/0028403 A1 1/2016 McCaughan et al.
2016/0042206 A1 2/2016 Pesavento et al.
2016/0043571 A1 2/2016 Kesler et al.
2016/0043572 A1 2/2016 Cooper et al.
2016/0054440 A1 2/2016 Younis
2016/0056635 A1 2/2016 Bell
2016/0056640 A1 2/2016 Mao
2016/0065005 A1 3/2016 Won et al.
2016/0079799 A1 3/2016 Khlat
2016/0087483 A1 3/2016 Hietala et al.
2016/0087486 A1 3/2016 Pogorelik et al.
2016/0094074 A1 3/2016 Alves et al.
2016/0094091 A1 3/2016 Shin et al.
2016/0094092 A1 3/2016 Davlantes et al.
2016/0099601 A1 4/2016 Leabman et al.
2016/0099614 A1 4/2016 Leabman et al.
2016/0099755 A1 4/2016 Leabman et al.
2016/0099757 A1 4/2016 Leabman et al.
2016/0112787 A1 4/2016 Rich
2016/0126749 A1 5/2016 Shichino et al.
2016/0126752 A1 5/2016 Vuori et al.

(56) References Cited

U.S. PATENT DOCUMENTS

2016/0126776 A1 5/2016 Kim et al.
2016/0141908 A1 5/2016 Jakl et al.
2016/0164563 A1 6/2016 Khawand et al.
2016/0181849 A1 6/2016 Govindaraj
2016/0181867 A1 6/2016 Daniel et al.
2016/0181873 A1 6/2016 Mitcheson et al.
2016/0197522 A1 7/2016 Zeine et al.
2016/0202343 A1 7/2016 Okutsu
2016/0204642 A1 7/2016 Oh
2016/0233582 A1 8/2016 Piskun
2016/0238365 A1 8/2016 Wixey et al.
2016/0240908 A1 8/2016 Strong
2016/0248276 A1 8/2016 Hong et al.
2016/0294225 A1 10/2016 Blum et al.
2016/0299210 A1 10/2016 Zeine
2016/0301240 A1 10/2016 Zeine
2016/0322868 A1 11/2016 Akuzawa et al.
2016/0323000 A1 11/2016 Liu et al.
2016/0336804 A1 11/2016 Son et al.
2016/0339258 A1 11/2016 Perryman et al.
2016/0344098 A1 11/2016 Ming
2016/0359367 A1 12/2016 Rothschild
2016/0380464 A1 12/2016 Chin et al.
2016/0380466 A1 12/2016 Yang et al.
2017/0005481 A1 1/2017 Von Novak, III
2017/0005516 A9 1/2017 Leabman et al.
2017/0005524 A1 1/2017 Akuzawa et al.
2017/0005530 A1 1/2017 Zeine et al.
2017/0012448 A1 1/2017 Miller et al.
2017/0025887 A1 1/2017 Hyun et al.
2017/0025903 A1 1/2017 Song et al.
2017/0026087 A1 1/2017 Tanabe
2017/0040700 A1 2/2017 Leung
2017/0043675 A1 2/2017 Jones et al.
2017/0047784 A1 2/2017 Jung et al.
2017/0063168 A1 3/2017 Uchida
2017/0077733 A1 3/2017 Jeong et al.
2017/0077765 A1 3/2017 Bell et al.
2017/0077979 A1 3/2017 Papa et al.
2017/0085437 A1 3/2017 Condeixa et al.
2017/0092115 A1 3/2017 Sloo et al.
2017/0110886 A1 4/2017 Reynolds et al.
2017/0110910 A1 4/2017 Zeine et al.
2017/0127196 A1 5/2017 Blum et al.
2017/0134686 A9 5/2017 Leabman
2017/0141582 A1 5/2017 Adolf et al.
2017/0141583 A1 5/2017 Adolf et al.
2017/0163076 A1 6/2017 Park et al.
2017/0168595 A1 6/2017 Sakaguchi et al.
2017/0179763 A9 6/2017 Leabman
2017/0187422 A1 6/2017 Hosseini
2017/0214422 A1 7/2017 Na et al.
2017/0338695 A1 11/2017 Port
2018/0006611 A1 1/2018 de Jong et al.
2018/0040929 A1 2/2018 Chappelle
2018/0048178 A1 2/2018 Leabman
2018/0090992 A1 3/2018 Shrivastava et al.
2018/0166924 A1 6/2018 Hosseini
2018/0166925 A1 6/2018 Hosseini
2018/0227018 A1 8/2018 Moshfeghi
2018/0262050 A1 9/2018 Yankowitz
2018/0262060 A1 9/2018 Johnston
2018/0301934 A1 10/2018 Prabhala et al.
2018/0309314 A1 10/2018 White et al.
2018/0331581 A1 11/2018 Hosseini
2018/0337534 A1 11/2018 Bell et al.
2018/0343040 A1 11/2018 Luzinski et al.
2019/0044392 A1* 2/2019 Chowdhury ............ H02J 50/12
2019/0074862 A1 3/2019 Wang et al.
2019/0296586 A1 9/2019 Moshfeghi
2019/0326782 A1 10/2019 Graham et al.
2019/0386522 A1 12/2019 Park et al.
2019/0393729 A1 12/2019 Contopanagos et al.
2019/0393928 A1 12/2019 Leabman
2020/0044488 A1 2/2020 Johnston et al.
2020/0091608 A1 3/2020 Alpman et al.
2020/0119592 A1 4/2020 Hosseini
2020/0235614 A1 7/2020 Swan et al.
2020/0274397 A1 8/2020 Hwang et al.
2021/0175752 A1 6/2021 Johnston et al.
2021/0296936 A1 9/2021 Hosseini

FOREIGN PATENT DOCUMENTS

CN 102089952 A 6/2011
CN 102292896 A 12/2011
CN 102860037 A 1/2013
CN 103348563 A 10/2013
CN 203826555 U 9/2014
CN 104090265 A 10/2014
CN 104617680 A 5/2015
CN 105207373 A 12/2015
CN 105765821 A 7/2016
CN 106329116 A 1/2017
CN 103380561 B 9/2017
DE 20016655 U1 2/2002
DE 102013216953 A1 2/2015
EP 1028482 A2 8/2000
EP 1081506 A1 3/2001
EP 2346136 A1 7/2011
EP 2397973 A1 2/2012
EP 2545635 A2 1/2013
EP 2747195 A1 6/2014
EP 3067983 A1 9/2016
EP 3118970 A1 1/2017
EP 3145052 A1 3/2017
GB 2404497 A 2/2005
GB 2556620 A 6/2018
JP 2002319816 A 10/2002
JP 2006157586 A 6/2006
JP 2006178910 A 7/2006
JP 2007043432 A 2/2007
JP 2008167017 A 7/2008
JP 2009525715 A 7/2009
JP 2009201328 A 9/2009
JP 2010104098 A 5/2010
JP 2012095226 A 5/2012
JP 2013500693 A 1/2013
JP 2013511908 A 4/2013
JP 2013099249 A 5/2013
JP 2013162624 A 8/2013
JP 2015128349 A 7/2015
JP WO2015177859 A1 4/2017
KR 20060061776 A 6/2006
KR 20070044302 A 4/2007
KR 100755144 B1 9/2007
KR 20110132059 A 12/2011
KR 20110135540 A1 12/2011
KR 20120009843 A 2/2012
KR 20120108759 A 10/2012
KR 20130026977 A 3/2013
KR 20140023409 A 2/2014
KR 20140023410 A 3/2014
KR 20140025410 A 3/2014
KR 20140085200 A 7/2014
KR 20140148270 A 12/2014
KR 20150077678 A 7/2015
KR 20160018826 A 2/2016
WO WO 199508125 A1 3/1995
WO WO 199831070 A1 7/1998
WO WO 199952173 A1 10/1999
WO WO 2000111716 A1 2/2001
WO WO 2003091943 A1 11/2003
WO WO 2004077550 A1 9/2004
WO WO 2006122783 A2 11/2006
WO WO 2007070571 A2 6/2007
WO WO 2008024993 A2 2/2008
WO WO 2008156571 A2 12/2008
WO WO 2010022181 A1 2/2010
WO WO 2010039246 A1 4/2010
WO WO 2010138994 A1 12/2010
WO WO 2011112022 A2 9/2011
WO WO 2012177283 A1 12/2012
WO WO 2013031988 A1 3/2013

(56) References Cited

FOREIGN PATENT DOCUMENTS

| | | |
|---|---|---|
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014134996 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015130902 A1 | 9/2015 |
| WO | WO 2015161323 A1 | 10/2015 |
| WO | WO 2016024869 A1 | 2/2016 |
| WO | WO 2016048512 A1 | 3/2016 |
| WO | WO 2016088261 A1 | 6/2016 |
| WO | WO 2016187357 A1 | 11/2016 |

OTHER PUBLICATIONS

Energous Corp., IPRP, PCT/US2014/037109, Apr. 12, 2016, 9 pgs.
Energous Corp., IPRP, PCT/US2014/037170, Nov. 10, 2015, 8 pgs.
Energous Corp., IPRP, PCT/US2014/040648, Dec. 8, 2015, 8 pgs.
Energous Corp., IPRP, PCT/US2014/040697, Dec. 8, 2015, 9 pgs.
Energous Corp., IPRP, PCT/US2014/040705, Dec. 8, 2015, 6 pgs.
Energous Corp., IPRP, PCT/US2014/041323, Dec. 22, 2015, 8 pgs.
Energous Corp., IPRP, PCT/US2014/041342, Dec. 15, 2015, 8 pgs.
Energous Corp., IPRP, PCT/US2014/041534, Dec. 29, 2015, 7 pgs.
Energous Corp., IPRP, PCT/US2014/041546, Dec. 29, 2015, 9 pgs.
Energous Corp., IPRP, PCT/US2014/041558, Dec. 29, 2015, 6 pgs.
Energous Corp., IPRP, PCT/US2014/044810, Jan. 5, 2016, 10 pgs.
Energous Corp., IPRP, PCT/US2014/045102, Jan. 12, 2016, 11 pgs.
Energous Corp., IPRP, PCT/US2014/045119, Jan. 12, 2016, 9 pgs.
Energous Corp., IPRP, PCT/US2014/045237, Jan. 12, 2016, 12 pgs.
Energous Corp., IPRP, PCT/US2014/046941, Jan. 19, 2016, 9 pgs.
Energous Corp., IPRP, PCT/US2014/046956, Jan. 19, 2016, 7 pgs.
Energous Corp., IPRP, PCT/US2014/046961, Jan. 19, 2016, 8 pgs.
Energous Corp., Iprp, PCT/US2014/047963, Jan. 26, 2016, 10 pgs.
Energous Corp., IPRP, PCT/US2014/048002, Feb. 12, 2015 8 pgs.
Energous Corp., IPRP, PCT/US2014/049666, Feb. 9, 2016, 5 pgs.
Energous Corp., IPRP, PCT/US2014/049669, Feb. 9, 2016, 8 pgs.
Energous Corp., IPRP, PCT/US2014/049673, Feb. 9, 2016, 6 pgs.
Energous Corp., IPRP, PCT/US2014/054891, Mar. 15, 2016, 10 pgs.
Energous Corp., IPRP, PCT/US2014/054897, Mar. 15, 2016, 8 pgs.
Energous Corp., IPRP, PCT/US2014/054953, Mar. 22, 2016, 5 pgs.
Energous Corp., IPRP, PCT/US2014/055195, Mar. 22, 2016, 9 pgs.
Energous Corp., IPRP, PCT/US2014/059317, Apr. 12, 2016, 10 pgs.
Energous Corp., IPRP, PCT/US2014/059340, Apr. 12, 2016, 11 pgs.
Energous Corp., IPRP, PCT/US2014/059871, Apr. 12, 2016, 9 pgs.
Energous Corp., IPRP, PCT/US2014/062661, May 3, 2016, 10 pgs.
Energous Corp., IPRP, PCT/US2014/062672, May 10, 2016, 8 pgs.
Energous Corp., IPRP, PCT/US2014/062682, May 3, 2016, 8 pgs.
Energous Corp., IPRP, PCT/US2014/068282, Jun. 7, 2016, 10 pgs.
Energous Corp., IPRP, PCT/US2014/068568, Jun. 14, 2016, 8 pgs.
Energous Corp., IPRP, PCT/US2014/068586, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068498, Jun. 26, 2018, 6 pgs.
Energous Corp., IPRP, PCT/US2016/068504, Jun. 26, 2018, 5 pgs.
Energous Corp., IPRP, PCT/US2016/068551, Jun. 26, 2018, 6 pgs.
Energous Corp., IPRP, PCT/US2016/068565, Jun. 26, 2018, 9 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2016/069313, Jul. 3, 2018, 7 pgs.
Energous Corp., IPRP, PCT/US2016/069316, Jul. 3, 2018, 12 pgs.
Energous Corp., IPRP, PCT/US2017/046800, Feb. 12, 2019, 10 pgs.
Energous Corp., IPRP, PCT/US2017/065886, Jun. 18, 2019, 10 pgs.
Energous Corp., IPRP, PCT/US2018/012806, Jul. 9, 2019, 6 pgs.
Energous Corp., IPRP, PCT/US2018/025465, Oct. 1, 2019, 8 pgs.
Energous Corp., IPRP, PCT/US2018/031768, Nov. 12, 2019, 8 pgs.
Energous Corp., IPRP, PCT/US2018/039334, Dec. 24, 2019, 8 pgs.
Energous Corp., IPRP, PCT/US2018/064289, Dec. 29, 2020, 8 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21, 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., ISRWO, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.

(56) References Cited

OTHER PUBLICATIONS

Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/025465, Jun. 22, 2018, 9 pgs.
Energous Corp., ISRWO, PCT/US2018/031768, Jul. 3, 2018, 9 pgs.
Energous Corp., ISRWO, PCT/US2018/031786, Aug. 8, 2018, 9 pgs.
Energous Corp., ISRWO, PCT/US2018/039334, Sep. 11, 2018, 9 pgs.
Energous Corp., ISRWO, PCT/US2018/051082, Dec. 12, 2018, 9 pgs.
Energous Corp., ISRWO, PCT/US2018/058178, Mar. 13, 2019, 10 pgs.
Energous Corp., ISRWO, PCT/US2018/064289, Apr. 25, 2019, 12 pgs.
Energous Corp., ISRWO, PCT/US2019/015820, May 14, 2019, 9 pgs.
Energous Corp., ISRWO, PCT/US2019/021817, Apr. 6, 2019, 11 pgs.
Energous Corp., ISRWO, PCT/US2019/039014, Oct. 4, 2019, 15 pgs.
Energous Corp., ISRWO, PCT/US2020/027409, Jul. 24, 2020, 11 pgs.
Order Granting Reexamination Request, U.S. Appl. No. 90/013,793, filed Aug. 31, 2016, 23 pgs.
Notice of Intent to Issue Reexam Certificate: U.S. Appl. No. 90/013,793, filed Feb. 2, 2017, 8 pgs.
*Ossia Inc.* vs *Energous Corp.,* Declaration of Stephen B. Heppe in Support of Petition for Post-Grant Review of U.S. Pat. No. 9,124,125, PGR2016-00023, May 31, 2016, 144 pgs.
*Ossia Inc.* vs *Energous Corp.,* Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.,* Patent Owner Preliminary Response, Sep. 8, 2016, 95 pgs.
*Ossia Inc.* vs *Energous Corp.,* Petition for Post Grant Review of U.S. Pat. No. 9,124,125, May 31, 2016, 86 pgs.
*Ossia Inc.* vs *Energous Corp.,* Petition for Post-Grant Review of U.S. Pat. No. 9,124,125, May 31, 2016, 92 pgs.
*Ossia Inc.* vs *Energous Corp.,* PGR2016-00023—Institution Decision, Nov. 29, 2016, 29 pgs.
*Ossia Inc.* vs *Energous Corp.,* PGR2016-00024—Institution Decision, Nov. 29, 2016, 50 pgs.
*Ossia Inc.* vs *Energous Corp.,* PGR2016-00024—Judgement—Adverse, Jan. 20, 2017, 3 pgs.
Extended European Search Report, EP14818136.5, dated Jul. 21, 2016, 9 pgs.
Extended European Search Report, EP14822971.9, dated Feb. 10, 2017, 10 pgs.
Extended European Search Report, EP14868901.1, dated Jul. 17, 2017, 6 pgs.
Extended European Search Report, EP15874273.4, dated May 11, 2018, 7 pgs.
Extended European Search Report, EP15876033.0, dated Jun. 13, 2018, 10 pgs.
Extended European Search Report, EP15876036.3, dated May 3, 2018, 9 pgs.
Extended European Search Report, EP15876043.9, dated Aug. 9, 2018, 9 pgs.
Extended European Search Report, EP16189052.0, dated Feb. 10, 2017, 13 pgs.
Extended European Search Report, EP16189300.3, dated Mar. 24, 2017, 6 pgs.
Extended European Search Report, EP16189319.3, dated Feb. 10, 2017, 11 pgs.
Extended European Search Report, EP16189974.5, dated Mar. 13, 2017, 7 pgs.
Extended European Search Report, EP16189982.8, dated Feb. 7, 2017, 11 pgs.
Extended European Search Report, EP16189987.7, dated Feb. 9, 2017, 10 pgs.

(56) References Cited

OTHER PUBLICATIONS

Extended European Search Report, EP16189988.5, dated Mar. 13, 2017, 6 pgs.
Extended European Search Report, EP16193743.8, dated Feb. 8, 2017, 9 pgs.
Extended European Search Report, EP16196205.5, dated Apr. 7, 2017, 9 pgs.
Extended European Search Report, EP16880139.7, dated Jul. 12, 2019, 5 pgs.
Extended European Search Report, EP16880153.8, dated Jul. 2, 2019, 9 pgs.
Extended European Search Report, EP16880158.7, dated Jul. 15, 2019, 8 pgs.
Extended European Search Report, EP16882597.4, dated Aug. 7, 2019, 9 pgs.
Extended European Search Report, EP16882696.4, dated Jul. 3, 2019, 10 pgs.
Extended European Search Report, EP17840412.5, dated Jul. 15, 2019, 8 pgs.
Extended European Search Report, EP17882087.4, dated Sep. 17, 2019, 10 pgs.
Extended European Search Report, EP18204043.6, dated Feb. 14, 2019, 5 pgs.
Extended European Search Report, EP19214719.7, dated Jan. 17, 2020, 9 pgs.
Adamiuk et al., "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
Gill et al., "A System for Change Detection and Human Recognition in Voxel Space using the Microsoft Kinect Sensor," 2011 IEEE Applied Imagery Pattern Recognition Workshop. 8 pgs.
Han et al., Enhanced Computer Vision with Microsoft Kinect Sensor: A Review, IEEE Transactions on Cybernetics vol. 43, No. 5., pp. 1318-1334, Oct. 3, 2013.
Hsieh et al., "Development of a Retrodirective Wireless Microwave Power Transmission System", IEEE, 2003, pp. 393-396.
Leabman, "Adaptive Band-partitioning for Interference Cancellation in Communication System," Thesis Massachusetts Institute of Technology, Feb. 1997, pp. 1-70.
Li et al., "High-Efficiency Switching-Mode Charger System Design Considerations with Dynamic Power Path Management," Mar./Apr. 2012 Issue, 8 pgs.
Mao et al., "BeamStar: An Edge-Based Approach to Routing in Wireless Sensors Networks", IEEE Transactions on Mobile Computing, IEEE Service Center, Los Alamitos, CA, vol. 6, No. 11, Nov. 1, 2007, 13 pgs.
Mascarenas et al., "Experimental Studies of Using Wireless Energy Transmission for Powering Embedded Sensor Nodes," Nov. 28, 2009, Journal of Sound and Vibration, 13 pgs.
Mishra et al., "SIW-based Slot Array Antenna and Power Management Circuit for Wireless Energy Harvesting Applications", IEEE APSURSI, Jul. 2012, 2 pgs.
Nenzi et al., "U-Helix: On-Chip Short Conical Antenna", 7th European Conference on Antennas and Propagation (EUCAP), ISBN: 978-1-4673-2187-7, IEEE, Apr. 8, 2013, 5 pgs.
Singh, "Wireless Power Transfer Using Metamaterial Bonded Microstrip Antenna for Smart Grid WSN", 4th International Conference on Advances in Computing and Communications (ICACC), Aug. 27-29, 2014, 1 pg.
Smolders, "Broadband Microstrip Array Antennas", Institute of Electrical and Electronics Engineers, Digest of the Antennas and Propagation Society International Symposium, Seattle, WA, Jun. 19-24, 1994, 3 pgs.
Van Veen et al., "Beamforming: A Versatile Approach to Spatial Filtering", IEEE, ASSP Magazine, Apr. 1988, pp. 4-24.
Zhai et al., "A Practical Wireless Charging System Based on Ultra-Wideband Retro-Reflective Beamforming", 2010 IEEE Antennas and Propagation Society International Symposium, Toronto, ON, 2010, 4 pgs.

* cited by examiner

1500

CIRCUIT FOR MANAGING MULTI-BAND OPERATIONS OF A WIRELESS POWER TRANSMITTING DEVICE

RELATED APPLICATIONS

This application claims priority from (as a continuation of) U.S. Non-Provisional patent application Ser. No. 16/950,080, filed Nov. 17, 2020, entitled "Circuit for Managing Wireless Power Transmitting Devices," which is a continuation of U.S. Non-Provisional patent application Ser. No. 16/513,607 (now U.S. Pat. No. 10,840,743), filed Jul. 16, 2019, entitled "Circuit For Managing Wireless Power Transmitting Devices," which is a continuation of U.S. Non-Provisional patent application Ser. No. 15/963,959 (now U.S. Pat. No. 10,355,534), filed Apr. 26, 2018, entitled "Integrated Circuit For Managing Wireless Power Transmitting Devices," which is continuation-in-part application of PCT Patent Application No. PCT/US17/065886, filed Dec. 12, 2017, entitled Methods Of Selectively Activating Antenna Zones Of A Near-Field Charging Pad To Maximize Wireless Power Delivered To A Receiver, And An Integrated Circuit For Managing The Methods At The Near-Field Charging Pad." Each of these priority applications is hereby incorporated by reference in its respective entirety.

This application is also related to U.S. Non-Provisional patent application Ser. No. 15/833,790 (now U.S. Pat. No. 10,079,515), entitled "Near-Field Rf Charging Pad With Multi-Band Antenna Element With Adaptive Loading To Efficiently Charge An Electronic Device At Any Position On The Pad," filed Dec. 6, 2017, which is a continuation-in-part of U.S. Non-Provisional patent application Ser. No. 15/424,552 (now U.S. Pat. No. 10,256,677), entitled "Near-Field RF Charging Pad With Adaptive Loading To Efficiently Charge An Electronic Device At Any Position On The Pad," filed Feb. 3, 2017, which claims priority to U.S. Provisional Application Ser. No. 62/433,227, filed Dec. 12, 2016 entitled "Near-Field Rf Charging Pad With Adaptive Loading To Efficiently Charge An Electronic Device At Any Position On The Pad". PCT Patent Application No. PCT/US17/65886 also claims priority to U.S. Provisional Application Ser. No. 62/541,581, filed Aug. 4, 2017, entitled "Methods Of Selectively Activating Antenna Zones Of A Near-Field Charging Pad To Maximize Wireless Power Delivered To A Receiver, And An Integrated Circuit For Managing The Methods At The Near-Field Charging Pad". Each of these related applications is hereby incorporated by reference in its respective entirety.

TECHNICAL FIELD

The embodiments herein generally relate to antennas, software, and devices used in wireless power transmission systems and, more specifically, to a near-field RF charging pad with adaptive loading to efficiently charge an electronic device at any position on the pad.

BACKGROUND

Conventional charging pads utilize inductive coils to generate a magnetic field that is used to charge a device. Users typically must place the device at a specific position on the charging pad and are unable to move the device to different positions on the pad, without interrupting or terminating the charging of the device. This results in a frustrating experience for many users as they may be unable to locate the device at the exact right position on the pad in which to start charging their device.

Conventional charging pads also utilize components that are distributed across multiple different integrated circuits. Such a configuration results in processing delays that cause these charging pads to operate slower (e.g., wireless charging and adjustments made during wireless charging takes longer) than is desired by users of such pads.

SUMMARY

Accordingly, there is a need for wireless charging systems (e.g., RF charging pads) that address the problems identified above. To this end, an RF charging pad is described herein that includes components that are efficiently arranged on a single integrated circuit, and that single integrated circuit manages antennas of the RF charging pad by selectively or sequentially activating antenna zones (e.g., one or more antennas or unit cell antennas of the RF charging pad that are grouped together, also referred to herein as an antenna group) to locate an efficient antenna zone to use for transmission of wireless power to a receiver device that is located on a surface of the RF charging pad. Such systems and methods of use thereof help to eliminate user dissatisfaction with conventional charging pads. For example, by monitoring transferred energy while selectively activating the antenna zones, such systems and methods of use thereof help to eliminate wasted RF power transmissions by ensuring that energy transfer is maximized at any point in time and at any position at which a device may be placed on an RF charging pad, thus eliminating wasteful transmissions that may not be efficiently received.

In the description that follows, references are made to an RF charging pad that includes various antenna zones. For the purposes of this description, antenna zones include one or more transmitting antennas of the RF charging pad, and each antenna zone may be individually addressable by a controlling integrated circuit (e.g., RF power transmitter integrated circuit 160, FIGS. 1A-1B) to allow for selective activation of each antenna zone in order to determine which antenna zone is able to most efficiently transfer wireless power to a receiver. The RF charging pad is also inter-changeably referred to herein as a near-field charging pad, or, more simply, as a charging pad.

(A1) In some embodiments, a method is performed at a near-field charging pad that includes a wireless communication component (e.g., communication component 204, FIG. 1A), a plurality of antenna zones that each respectively include at least one antenna element (e.g., example antenna zones are shown in FIG. 1B), and one or more processors (e.g., CPU 202, FIGS. 1B and 2A). The method includes detecting, via the wireless communication component, that a wireless power receiver is within a threshold distance of the near-field charging pad and in response to detecting that the wireless power receiver is within the threshold distance of the near-field charging pad, determining whether the wireless power receiver has been placed on the near-field charging pad. The method further includes, in accordance with determining that the wireless power receiver has been placed on the near-field charging pad, selectively transmitting, by respective antenna elements included in the plurality of antenna zones, respective test power transmission signals with a first set of transmission characteristics until a determination is made that a particular power-delivery parameter associated with transmission of a respective test power transmission signal by at least one particular antenna zone of the plurality of antenna zones satisfies power-delivery criteria. Upon determining, by the one or more processors, that the particular power-delivery parameter satisfies the power-delivery criteria, the method further includes transmitting a plurality of additional power transmission signals to the wireless power receiver using the at least one particular antenna zone, wherein each additional power transmission signal of the plurality is transmitted with a second set of transmission characteristics, distinct from the first set.

(A2) In some embodiments of the method of A1, determining whether the wireless power receiver has been placed on the surface of the near-field charging pad includes: (i) transmitting the test power transmission signals using each of the plurality of antenna zones, (ii) monitoring an amount of reflected power at the near-field charging pad while transmitting the test power transmission signals, and (iii) determining that the wireless power receiver has been placed on the near-field charging pad when the amount of reflected power satisfies a device detection threshold.

(A3) In some embodiments of the method of A2, the amount of reflected power is measured at each antenna zone of the plurality of antenna zones.

(A4) In some embodiments of the method of any of A2-A3, the device detection threshold is established during a calibration process for the near-field charging pad.

(A5) In some embodiments of the method of A4, the device detection threshold is specific to a type of device that is coupled with the wireless power receiver, and the device detection threshold is selected by the one or more processors after detecting the wireless power receiver in proximity to the near-field charging pad (e.g., the wireless power receiver sends a packet of information to the near-field charging pad, and that packet of information includes information that identifies the type of device that is coupled with the wireless power receiver).

(A6) In some embodiments of the method of any of A1-A5, selectively transmitting the respective test power transmission signals is performed using each antenna zone of the plurality of antenna zones. In addition, the method further comprises, before the determination is made that the power-delivery parameter associated with transmission of the respective test power transmission signal by the at least one particular antenna zone of the plurality of antenna zones satisfies the power-delivery criteria: (i) updating a respective power-delivery parameter associated with transmission of a respective test power transmission signal by each respective antenna zone based on the transmission by each antenna zone, and (ii) selecting two or more antenna zones, including the at least one particular antenna zone, based on their associated respective power-delivery parameters, to transmit wireless power to the wireless power receiver.

(A7) In some embodiments of the method of A6, the method further comprises using each of the two or more antenna zones to transmit additional test power transmission signals having the first set of transmission characteristics. Moreover, the determination that the particular power-delivery parameter satisfies the power-delivery criteria includes determining that the particular power-delivery parameter indicates that the particular antenna zone is more efficiently transmitting wireless power to the wireless power receiver as compared to other antenna zones of the two or more antenna zones.

(A8) In some embodiments of the method of any of A6-A7, the determination that the particular power-delivery parameter satisfies the power-delivery criteria also includes determining that the particular power-delivery parameter indicates that a first threshold amount of power is transferred to the wireless power receiver by the at least one particular antenna zone, and the at least one particular antenna zone is the only antenna zone of the two or more antenna zones having a respective power-delivery parameter that indicates that the first threshold amount of power is transferred to the wireless power receiver.

(A9) In some embodiments of the method of any of A6-A8, the determination that the particular power-delivery parameter satisfies the power-delivery criteria also includes determining that (i) no antenna zone is transferring a first threshold amount of power to the wireless power receiver and (ii) an additional power-delivery parameter associated with an additional antenna zone of the two or more antenna zones satisfies the power-delivery criteria. In addition, the particular power-delivery parameter indicates that a first amount of power transferred to the wireless power receiver by the particular antenna zone is above a second threshold amount of power and below the first threshold amount of power, and the additional power-delivery parameter indicates that a second amount of power transferred to the wireless power receiver by the additional antenna zone is above the second threshold amount of power and below the first threshold amount of power.

(A10) In some embodiments of the method of A9, both of the particular antenna group and the additional antenna group are used to simultaneously transmit the additional plurality of power transmission signals to provide power to the wireless power receiver.

(A11) In some embodiments of the method of any of A1-A10, information used to determine the power-delivery parameter is provided to the near-field charging pad by the wireless power receiver via the wireless communication component of the near-field charging pad.

(A12) In some embodiments of the method of any of A1-A11, the second set of transmission characteristics is determined by adjusting at least one characteristic in the first set of transmission characteristics to increase an amount of power that is transferred by the particular antenna group to the wireless power receiver.

(A13) In some embodiments of the method of A12, the at least one adjusted characteristic is a frequency or impedance value.

(A14) In some embodiments of the method of any of A1-A13, while transmitting the additional plurality of power transmission signals, adjusting at least one characteristic in the second set of transmission characteristics based on information, received from the wireless power receiver, that is used to determine a level of power that is wirelessly delivered to the wireless power receiver by the near-field charging pad.

(A15) In some embodiments of the method of any of A1-A14, the one or more processors are components of a single integrated circuit that is used to control operation of the near-field charging pad. For example, any of the methods described herein are managed by the single integrated circuit, such as an instance of the radio frequency (RF) power transmitter integrated circuit 160 shown in FIG. 1B.

(A16) In some embodiments of the method of any of A1-A15, each respective power-delivery metric corresponds to an amount of power received by the wireless power receiver based on transmission of a respective test power transmission signal by a respective antenna group of the plurality of antenna groups.

(A17) In some embodiments of the method of any of A1-A16, the method further includes, before transmitting the test power transmission signals, determining that the wireless power receiver is authorized to receive wirelessly delivered power from the near-field charging pad.

(A18) In another aspect, a near-field charging pad is provided. In some embodiments, the near-field charging pad includes a wireless communication component, a plurality of antenna zones that each respectively include at least one antenna element, one or more processors, and memory storing one or more programs, which when executed by the one or more processors cause the near-field charging pad to perform the method described in any one of A1-A17.

(A19) In yet another aspect, a near-field charging pad is provided and the near-field charging includes means for performing the method described in any one of A1-A17.

(A20) In still another aspect, a non-transitory computer-readable storage medium is provided. The non-transitory computer-readable storage medium stores executable instructions that, when executed by a near-field charging pad (that includes a wireless communication component, a plurality of antenna zones that each respectively include at least one antenna element) with one or more processors/cores, cause the near-field charging pad to perform the method described in any one of A1-A17.

As described above, there is also a need for a integrated circuit that includes components for managing transmission of wireless power that are all integrated on a single integrated circuit. Such a integrated circuit and methods of use thereof help to eliminate user dissatisfaction with conventional charging pads. By including all components on a single chip (as discussed in more detail below in reference to FIGS. 1A and 1B), such integrated circuits are able to manage operations at the integrated circuits more efficiently and quickly (and with lower latency), thereby helping to improve user satisfaction with the charging pads that are managed by these integrated circuits.

(B1) In some embodiments, an integrated circuit includes: (i) a processing unit that is configured to control operation of the integrated circuit, (ii) a power converter, operatively coupled to the processing unit, that is configured to convert an input current into radio frequency energy, (iii) a waveform generator, operatively coupled to the processing unit, that is configured to generate a plurality of power transmission signals using the radio frequency energy, (iv) a first interface that couples the integrated circuit with a plurality of power amplifiers that are external to the integrated circuit, and (v) a second interface, distinct from the first interface, that couples the integrated circuit with a wireless communication component. The processing unit is also configured to: (i) receive, via the second interface, an indication that a wireless power receiver is within transmission range of a near-field charging pad controlled by the integrated circuit, and (ii) in response to receiving the indication provide, via the first interface, at least some of the plurality of power transmission signals to at least one of the plurality of power amplifiers.

(B2) In some embodiments of the integrated circuit of B1, the processing unit includes a CPU, ROM, RAM, and encryption (e.g., CPU subsystem 170, FIG. 1B).

(B3) In some embodiments of the integrated circuit of any of B1-B2, the input current is direct current. Alternatively, in some embodiments, the input current is alternating current. In these embodiments, the power converter is a radio frequency DC-DC converter or a radio frequency AC-AC converter, respectively.

(B4) In some embodiments of the integrated circuit of any of B1-B3, the wireless communication component is a Bluetooth or Wi-Fi radio that is configured to receive communication signals from a device that is placed on a surface of the near-field charging pad.

To help address the problems described above and to thereby provide charging pads that satisfy user needs, the antenna zones described above may include adaptive antenna elements (e.g., antenna zones 290 of the RF charging pad 100, FIG. 1B, may each respectively include one or more of the antennas 120 described below in reference to FIGS. 3A-6E and 8) that are able to adjust energy transmission characteristics (e.g., impedance and frequency for a conductive line of a respective antenna element) so that the charging pad is capable of charging a device that is placed at any position on the pad.

In accordance with some embodiments, the antenna zones of the radio frequency (RF) charging pads described herein may include: one or more antenna elements that are in communication with the one or more processors for transmitting RF signals to the RF receiver of the electronic device. In some embodiments, each respective antenna element includes: (i) a conductive line forming a meandered line pattern; (ii) a first terminal at a first end of the conductive line for receiving current that flows through the conductive line at a frequency controlled by the one or more processors; and (iii) a second terminal, distinct from the first terminal, at a second end of the conductive line, the second terminal coupled with a component that is controlled by the at least one processor and allows for modifying an impedance value at the second terminal. In some embodiments, the at least one processor is configured to adaptively adjust the frequency and/or the impedance value to optimize the amount of energy that is transferred from the one or more antenna elements to the RF receiver of the electronic device.

There is a need for wireless charging systems (e.g., RF charging pads) that include adaptive antenna elements that are able to adjust energy transmission characteristics (e.g., impedance and frequency for a conductive line of a respective antenna element) so that the charging pad is capable of charging a device that is placed at any position on the pad. In some embodiments, these charging pads include one or more processors that monitor energy transferred from the transmitting antenna elements (also referred to herein as RF antenna elements or antenna elements) and to a receiver of an electronic device to be charged, and the one or more processors optimize the energy transmission characteristics to maximize energy transfer at any position on the charging pad. Some embodiments may also include a feedback loop to report received power at the receiver to the one or more processors.

(C1) In accordance with some embodiments, a radio frequency (RF) charging pad is provided. The RF charging pad includes: at least one processor for monitoring an amount of energy that is transferred from the RF charging pad to an RF receiver of an electronic device. The RF charging pad also includes: one or more antenna elements that are in communication with the one or more processors for transmitting RF signals to the RF receiver of the electronic device. In some embodiments, each respective antenna element includes: (i) a conductive line forming a meandered line pattern; (ii) a first terminal at a first end of the conductive line for receiving current that flows through the conductive line at a frequency controlled by the one or more processors; and (iii) a second terminal, distinct from the first terminal, at a second end of the conductive line, the second terminal coupled with a component that is controlled by the at least one processor and allows for modifying an impedance value at the second terminal. In some embodiments, the at least one processor is configured to adaptively adjust the frequency and/or the impedance value to optimize the amount of energy that is transferred from the one or more antenna elements to the RF receiver of the electronic device.

(C2) In accordance with some embodiments, a method is also provided that is used to charge an electronic device through radio frequency (RF) power transmission. The method includes: providing a transmitter comprising at least one RF antenna. The method also includes: transmitting, via at the least one RF antenna, one or more RF signals and monitoring an amount of energy that is transferred via the one or more RF signals from the at least one RF antenna to an RF receiver. The method additionally includes: adaptively adjusting a characteristic of the transmitter to optimize the amount of energy that is transferred from the at least one RF antenna to the RF receiver. In some embodiments, the characteristic is selected from a group consisting of (i) a frequency of the one or more RF signals, (ii) an impedance of the transmitter, and (iii) a combination of (i) and (ii). In some embodiments, the at least one RF antenna is a part of an array of RF antennas.

(C3) In accordance with some embodiments, a radio frequency (RF) charging pad is provided. The RF charging pad includes: one or more processors for monitoring an amount of energy that is transferred from the RF charging pad to an RF receiver of an electronic device. The RF charging pad also includes: one or more transmitting antenna elements that are configured to communicate with the one or more processors for transmitting RF signals to the RF receiver of the electronic device. In some embodiments, each respective antenna element includes: (i) a conductive line forming a meandered line pattern; (ii) an input terminal at a first end of the conductive line for receiving current that flows through the conductive line at a frequency controlled by the one or more processors; and (iii) a plurality of adaptive load terminals, distinct from the input terminal and distinct from each other, at a plurality of positions of the conductive line, each respective adaptive load terminal of the plurality of adaptive load terminals coupled with a respective component that is configured to be controlled by the one or more processors and is configured to allow modifying a respective impedance value at the respective adaptive load terminal. In some embodiments, the one or more processors are configured to adaptively adjust at least one of the frequency and a respective impedance value at one or more of the plurality of adaptive load terminals to optimize the amount of energy that is transferred from the one or more transmitting antenna elements to the RF receiver of the electronic device.

(C4) In accordance with some embodiments, a method is also provided that is used to charge an electronic device through radio frequency (RF) power transmission. The method includes: providing a charging pad that includes a transmitter comprising one or more RF antennas. In some embodiments, each RF antenna includes: (i) a conductive line forming a meandered line pattern; (ii) an input terminal at a first end of the conductive line for receiving current that flows through the conductive line at a frequency controlled by one or more processors; and (iii) a plurality of adaptive load terminals, distinct from the input terminal and distinct from each other, at a plurality of positions of the conductive line, each respective adaptive load terminal of the plurality of adaptive load terminals coupled with a respective component that is controlled by the one or more processors and allows for modifying a respective impedance value at the respective adaptive load terminal. The method also includes: transmitting, via the one or more RF antennas, one or more RF signals, and monitoring an amount of energy that is transferred via the one or more RF signals from the one or more RF antennas to an RF receiver. The method additionally includes: adaptively adjusting a characteristic of the transmitter using the one or more processors of the transmitter to optimize the amount of energy that is transferred from the one or more RF antennas to the RF receiver. In some embodiments, the characteristic is selected from a group consisting of (i) a frequency of the one or more RF signals, (ii) an impedance of the transmitter, and (iii) a combination of (i) and (ii). In some embodiments, the impedance of the transmitter is adaptively adjusted at a respective one or more of the plurality of adaptive load terminals of the one or more RF antennas using the one or more processors of the transmitter.

(C5) In accordance with some embodiments, a non-transitory computer-readable storage medium is provided. The non-transitory computer-readable storage medium includes executable instructions that, when executed by one or more processors that are coupled with a radio frequency (RF) charging pad that includes one or more transmitting antenna elements, cause the one or more processors to: monitor an amount of energy that is transferred from the RF charging pad to an RF receiver of an electronic device; and communication with the one or more transmitting antenna elements for transmitting RF signals to the RF receiver of the electronic device. In some embodiments, each respective transmitting antenna element includes: a conductive line forming a meandered line pattern; an input terminal at a first end of the conductive line for receiving current that flows through the conductive line at a frequency controlled by the one or more processors; and a plurality of adaptive load terminals, distinct from the input terminal and distinct from each other, at a plurality of positions of the conductive line, each respective adaptive load terminal of the plurality of adaptive load terminals coupled with a respective component that is configured to be controlled by the one or more processors and is configured to allow modifying a respective impedance value at each respective adaptive load terminal. And the one or more processors further adaptively adjust at least one of the frequency and a respective impedance value at one or more of the plurality of adaptive load terminals to optimize the amount of energy that is transferred from the one or more transmitting antenna elements to the RF receiver of the electronic device.

(C6) In some embodiments of any of C1-C5, the frequency is in a first frequency band, and at least one of the one or more transmitting antenna elements is configured to operate at a second frequency band based on adaptive adjustments, by the one or more processors, to respective impedance values at one or more of the plurality of adaptive load terminals of the at least one transmitting antenna element.

(C7) In some embodiments of any of C1-C6, the RF charging pad includes an input circuit that is coupled with the one or more processors and is configured to provide the current to the input terminal at the first end of the conductive line, wherein the one or more processors are configured to adaptively adjust the frequency by instructing the input circuit to generate the current with a new frequency that is distinct from the frequency.

(C8) In some embodiments of any of C1-C7, the one or more processors are configured to adaptively adjust the frequency by instructing the feeding element to generate the current with a plurality of different frequencies that are determined using predetermined increments.

(C9) In some embodiments of any of C1-C8, a respective conductive line for at least one of the one or more transmitting antenna elements has a respective meandered line pattern that allows the at least one transmitting antenna element to efficiently transmit RF signals having the frequency and/or the new frequency, at least two adjacent segments of the respective conductive line having the respective meandered line pattern have different geometric dimensions relative to each other, and the respective conductive line has a length that remains the same when the at least one transmitting antenna element is configured to transmit RF signals having the frequency and/or the new frequency.

(C10) In some embodiments of any of C1-C9, at least one transmitting antenna element of the one or more transmitting antenna elements has a first segment and a second segment, the first segment including the input terminal, and the at least one transmitting antenna element is configured to: operate at the frequency while the first segment is not coupled with the second segment, and operate at the new frequency while the first segment is coupled with the second segment; and the one or more processors are configured to couple the first segment with the second segment in conjunction with instructing the feeding element to generate the current with the new frequency that is distinct from the frequency.

(C11) In some embodiments of any of C1-C10, the one or more processors are configured to: adaptively adjust the frequency and/or a respective impedance value associated with a first transmitting antenna element of the one or more transmitting antenna elements to cause the first transmitting antenna element to operate in a first frequency band, and adaptively adjust the frequency and/or the respective impedance value associated with a second transmitting antenna element of the one or more transmitting antenna elements to cause the second transmitting antenna element to operate in a second frequency band, wherein the first frequency band is distinct from the second frequency band.

(C12) In some embodiments of any of C1-C11, the electronic device is placed in contact with or close to a top surface of the RF charging pad.

(C13) In some embodiments of any of C1-C12, the respective component is a mechanical relay coupled with the respective adaptive load terminal for switching the respective adaptive load terminal between open and short states, and the impedance value is adaptively adjusted at the respective adaptive load terminal of the respective transmitting antenna element by opening or closing the mechanical relay to switch between an open or short circuit, respectively.

(C14) In some embodiments of any of C1-C13, the respective component is an application-specific integrated circuit (ASIC), and the respective impedance value is adaptively adjusted by the ASIC to within a range of values.

(C15) In some embodiments of any of C1-C14, the one or more processors are configured to: adaptively adjust the frequency and/or the respective impedance value by adaptively adjusting the frequency and a respective impedance value at one or more of the plurality of adaptive load terminals to determine a relative maximum amount of energy that is transferred to the RF receiver of the electronic device, and once the maximum amount of energy is determined, cause each of the one or more transmitting antenna elements to respectively transmit the RF signals at a respective frequency and using a respective impedance value that resulted in the maximum amount of energy transferred to the RF receiver.

(C16) In some embodiments of any of C1-C15, the one or more processors monitor the amount of energy that is transferred to the RF receiver based at least in part on information received from the electronic device, the information identifying energy received at the RF receiver from the RF signals.

(C17) In some embodiments of any of C1-C16, the information received from the electronic device identifying received energy is sent using a wireless communication protocol.

(C18) In some embodiments of any of C1-C17, the wireless communication protocol is bluetooth low energy (BLE).

(C19) In some embodiments of any of C1-C18, the one or more processors monitor the amount of energy transferred based at least in part on an amount of energy that is detected at the respective adaptive load terminal.

Thus, wireless charging systems configured in accordance with the principles described herein are able to charge an electronic device that is placed at any position on the RF charging pad and avoid wasting energy by ensuring that energy transfer is constantly optimized.

In addition, wireless charging systems configured in accordance with the principles described herein are able to charge different electronic devices that are tuned at different frequencies or frequency bands on the same charging transmitter. In some embodiments, a transmitter with a single antenna element can operate at multiple frequencies or frequency bands at the same time or at different times. In some embodiments, a transmitter with multiple antenna elements can operate at multiple frequencies or frequency bands at the same time. That enables more flexibility in the types and sizes of antennas that are included in receiving devices.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not intended to circumscribe or limit the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1A:
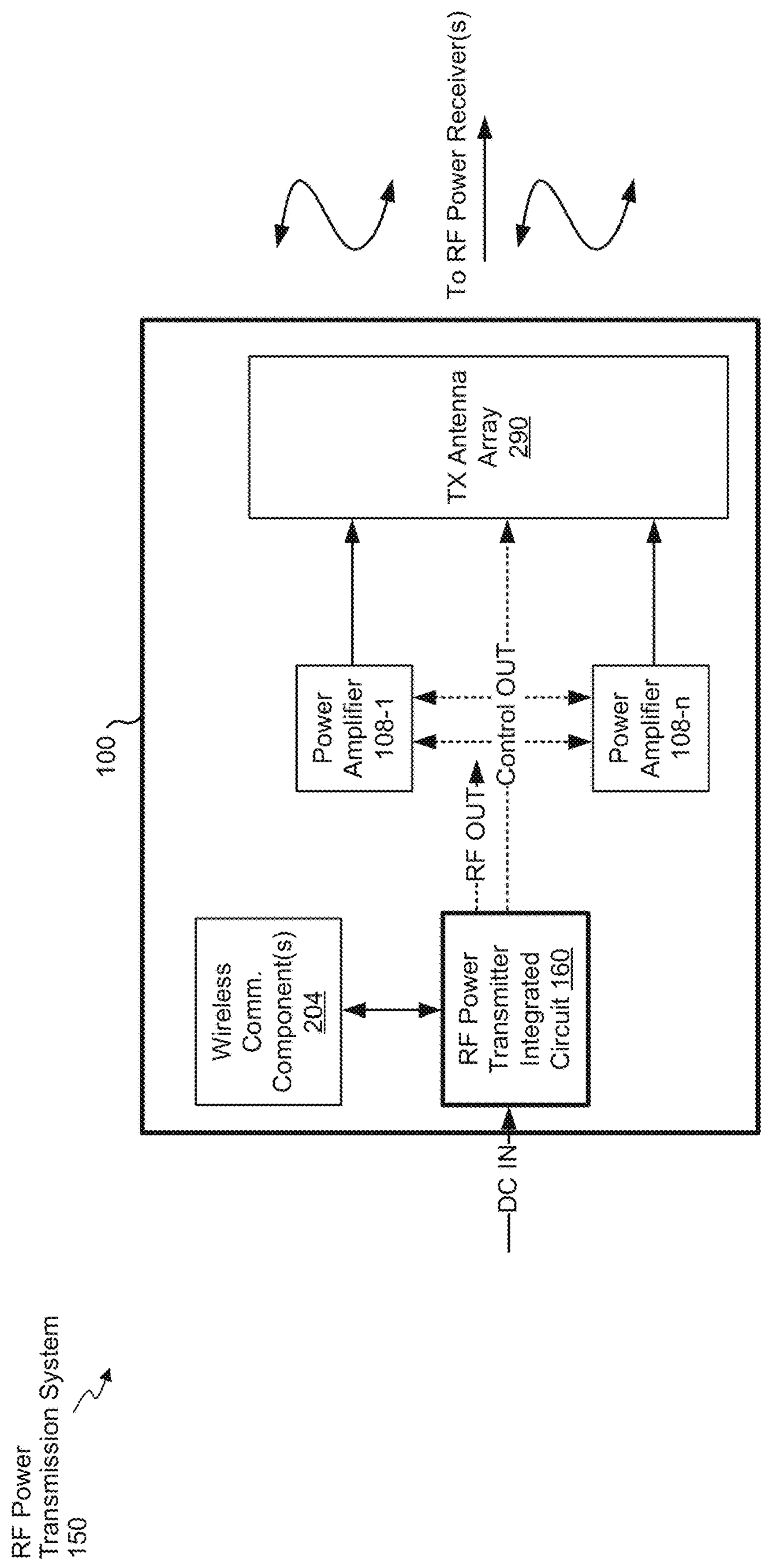
FIG. 1A is a block diagram of an RF wireless power transmission system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIG. 1A is a block diagram of an RF wireless power transmission system in accordance with some embodiments. In some embodiments, the RF wireless power transmission system 150 includes a RF charging pad 100 (also referred to herein as a near-field (NF) charging pad 100 or RF charging pad 100). In some embodiments, the RF charging pad 100 includes an RF power transmitter integrated circuit 160 (described in more detail below). In some embodiments, the RF charging pad 100 includes one or more communications components 204 (e.g., wireless communication components, such as WI-FI or BLUETOOTH radios), discussed in more detail below with reference to FIG. 2A. In some embodiments, the RF charging pad 100 also connects to one or more power amplifier units 108-1, . . . 108-*n* to control operation of the one or more power amplifier units when they drive an external TX antenna array 210. In some embodiments, RF power is controlled and modulated at the RF charging pad 100 via switch circuitry as to enable the RF wireless power transmission system to send RF power to one or more wireless receiving devices via the TX antenna array 210. Example power amplifier units are discussed in further detail below with reference to FIG. 3A.

In some embodiments, the communication component(s) 204 enable communication between the RF charging pad 100 and one or more communication networks. In some embodiments, the communication component(s) 204 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Figure 1B:
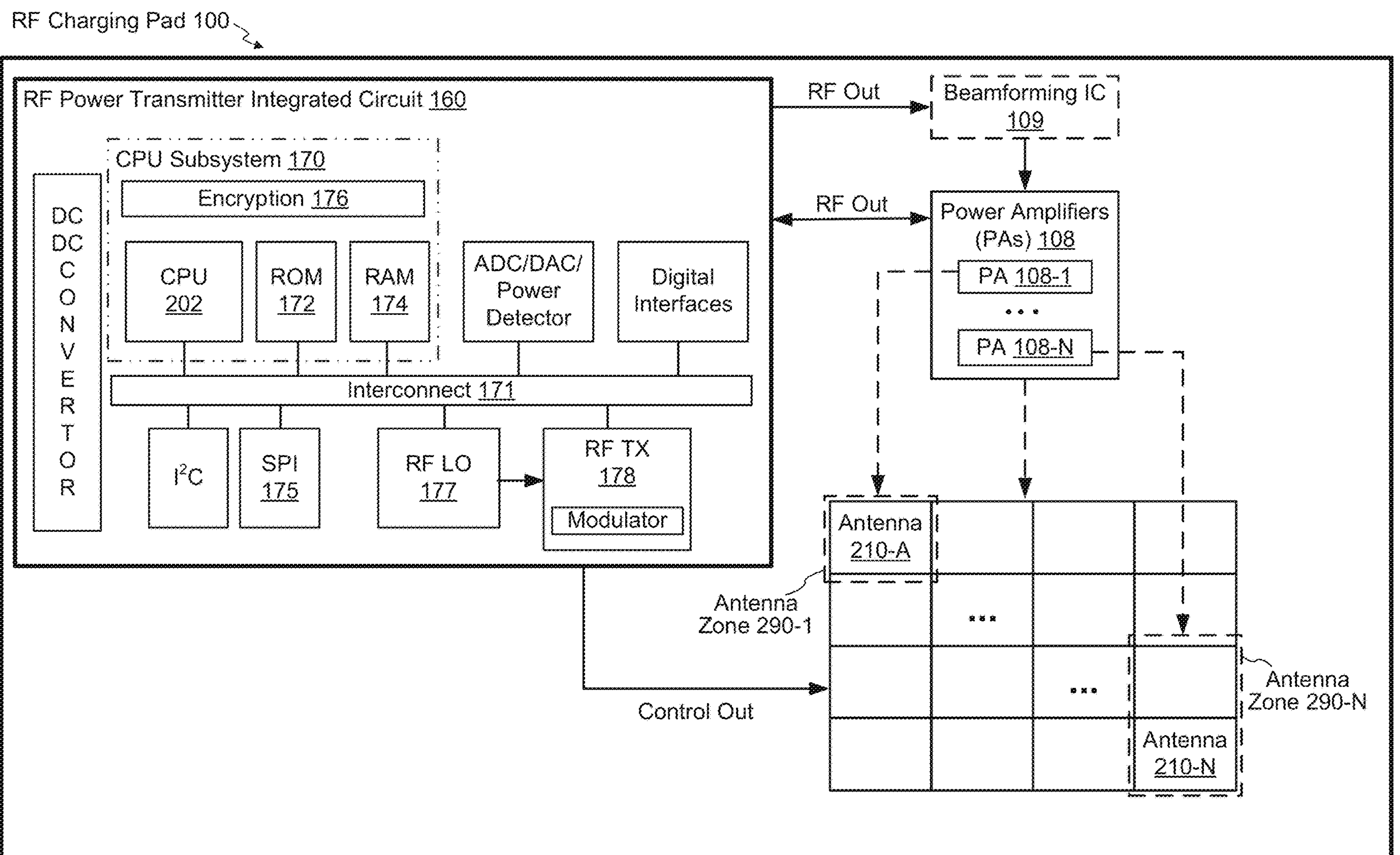
FIG. 1B is a block diagram showing components of an example RF charging pad that includes an RF power transmitter integrated circuit and antenna zones, in accordance with some embodiments.

FIG. 1B is a block diagram of the RF power transmitter integrated circuit 160 (the "integrated circuit") in accordance with some embodiments. In some embodiments, the integrated circuit 160 includes a CPU subsystem 170, an external device control interface, an RF subsection for DC to RF power conversion, and analog and digital control interfaces interconnected via an interconnection component, such as a bus or interconnection fabric block 171. In some embodiments, the CPU subsystem 170 includes a microprocessor unit (CPU) 202 with related Read-Only-Memory (ROM) 172 for device program booting via a digital control interface, e.g. an $I^2C$ port, to an external FLASH containing the CPU executable code to be loaded into the CPU Subsystem Random Access Memory (RAM) 174 (e.g., memory 206, FIG. 2A) or executed directly from FLASH. In some embodiments, the CPU subsystem 170 also includes an encryption module or block 176 to authenticate and secure communication exchanges with external devices, such as wireless power receivers that attempt to receive wirelessly delivered power from the RF charging pad 100.

In some embodiments, executable instructions running on the CPU (such as those shown in the memory 206 in FIG. 2A and described below) are used to manage operation of the RF charging pad 100 and to control external devices through a control interface, e.g., SPI control interface 175, and the other analog and digital interfaces included in the RF power transmitter integrated circuit 160. In some embodiments, the CPU subsystem also manages operation of the RF subsection of the RF power transmitter integrated circuit 160, which includes an RF local oscillator (LO) 177 and an RF transmitter (TX) 178. In some embodiments, the RF LO 177 is adjusted based on instructions from the CPU subsystem 170 and is thereby set to different desired frequencies of operation, while the RF TX converts, amplifies, modulates the RF output as desired to generate a viable RF power level.

In some embodiments, the RF power transmitter integrated circuit 160 provides the viable RF power level (e.g., via the RF TX 178) to an optional beamforming integrated circuit (IC) 109, which then provides phase-shifted signals to one or more power amplifiers 108. In some embodiments, the beamforming IC 109 is used to ensure that power transmission signals sent using two or more antennas 210 (e.g., each antenna 210 may be associated with a different antenna zones 290 or may each belong to a single antenna zone 290) to a particular wireless power receiver are transmitted with appropriate characteristics (e.g., phases) to ensure that power transmitted to the particular wireless power receiver is maximized (e.g., the power transmission signals arrive in phase at the particular wireless power receiver). In some embodiments, the beamforming IC 109 forms part of the RF power transmitter IC 160.

In some embodiments, the RF power transmitter integrated circuit 160 provides the viable RF power level (e.g., via the RF TX 178) directly to the one or more power amplifiers 108 and does not use the beamforming IC 109 (or bypasses the beamforming IC if phase-shifting is not required, such as when only a single antenna 210 is used to transmit power transmission signals to a wireless power receiver).

In some embodiments, the one or more power amplifiers 108 then provide RF signals to the antenna zones 290 for transmission to wireless power receivers that are authorized to receive wirelessly delivered power from the RF charging pad 100. In some embodiments, each antenna zone 290 is coupled with a respective PA 108 (e.g., antenna zone 290-1 is coupled with PA 108-1 and antenna zone 290-N is coupled with PA 108-N). In some embodiments, multiple antenna zones are each coupled with a same set of PAs 108 (e.g., all PAs 108 are coupled with each antenna zone 290). Various arrangements and couplings of PAs 108 to antenna zones 290 allow the RF charging pad 100 to sequentially or selectively activate different antenna zones in order to determine the most efficient antenna zone 290 to use for transmitting wireless power to a wireless power receiver (as explained in more detail below in reference to FIGS. 9A-9B, 10, and 11A-11E). In some embodiments, the one or more power amplifiers 108 are also in communication with the CPU subsystem 170 to allow the CPU 202 to measure output power provided by the PAs 108 to the antenna zones of the RF charging pad 100.

FIG. 1B also shows that, in some embodiments, the antenna zones 290 of the RF charging pad 100 may include one or more antennas 210A-N. In some embodiments, each antenna zones of the plurality of antenna zones includes one or more antennas 210 (e.g., antenna zone 290-1 includes one antenna 210-A and antenna zones 290-N includes multiple antennas 210). In some embodiments, a number of antennas included in each of the antenna zones is dynamically defined based on various parameters, such as a location of a wireless power receiver on the RF charging pad 100. In some embodiments, the antenna zones may include one or more of the meandering line antennas described in more detail below. In some embodiments, each antenna zone 290 may include antennas of different types (e.g., a meandering line antenna and a loop antenna), while in other embodiments each antenna zone 290 may include a single antenna of a same type (e.g., all antenna zones 290 include one meandering line antenna), while in still other embodiments, the antennas zones may include some antenna zones that include a single antenna of a same type and some antenna zones that include antennas of different types. Antenna zones are also described in further detail below.

In some embodiments, the RF charging pad 100 may also include a temperature monitoring circuit that is in communication with the CPU subsystem 170 to ensure that the RF charging pad 100 remains within an acceptable temperature range. For example, if a determination is made that the RF charging pad 100 has reached a threshold temperature, then operation of the RF charging pad 100 may be temporarily suspended until the RF charging pad 100 falls below the threshold temperature.

By including the components shown for RF power transmitter circuit 160 (FIG. 1B) on a single chip, such integrated circuits are able to manage operations at the integrated circuits more efficiently and quickly (and with lower latency), thereby helping to improve user satisfaction with the charging pads that are managed by these integrated circuits. For example, the RF power transmitter circuit 160 is cheaper to construct, has a smaller physical footprint, and is simpler to install. Furthermore, and as explained in more detail below in reference to FIG. 2A, the RF power transmitter circuit 160 may also include a secure element module 234 (e.g., included in the encryption block 176 shown in FIG. 1B) that is used in conjunction with a secure element module 282 (FIG. 2B) or a receiver 104 to ensure that only authorized receivers are able to receive wirelessly delivered power from the RF charging pad 100 (FIG. 1B).

Figure 1C:
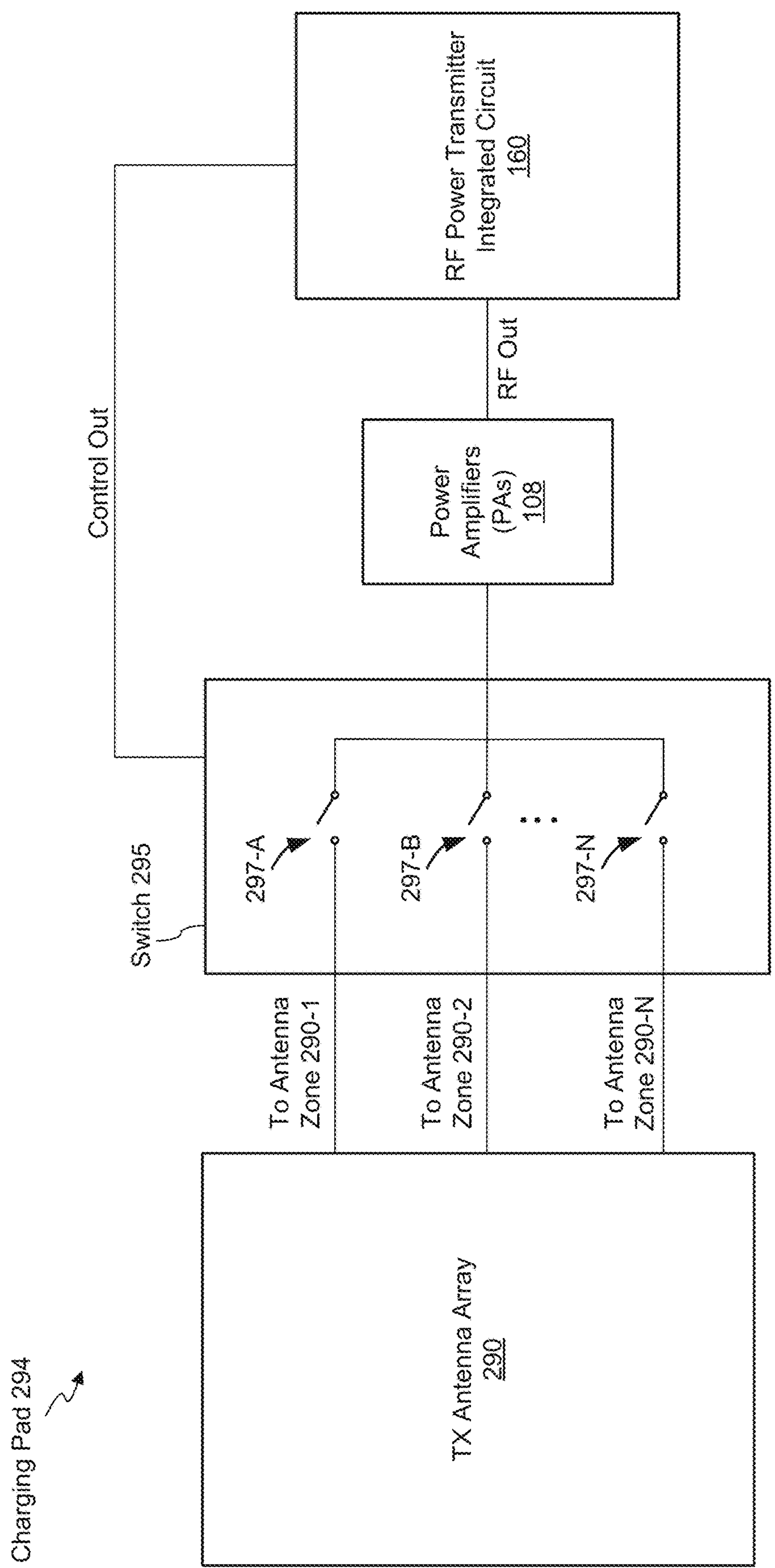
FIG. 1C is a block diagram showing components of an example RF charging pad that includes an RF power transmitter integrated circuit coupled to a switch, in accordance with some embodiments.

FIG. 1C is a block diagram of a charging pad 294 in accordance with some embodiments. The charging pad 294 is an example of the charging pad 100 (FIG. 1A), however, one or more components included in the charging pad 100 are not included in the charging pad 294 for ease of discussion and illustration.

The charging pad 294 includes an RF power transmitter integrated circuit 160, one or more power amplifiers 108, and a transmitter antenna array 290 having multiple antenna zones. Each of these components is described in detail above with reference to FIGS. 1A and 1B. Additionally, the charging pad 294 includes a switch 295, positioned between the power amplifiers 108 and the antenna array 290, having a plurality of switches 297-A, 297-B, . . . 297-N. The switch 295 is configured to switchably connect one or more power amplifiers 108 with one or more antenna zones of the antenna array 290 in response to control signals provided by the RF power transmitter integrated circuit 160.

To accomplish the above, each switch 297 is coupled with (e.g., provides a signal pathway to) a different antenna zone of the antenna array 290. For example, switch 297-A may be coupled with a first antenna zone 290-1 (FIG. 1B) of the antenna array 290, switch 297-B may be coupled with a second antenna zone 290-2 of the antenna array 290, and so on. Each of the plurality of switches 297-A, 297-B, . . . 297-N, once closed, creates a unique pathway between a respective power amplifier 108 (or multiple power amplifiers 108) and a respective antenna zone of the antenna array 290. Each unique pathway through the switch 295 is used to selectively provide RF signals to specific antenna zones of the antenna array 290. It is noted that two or more of the plurality of switches 297-A, 297-B, . . . 297-N may be closed at the same time, thereby creating multiple unique pathways to the antenna array 290 that may be used simultaneously.

In some embodiments, the RF power transmitter integrated circuit 160 is coupled to the switch 295 and is configured to control operation of the plurality of switches 297-A, 297-B, . . . 297-N (illustrated as a "control out" signal in FIGS. 1A and 1C). For example, the RF power transmitter integrated circuit 160 may close a first switch 297-A while keeping the other switches open. In another example, the RF power transmitter integrated circuit 160 may close a first switch 297-A and a second switch 297-B, and keep the other switches open (various other combinations and configuration are possible). Moreover, the RF power transmitter integrated circuit 160 is coupled to the one or more power amplifiers 108 and is configured to generate a suitable RF signal (e.g., the "RF Out" signal) and provide the RF signal to the one or more power amplifiers 108. The one or more power amplifiers 108, in turn, are configured to provide the RF signal to one or more antenna zones of the antenna array 290 via the switch 295, depending on which switches 297 in the switch 295 are closed by the RF power transmitter integrated circuit 160.

To further illustrate, as described in some embodiments below, the charging pad is configured to transmit test power transmission signals and/or regular power transmission signals using different antenna zones, e.g., depending on a location of a receiver on the charging pad. Accordingly, when a particular antenna zone is selected for transmitting test signals or regular power signals, a control signal is sent to the switch 295 from the RF power transmitter integrated circuit 160 to cause at least one switch 297 to close. In doing so, an RF signal from at least one power amplifier 108 can be provided to the particular antenna zone using a unique pathway created by the now-closed at least one switch 297.

In some embodiments, the switch 295 may be part of (e.g., internal to) the antenna array 290. Alternatively, in some embodiments, the switch 295 is separate from the antenna array 290 (e.g., the switch 295 may be a distinct component, or may be part of another component, such as the power amplifier(s) 108). It is noted that any switch design capable of accomplishing the above may be used, and the design of the switch 295 illustrated in FIG. 1C is merely one example.

Figure 2A:
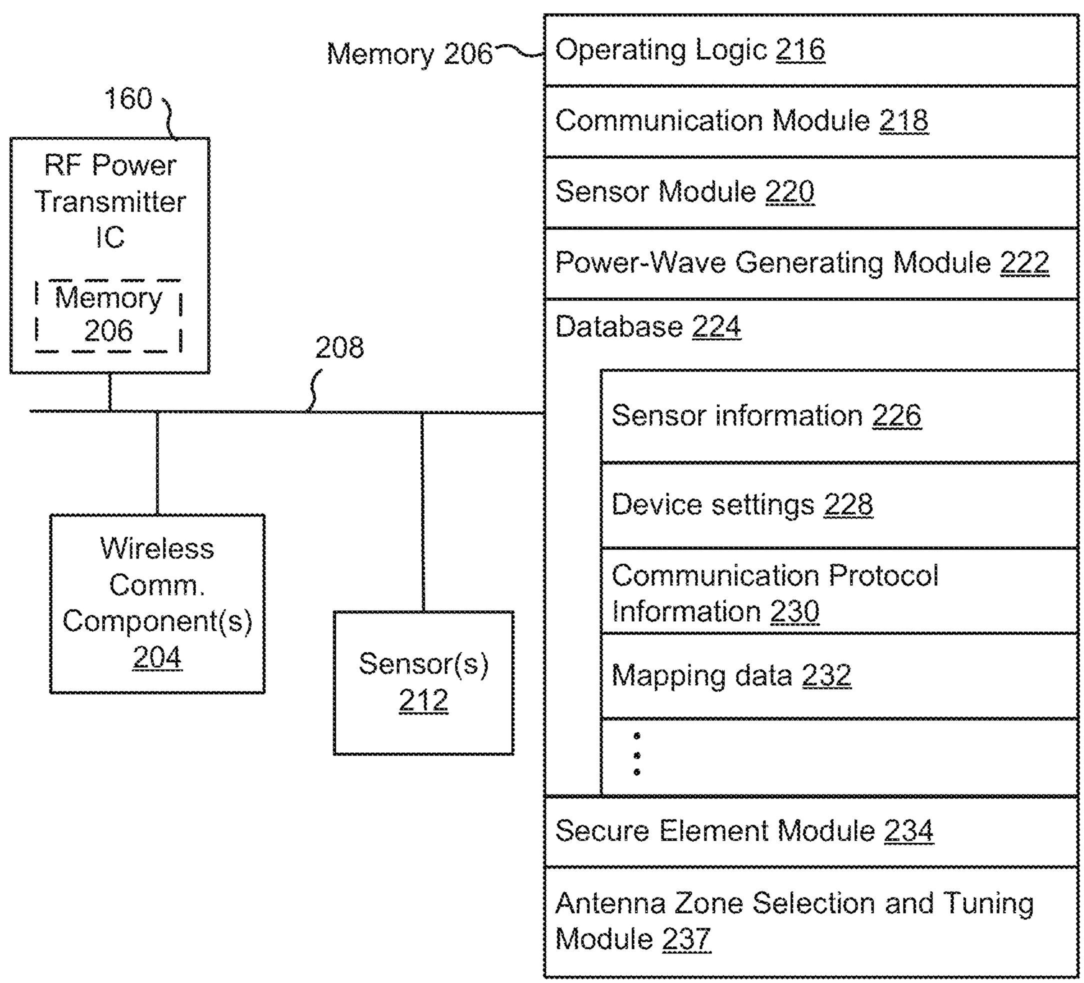
FIG. 2A is a block diagram illustrating an example RF charging pad, in accordance with some embodiments.

FIG. 2A is a block diagram illustrating certain components of an RF charging pad 100 in accordance with some embodiments. In some embodiments, the RF charging pad 100 includes an RF power transmitter IC 160 (and the components included therein, such as those described above in reference to FIGS. 1A-1B), memory 206 (which may be included as part of the RF power transmitter IC 160, such as nonvolatile memory 206 that is part of the CPU subsystem 170), and one or more communication buses 208 for interconnecting these components (sometimes called a chipset). In some embodiments, the RF charging pad 100 includes one or more sensor(s) 212 (discussed below). In some embodiments, the RF charging pad 100 includes one or more output devices such as one or more indicator lights, a sound card, a speaker, a small display for displaying textual information and error codes, etc. In some embodiments, the RF charging pad 100 includes a location detection device, such as a GPS (global positioning satellite) or other geo-location receiver, for determining the location of the RF charging pad 100.

In some embodiments, the one or more sensor(s) 212 include one or more thermal radiation sensors, ambient temperature sensors, humidity sensors, IR sensors, occupancy sensors (e.g., RFID sensors), ambient light sensors, motion detectors, accelerometers, and/or gyroscopes.

The memory 206 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 206, or alternatively the non-volatile memory within memory 206, includes a non-transitory computer-readable storage medium. In some embodiments, the memory 206, or the non-transitory computer-readable storage medium of the memory 206, stores the following programs, modules, and data structures, or a subset or superset thereof:

- Operating logic 216 including procedures for handling various basic system services and for performing hardware dependent tasks;
- Communication module 218 for coupling to and/or communicating with remote devices (e.g., remote sensors, transmitters, receivers, servers, mapping memories, etc.) in conjunction with wireless communication component(s) 204;
- Sensor module 220 for obtaining and processing sensor data (e.g., in conjunction with sensor(s) 212) to, for example, determine the presence, velocity, and/or positioning of object in the vicinity of the RF charging pad 100;
- Power-wave generating module 222 for generating and transmitting power transmission signals (e.g., in conjunction with antenna zones 290 and the antennas 210 respectively included therein), including but not limited to, forming pocket(s) of energy at given locations. Power-wave generating module 222 may also be used to modify transmission characteristics used to transmit power transmission signals by individual antenna zones; and
- Database 224, including but not limited to:
  - Sensor information 226 for storing and managing data received, detected, and/or transmitted by one or more sensors (e.g., sensors 212 and/or one or more remote sensors);
  - Device settings 228 for storing operational settings for the RF charging pad 100 and/or one or more remote devices;
  - Communication protocol information 230 for storing and managing protocol information for one or more protocols (e.g., custom or standard wireless protocols, such as ZigBee, Z-Wave, etc., and/or custom or standard wired protocols, such as Ethernet); and
  - Mapping data 232 for storing and managing mapping data (e.g., mapping one or more transmission fields);
- a secure element module 234 for determining whether a wireless power receiver is authorized to receive wirelessly delivered power from the RF charging pad 100; and
- an antenna zone selecting and tuning module 237 for coordinating a process of transmitting test power transmission signals with various antenna zones to determine which antenna zone or zones should be used to wirelessly deliver power to various wireless power receivers (as is explained in more detail below in reference to FIGS. 9A-9B, 100, and 11A-11E).

Each of the above-identified elements (e.g., modules stored in memory 206 of the RF charging pad 100) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 206, optionally, stores a subset of the modules and data structures identified above.

Figure 2B:
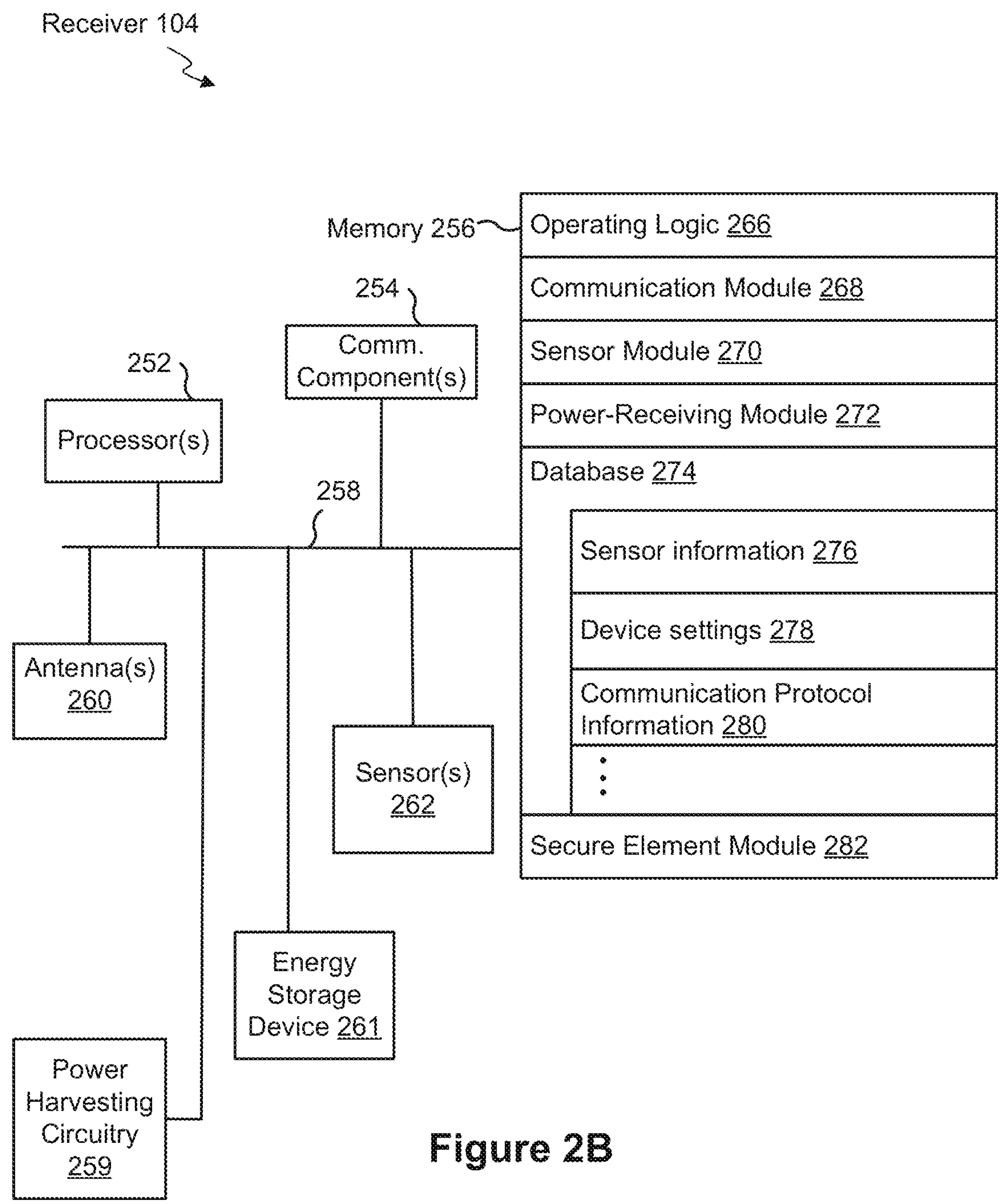
FIG. 2B is a block diagram illustrating an example receiver device, in accordance with some embodiments.

FIG. 2B is a block diagram illustrating a representative receiver device 104 (also sometimes called a receiver, power receiver, or wireless power receiver) in accordance with some embodiments. In some embodiments, the receiver device 104 includes one or more processing units (e.g., CPUs, ASICs, FPGAs, microprocessors, and the like) 252, one or more communication components 254, memory 256, antenna(s) 260, power harvesting circuitry 259, and one or more communication buses 258 for interconnecting these components (sometimes called a chipset). In some embodiments, the receiver device 104 includes one or more sensor(s) 262 such as the one or sensors 212 described above with reference to FIG. 2A. In some embodiments, the receiver device 104 includes an energy storage device 261 for storing energy harvested via the power harvesting circuitry 259. In various embodiments, the energy storage device 261 includes one or more batteries, one or more capacitors, one or more inductors, and the like.

In some embodiments, the power harvesting circuitry 259 includes one or more rectifying circuits and/or one or more power converters. In some embodiments, the power harvesting circuitry 259 includes one or more components (e.g., a power converter) configured to convert energy from power waves and/or energy pockets to electrical energy (e.g., electricity). In some embodiments, the power harvesting circuitry 259 is further configured to supply power to a coupled electronic device, such as a laptop or phone. In some embodiments, supplying power to a coupled electronic device include translating electrical energy from an AC form to a DC form (e.g., usable by the electronic device).

In some embodiments, the antenna(s) 260 include one or more of the meandering line antennas that are described in further detail below.

In some embodiments, the receiver device 104 includes one or more output devices such as one or more indicator lights, a sound card, a speaker, a small display for displaying textual information and error codes, etc. In some embodiments, the receiver device 104 includes a location detection device, such as a GPS (global positioning satellite) or other geo-location receiver, for determining the location of the receiver device 103.

In various embodiments, the one or more sensor(s) 262 include one or more thermal radiation sensors, ambient temperature sensors, humidity sensors, IR sensors, occupancy sensors (e.g., RFID sensors), ambient light sensors, motion detectors, accelerometers, and/or gyroscopes.

The communication component(s) 254 enable communication between the receiver 104 and one or more communication networks. In some embodiments, the communication component(s) 254 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

The communication component(s) 254 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 256 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 256, or alternatively the non-volatile memory within memory 256, includes a non-transitory computer-readable storage medium. In some embodiments, the memory 256, or the non-transitory computer-readable storage medium of the memory 256, stores the following programs, modules, and data structures, or a subset or superset thereof:

- Operating logic 266 including procedures for handling various basic system services and for performing hardware dependent tasks;
- Communication module 268 for coupling to and/or communicating with remote devices (e.g., remote sensors, transmitters, receivers, servers, mapping memories, etc.) in conjunction with communication component(s) 254;
- Sensor module 270 for obtaining and processing sensor data (e.g., in conjunction with sensor(s) 262) to, for example, determine the presence, velocity, and/or positioning of the receiver 103, a RF charging pad 100, or an object in the vicinity of the receiver 103;
- Wireless power-receiving module 272 for receiving (e.g., in conjunction with antenna(s) 260 and/or power harvesting circuitry 259) energy from power waves and/or energy pockets; optionally converting (e.g., in conjunction with power harvesting circuitry 259) the energy (e.g., to direct current); transferring the energy to a coupled electronic device; and optionally storing the energy (e.g., in conjunction with energy storage device 261); and
- Database 274, including but not limited to:
  - Sensor information 276 for storing and managing data received, detected, and/or transmitted by one or more sensors (e.g., sensors 262 and/or one or more remote sensors);
  - Device settings 278 for storing operational settings for the receiver 103, a coupled electronic device, and/or one or more remote devices; and
  - Communication protocol information 280 for storing and managing protocol information for one or more protocols (e.g., custom or standard wireless protocols, such as ZigBee, Z-Wave, etc., and/or custom or standard wired protocols, such as Ethernet); and
- a secure element module 282 for providing identification information to the RF charging pad 100 (e.g., the RF charging pad 100 uses the identification information to determine if the wireless power receiver 104 is authorized to receive wirelessly delivered power).

Each of the above-identified elements (e.g., modules stored in memory 256 of the receiver 104) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 256, optionally, stores a subset of the modules and data structures identified above. Furthermore, the memory 256, optionally, stores additional modules and data structures not described above, such as an identifying module for identifying a device type of a connected device (e.g., a device type for an electronic device that is coupled with the receiver 104).

Turning now to FIGS. 3A through 8, embodiments of the RF charging pad 100 are shown that include a component for modifying impedance values (e.g., a load pick) at various antennas of the RF charging pad 100, and descriptions of antennas that include a conductive line forming a meandering line pattern are also provided in reference to these figures.

Figure 3A:
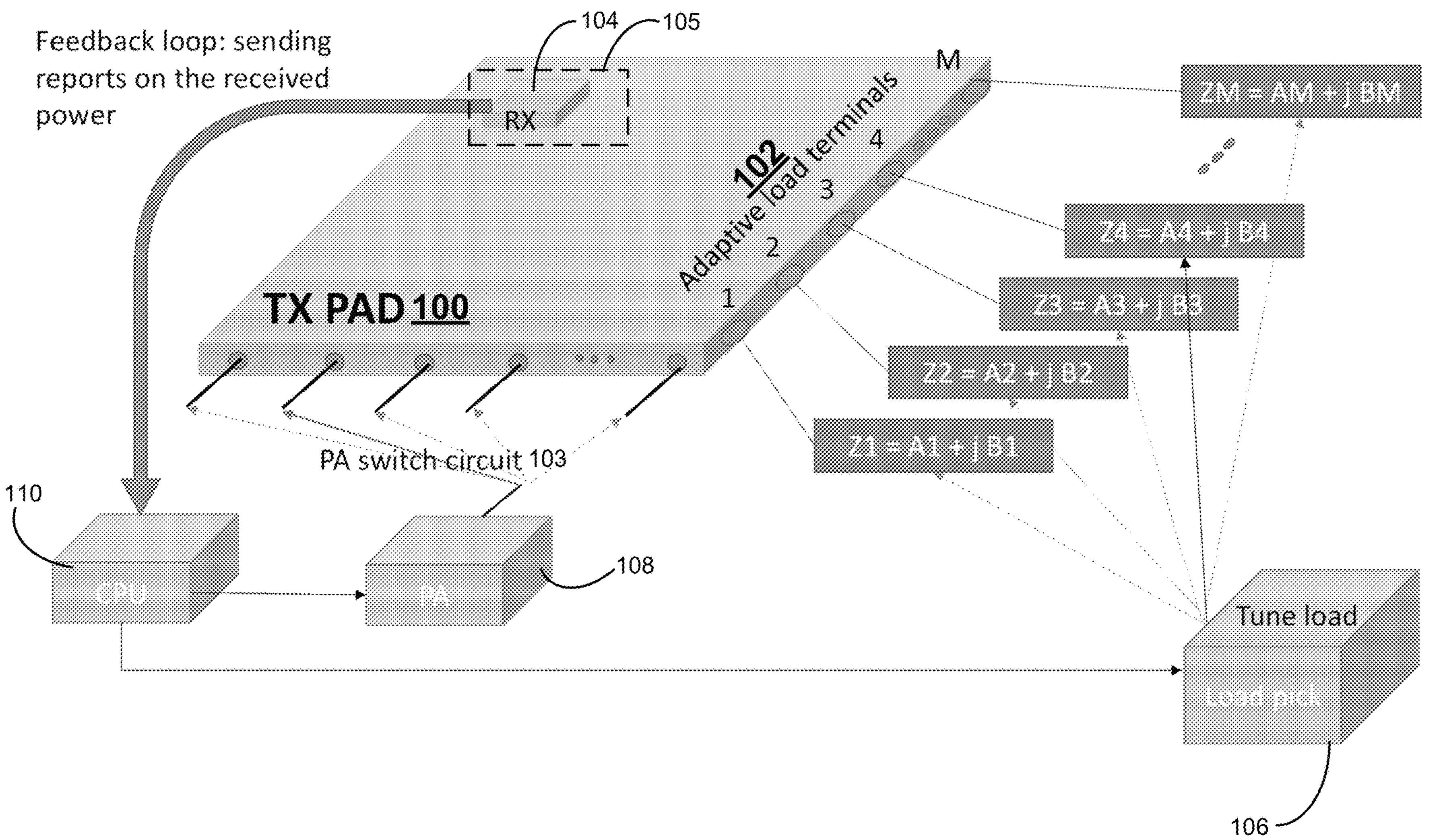
FIG. 3A is a high-level block diagram of an RF charging pad, in accordance with some embodiments.

As shown in FIG. 3A, some embodiments include an RF charging pad 100 that includes a load pick 106 to allow for modifying impedance values at various antennas of the RF charging pad 100. In some embodiments, the RF charging pad 100 includes one or more antenna elements that are each powered/fed by a respective power amplifier switch circuit 103 at a first end and a respective adaptive load terminal 102 at a second end (additional details and descriptions of the one or more antenna elements are provided below in reference to FIGS. 3B-3C).

In some embodiments, the RF charging pad 100 also includes (or is in communication with) a central processing unit 110 (also referred to here as processor 110). In some embodiments, the processor 110 is a component of a single integrated circuit that is responsible for managing operations of the RF charging pad 100, such as the CPU 202 illustrated in FIG. 1B and included as a component of the RF power transmitter integrated circuit 160. In some embodiments, the processor 110 is configured to control RF signal frequencies and to control impedance values at each of the adaptive load terminals 102 (e.g., by communicating with the load pick or adaptive load 106, which may be an application-specific integrated circuit (ASIC), or a variable resister, to generate various impedance values). In some embodiments, the load pick 106 is an electromechanical switch that is placed in either an open or shorted state.

In some embodiments, an electronic device (e.g., a device that includes a receiver 104 as an internally or externally connected component, such as a remote that is placed on top of a charging pad 100 that may be integrated within a housing of a streaming media device or a projector) and uses energy transferred from one or more RF antenna elements of the charging pad 100 to the receiver 104 to charge a battery and/or to directly power the electronic device.

In some embodiments, the RF charging pad 100 is configured with more than one input terminal for receiving power (from power amplifier (PA) 108, FIG. 3A) and more than one output or adaptive load terminal 102. In some embodiments, the adaptive load terminals 102 at a particular zone of the RF charging pad 100 (e.g., a zone that includes antenna elements located underneath a position at which an electronic device (with an internally or externally connected RF receiver 104) to be charged is placed on the charging pad) are optimized in order to maximize power received by the receiver 104. For example, the CPU 110 upon receiving an indication that an electronic device with an internally or externally connected RF receiver 104 has been placed on the pad 100 in a particular zone 105 (the zone 105 includes a set of antenna elements) may adapt the set of antenna elements to maximize power transferred to the RF receiver 104. Adapting the set of antenna elements may include the CPU 110 commanding load pick 106 to try various impedance values for adaptive load terminals 102 that are associated with the set of antenna elements. For example, the impedance value for a particular conductive line at an antenna element is given by the complex value of Z=A+jB (where A is the real part of the impedance value and B is the imaginary part, e.g., 0+j0, 1000+j0, 0+50j, or 25+j75, etc.), and the load pick adjusts the impedance value to maximize the amount of energy transferred from the set of antenna elements to the RF receiver 104. In some embodiments, adapting the set of antenna elements also or alternatively includes the CPU 110 causing the set of antenna elements to transmit RF signals at various frequencies until a frequency is found at which a maximum amount of energy is transferred to the RF receiver 104. In some embodiments, adjusting the impedance value and/or the frequencies at which the set of antenna elements transmits causes changes to the amount of energy transferred to the RF receiver 104. In this way, the amount of energy transferred to the RF receiver 104 is maximized (e.g., to transfer at least 75% of the energy transmitted by antenna elements of the pad 100 to the receiver 104, and in some embodiments, adjusting the impedance value and/frequencies may allow up to 98% of the energy transmitted to be received by the receiver 104) may be received at any particular point on the pad 100 at which the RF receiver 104 might be placed.

In some embodiments, the input circuit that includes the power amplifier 108 can additionally include a device that can change frequencies of the input signal, or a device that can operate at multiple frequencies at the same time, such as an oscillator or a frequency modulator.

In some embodiments, the CPU 110 determines that a maximum amount of energy is being transferred to the RF receiver 104 when the amount of energy transferred to the RF receiver 104 crosses a predetermined threshold (e.g., 75% or more of transmitted energy is received, such as up to 98%) or by testing transmissions with a number of impedance and/or frequency values and then selecting the combination of impedance and frequency that results in maximum energy being transferred to the RF receiver 104 (as described in reference to the adaptation scheme below).

In some embodiments, an adaptation scheme is employed to adaptively adjust the impedance values and/or frequencies of the RF signal(s) emitted from the RF antenna(s) 120 of the charging pad 100, in order to determine which combinations of frequency and impedance result in maximum energy transfer to the RF receiver 104. For example, the processor 110 that is connected to the charging pad 100 tries different frequencies (i.e., in the allowed operating frequency range or ranges) at a given location of the RF charging pad 100 (e.g., a zone or area of the RF charging pad 100 that includes one or more RF antenna elements for transmitting RF signals, such as zone 105 of FIG. 3A) to attempt to adaptively optimize for better performance. For example, a simple optimization either opens/disconnects or closes/shorts each load terminal to ground (in embodiments in which a relay is used to switch between these states), and may also cause RF antennas within the zone to transmit at various frequencies. In some embodiments, for each combination of relay state (open or shorted) and frequency, the energy transferred to the receiver 104 is monitored and compared to energy transferred when using other combinations. The combination that results in maximum energy transfer to the receiver 104 is selected and used to continue to transmitting the one or more RF signals to the receiver 104. In some embodiments, the adaptation scheme described above is performed as a part of the methods described below in reference to FIGS. 9A-9B, 10, and 11A-11E to help maximize an amount of energy transferred by the RF charging pad 100 to the receiver 104.

As another example, if five frequencies in the ISM band are utilized by the pad 100 for transmitting radio frequency waves and the load pick 106 is an electromechanical relay for switching between open and shorted states, then employing the adaptation scheme would involve trying 10 combinations of frequencies and impedance values for each antenna element 120 or for a zone of antenna elements 120 and selecting the combination that results in best performance (i.e., results in most power received at receiver 104, or most power transferred from the pad 100 to the RF receiver 104).

The industrial, scientific, and medical radio bands (ISM bands) refers to a group of radio bands or parts of the radio spectrum that are internationally reserved for the use of radio frequency (RF) energy intended for scientific, medical and industrial requirements rather than for communications. In some embodiments, all ISM bands (e.g., 40 MHz, 900 MHz, 2.4 GHz, 5.8 GHz, 24 GHz, 60 GHz, 122 GHz, and 245 GHz) may be employed as part of the adaptation scheme. As one specific example, if the charging pad 100 is operating in the 5.8 GHz band, then employing the adaptation scheme would include transmitting RF signals and then adjusting the frequency at predetermined increments (e.g., 50 MHz increments, so frequencies of 5.75 GHz, 5.755 GHz, 5.76 GHz, and so on). In some embodiments, the predetermined increments may be 5, 10 15, 20, 50 MHz increments, or any other suitable increment.

In some embodiments, the antenna elements 120 of the pad 100 may be configured to operate in two distinct frequency bands, e.g., a first frequency band with a center frequency of 915 MHz and a second frequency band with a center frequency of 5.8 GHz. In these embodiments, employing the adaptation scheme may include transmitting RF signals and then adjusting the frequency at first predetermined increments until a first threshold value is reached for the first frequency band and then adjusting the frequency at second predetermined increments (which may or may not be the same as the first predetermined increments) until a second threshold value is reached for the second frequency band. For example, the antenna elements 120 may be configured to transmit at 902 MHz, 915 MHz, 928 MHZ (in the first frequency band) and then at 5.795 GHz, 5.8 GHz, and 5.805 GHz (in the second frequency band). Additional details regarding antenna elements that are capable of operating at multiple frequencies are provided below in reference to FIGS. 14A-14D and 15.

Figure 3B:
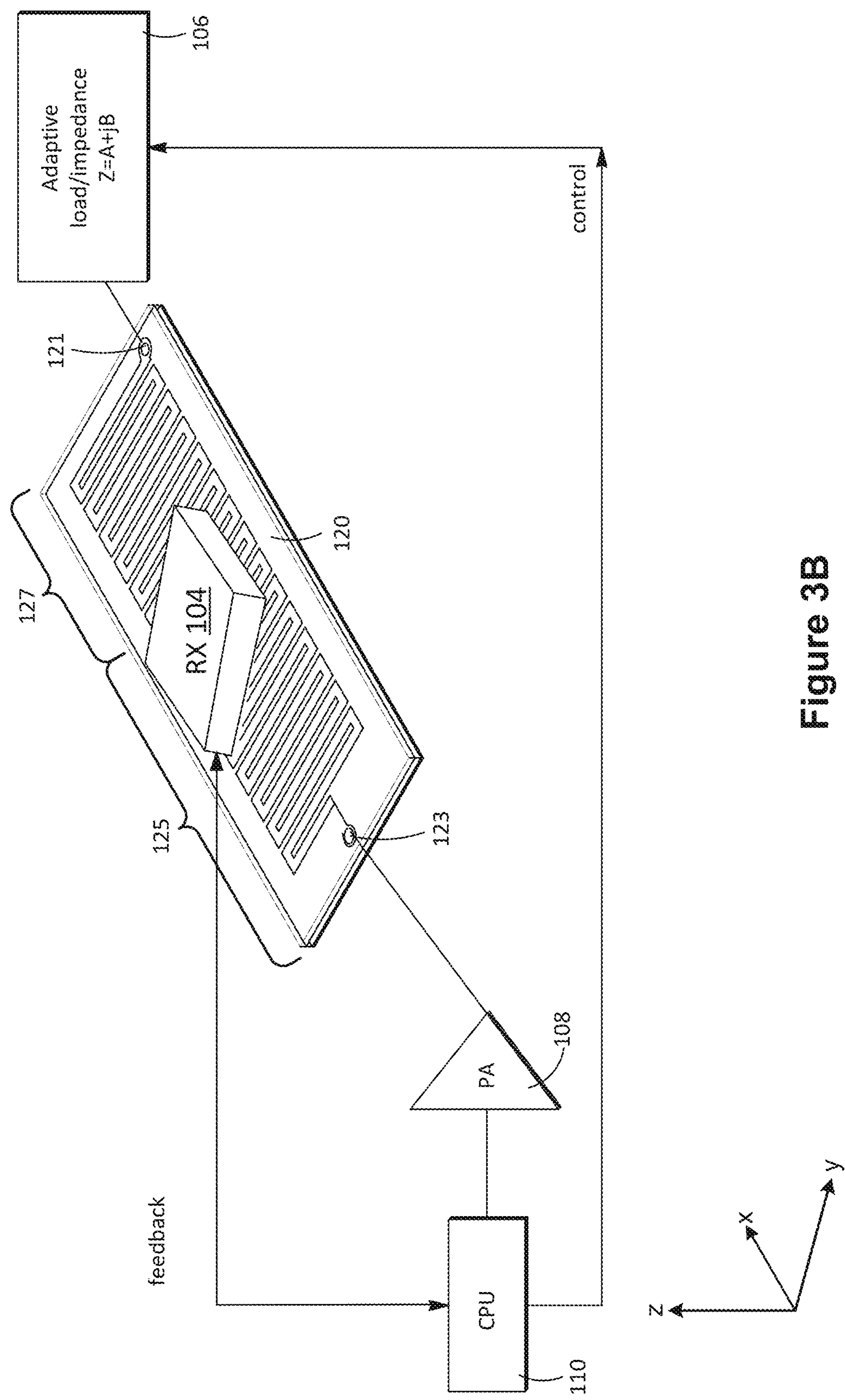
FIGS. 3B-3C are high-level block diagrams showing a portion of an RF charging pad, in accordance with some embodiments.
Figure 3C:
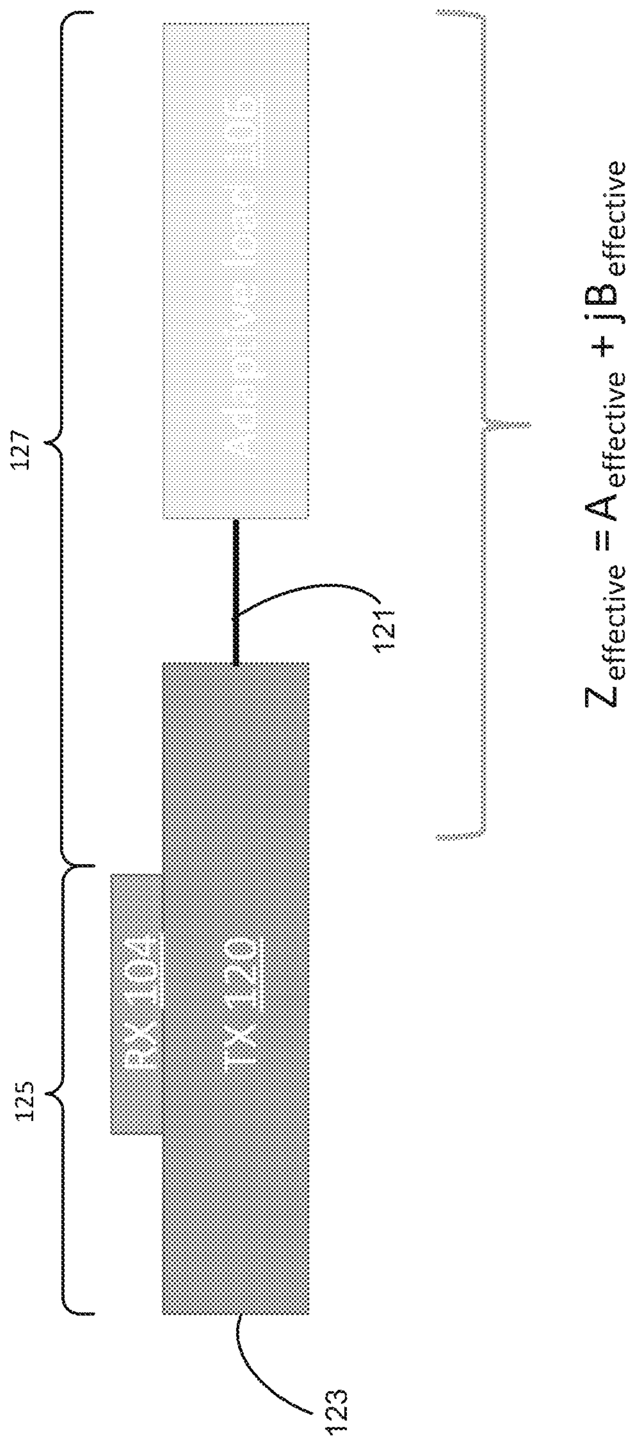

Turning now to FIGS. 3B-3C, high-level block diagrams showing a portion of an RF charging pad are illustrated, in accordance with some embodiments.

FIG. 3B shows a schematic of a single TX antenna 120 (which may be a part of an antenna zone that includes one or an array of such antennas 120, all forming the charging pad 100 that is shown in FIG. 3A). In some embodiments, the TX antenna 120 is also referred to as a TX antenna element 120. In some circumstances, an RF receiving unit/antenna (RX) (or a device that includes the receiving unit 104 as an internally or externally connected component) is placed on top of a portion of the pad 100 that includes the TX antenna 120 (which includes a conductive line that forms a meandered line arrangement, as shown in FIG. 3B).

In some embodiments, the receiver 104 has no direct contact to a metallic conductive line of the single TX antenna 120 and is just coupled (i.e. in near-field zone) to the TX antenna 120.

In some embodiments, the TX antenna 120 has two or more terminals (or ports) that are labeled as 121 (which may be a respective one of the terminals 102 of FIG. 3A) and 123 (which may be connected to a respective one of the PA switch circuits 103 of FIG. 3A) in FIG. 3B. In some embodiments, the source of power (from the power amplifier or PA) is connected to terminal 123 and an adaptive load (e.g., an electromechanical switch or ASIC) is connected to terminal 121. In some embodiments, the adaptive load is formed generally as a complex impedance which may have both real and imaginary parts (i.e., a complex adaptive load can be formed using active devices (e.g., integrated circuits or chips made of transistors) or passive devices formed by inductors/capacitors and resistors). In some embodiments, the complex impedance is given by the formula Z=A+jB (e.g., 0+j0, 100+j0, 0+50j, and etc.), as discussed above.

In some embodiments, the receiver 104 may also be considered as a third terminal. To eliminate wasted energy, the receiver 104 should be configured to absorb a maximum amount (e.g., 75% or more, such as 98%) of the induced power that travels from terminal 123 and towards terminal 121. In some embodiments, processor 110 is connected to the receiver 104 through a feedback loop (e.g., by exchanging messages using a short-range communication protocol, such by BLUETOOTH low energy (BLE) to exchange messages). In some alternative embodiments, the feedback loop from the receiver back to the CPU at the transmitter may utilize a same frequency band as the power transmission signals transmitted by the pad 100, rather than using a separate communication protocol and/or a different frequency band.

In some embodiments, the feedback loop and messages exchanged may be used to indicate an amount of energy received or alternatively or additionally may indicate an increase or decrease in the amount of energy received as compared to previous measurements. In some embodiments, the processor 110 monitors the amount of energy received by the receiver 104 at certain points in time and controls/optimizes the adaptive load to maximize the power transferred from terminal 123 to terminal 121. In some embodiments, monitoring the amount of energy transferred includes one or both of (i) receiving information from the receiver 104 (or a component of an electronic device in which the receiver 104 is located) that indicates an amount of energy received by the receiver 104 at a certain point in time and (ii) monitoring an amount of energy that remains in the conductive line at terminal 121 (instead of having been absorbed by the receiver 104). In some embodiments, both of these monitoring techniques are utilized while, in other embodiments, one or the other of these monitoring techniques is utilized.

In some embodiments, the receiver 104 (i.e., an electronic device that includes the receiver 104 as an internally or externally connected component) may be placed anywhere on top of the charging pad 100 (i.e., partially or fully covering the conductive line that forms a meandered pattern on a respective antenna element 120) and the processor 110 will continue to monitor the amount of energy transferred and make needed adjustments (e.g., to impedance and/or frequency) to maximize the energy transferred to the receiver 104.

To help illustrate operation of the charging pad 100 and the antenna elements 120 included therein, the transmitting antenna element 120 shown in FIG. 3B is divided into two sections: 1) section 125 starts at the terminal 123 of the antenna element 120 and extends to an edge of the receiver 104; and 2) section 127 is formed by the rest of the transmitting antenna element 120 and the terminal 121. The blocks are described in more detail below with respect to FIG. 3C. It should be understood that sections 125 and 127 are functional representations used for illustrative purposes, and they are not intended to designate a specific implementation that partitions an antenna element into separate sections.

Turning now to FIG. 3C, a block diagram of the TX antenna 120 is shown. In some embodiments, an effective impedance value ($Z_{effective}$), starting from a point that divides sections 125 and 127 and ending at the TX antenna 120's connection to the adaptive load 106 (e.g., terminal 121) will change based on location of the receiver 104 on the TX antenna 120 and based on a selected load provided by adaptive load 106 at the terminal 121. In some embodiments, the selected load is optimized by the adaptive load 106 (in conjunction with the processor 110, FIG. 3A) to tune $Z_{effective}$ in such a way that the energy transferred between terminal 123 and the receiver 104 reaches a maximum (e.g., 75% or more of energy transmitted by antenna elements of the pad 100 is received by the RF receiver 104, such as 98%), while energy transfer may also stay at a minimum from terminal 123 to terminal 121 (e.g., less than 25% of energy transmitted by antenna elements of the pad 100 is not received by the RF receiver 104 and ends up reaching terminal 121 or ends up being reflected back, including as little as 2%).

In embodiments in which an electromechanical switch (e.g., a mechanical relay) is used to switch between open and shorted states, moving the switch from the open to the shorted state (e.g., shorted to a ground plane) for a particular antenna element 120 causes the impedance value, $Z_{effective}$, at a respective terminal 121 for that particular antenna element 120 to drop to a value close to 0 (alternatively, switching from the shorted to the open state causes the impedance value to jump close to a value close to infinity). In some embodiments, the frequency adaptation scheme discussed above in reference to FIG. 3A is employed to test various combinations of impedance values and RF signal frequencies, in order to maximize energy transferred to an RF receiver (e.g., receiver 104, FIGS. 3A-3C). In some embodiments, an integrated circuit (IC or chip) may be used instead of an electromechanical switch as the adaptive load 106. In such embodiments, the adaptive load 106 is configured to adjust the impedance value along a range of values, such as between 0 and infinity. In some embodiments, the IC may be formed by adaptive/reconfigurable RF active and/or passive elements (e.g., transistors and transmission lines) that are controlled by firmware of the IC (and/or firmware executing on the CPU 110 that controls operation of the IC). In some embodiments, the impedance produced by the IC, and controlled through firmware and based on information from the feedback loop (discussed above in reference to FIG. 3A), may be changed to cover any load values selected from a Smith Chart (or the IC may be designed to produce certain loads covering a portion of values form the Smith Chart). In some embodiments, this IC is distinct from the RF power transmitter integrated circuit 160 (FIG. 1B) that is used to manage overall operation of the pad 100, and this other IC is also in communication with the RF power transmitter integrated circuit 160 to allow the circuit 160 to control adjustments to impedance values. A Smith Chart may be sampled and stored in a memory (e.g., as a lookup table) that is accessible by the processor 110, and the processor 110 may perform lookups using the stored Smith Chart to determine various impedance values to test. For example, the integrated circuit may be configured to select a predetermined number of complex values (e.g., 5j to 10j, 100+0j, or 0+50j, etc.) for the impedance value to test in combination with various RF transmission frequencies, in order to locate a combination of values that optimizes energy transferred to the receiver 104 (examples of maximized energy transfer are discussed above).

In some other embodiments, a transmitter or charging pad with more than one antenna elements 120 of FIG. 1B with one adaptive load 106 may be configured to operate in two or more distinct frequency bands respectively at the same time. For example, a first antenna element operates at a first frequency or frequency band, a second antenna element operates at a second frequency or frequency band, and a third antenna element operates at a third frequency or frequency band, and a fourth antenna element operates at a fourth frequency or frequency band, and the four frequency bands are distinct from each other. A transmitter with two or more antenna elements 120 therefore can be used as a multi-band transmitter.

Figure 3D:
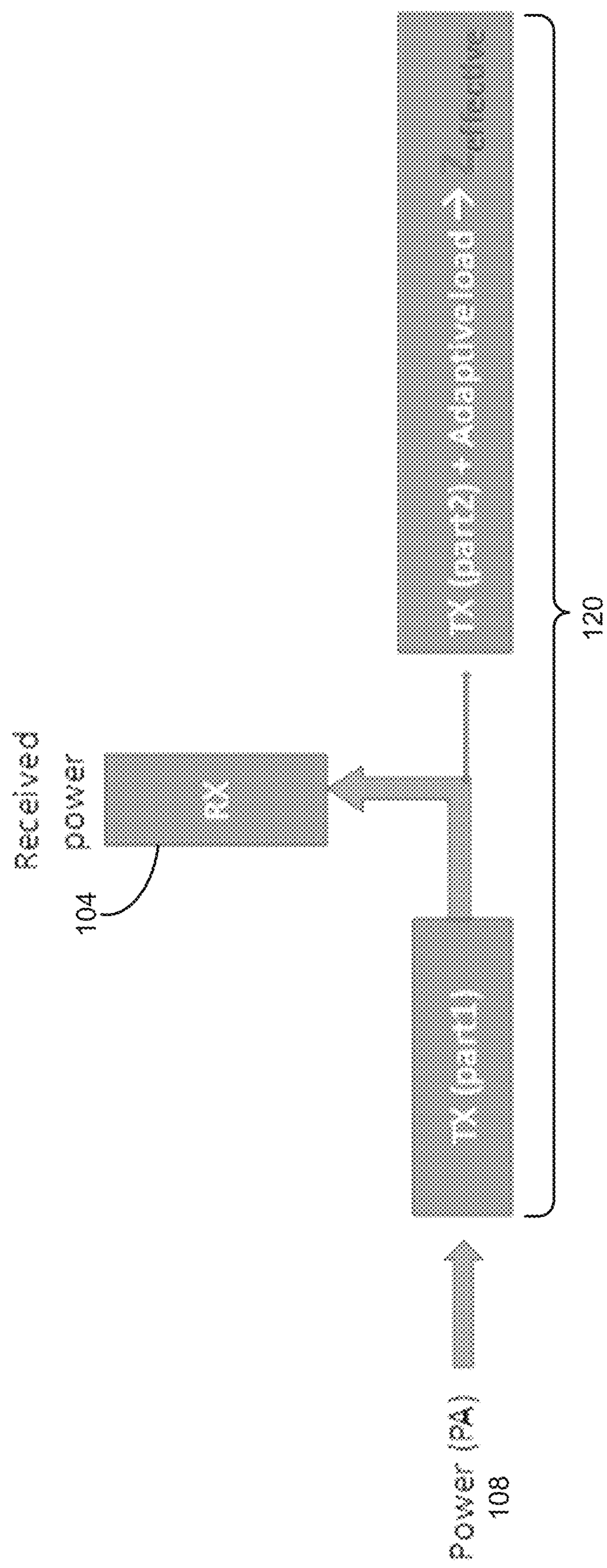
FIG. 3D is a block diagram of a simplified circuit that illustrates energy flow within sections of an antenna element that is transmitting an RF signal, in accordance with some embodiments.

FIG. 3D is a block diagram of a simplified circuit that illustrates energy flow within sections of an antenna element that is transmitting an RF signal, in accordance with some embodiments. The references to part1 and part2 in FIG. 3D refer to sections illustrated in FIGS. 3B and 3C, in particular, part1 corresponds to section 125 and part2 corresponds to section 127.

As shown in FIG. 3D, the effective impedance ($Z_{effective}$) for a transmitting antenna element 120 is formed by the portion of the conductive line that is after the receiver 104 (which, in some embodiments, forms a meandered line pattern as discussed in more detail below) and the adaptive load (labelled to as section 127 in FIGS. 3B and 3C). In some embodiments, by optimizing, the load $Z_{effective}$ will be tuned so the energy transferred from PA to the receiver 104 is maximized; and, the energy remaining in the conductive line by the time it reaches the adaptive load is minimized (as discussed above).

Figure 4:
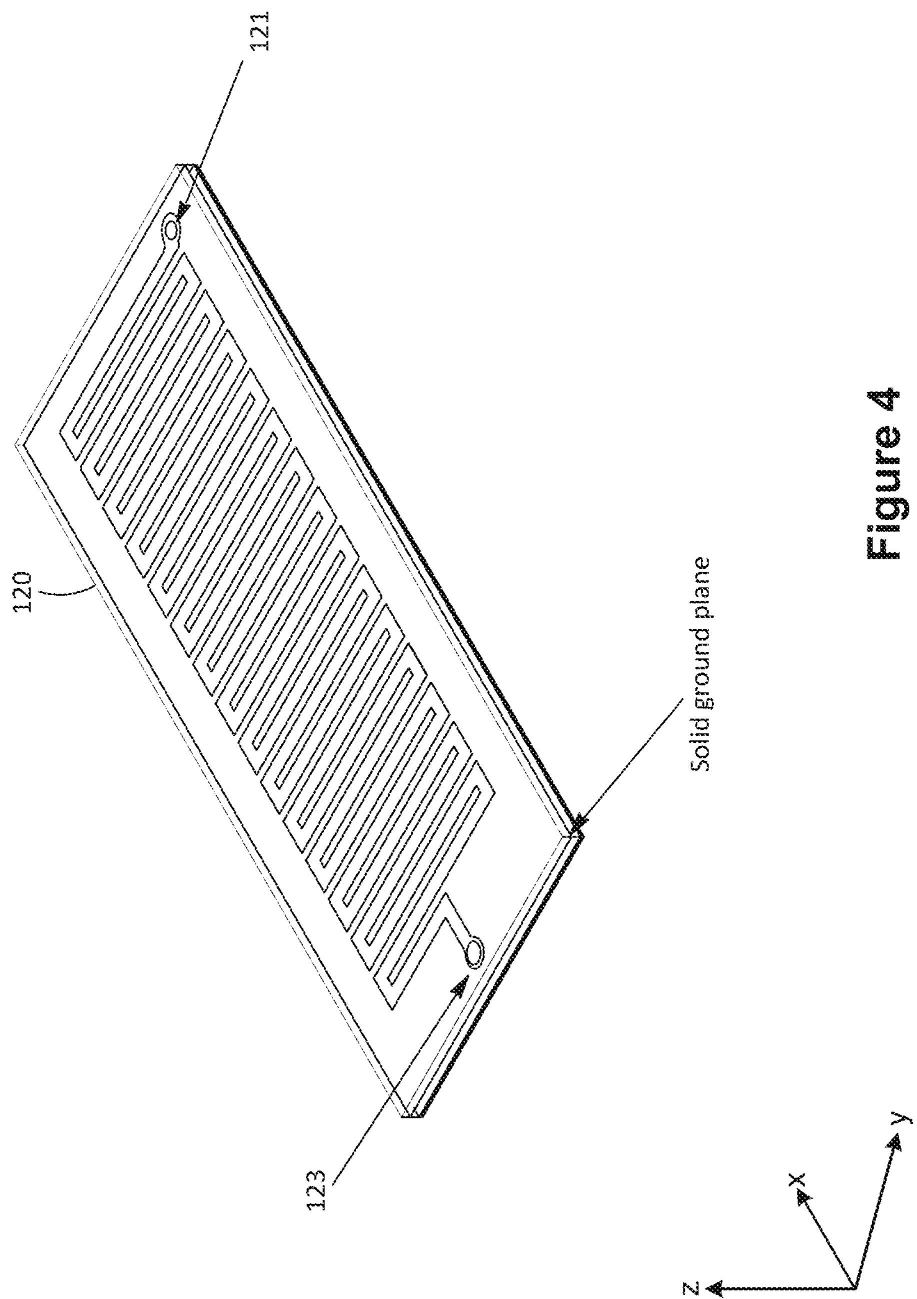
FIG. 4 is a schematic of a transmitting antenna element with two terminals, in accordance with some embodiments.

FIG. 4 is a schematic of an antenna element with two terminals, in accordance with some embodiments. As shown in FIG. 4, an input or first terminal of the antenna element 120 (also described as terminal 123 in reference to FIGS. 3B-3D above) is connected with a power amplifier 108 and an output or second terminal (also described as terminal 121 in reference to FIGS. 3B-3D above) is connected with a load pick 106 that allows for configuring an adaptive load. Stated another way, in some embodiments, the antenna element 120 is fed by the power amplifier 108 from the first terminal and the antenna element 120 is also terminated at a second terminal at an adaptive load (for example, the mechanical relay that switches between shorted and open states).

In some embodiments, the charging pad 100 (FIG. 3A) is made of single-layer or multi-layer copper antenna elements 120 with conductive lines that form a meandered line pattern. In some embodiments, each of these layers has a solid ground plane as one of its layers (e.g., a bottom layer). One example of a solid ground plane is shown and labelled for the transmitting antenna element shown in FIG. 4.

In some embodiments, the RF charging pad 100 (and individual antenna elements 120 included therein) is embedded in a consumer electronic device, such as a projector, a laptop, or a digital media player (such as a networked streaming media player, e.g. a ROKU device, that is connected to a television for viewing streaming television shows and other content). For example, by embedding the RF charging pad 100 in a consumer electronic device, a user is able to simply place a peripheral device, such as a remote for a projector or a streaming media player (e.g., the remote for the projector or streaming media player includes a respective receiver 104, such as the example structures for a receiver 104 shown in FIGS. 7A-7D), on top of the projector or the streaming media player and the charging pad 100 included therein will be able to transmit energy to a receiver 104 that is internally or externally connected to the remote, which energy is then harvested by the receiver 104 for charging of the remote.

In some embodiments, the RF charging pad 100 may be included in a USB dongle as a standalone charging device on which a device to be charged is placed. In some embodiments, the antenna elements 120 may be placed near a top surface, side surfaces, and/or a bottom surface of the USB dongle, so that a device to be charged may be placed at various positions that contact the USB dongle (e.g., a headphone that is being charged might sit on top of, underneath, or hang over the USB dongle and would still be able to receive RF transmissions from the embedded RF charging pad 100).

In some embodiments, the RF charging pad 100 is integrated into furniture, such as desks, chairs, countertops, etc., thus allowing users to easily charge their devices (e.g., devices that includes respective receivers 104 as internally or externally connected components) by simply placing them on top of a surface that includes an integrated RF charging pad 100.

Figure 5:
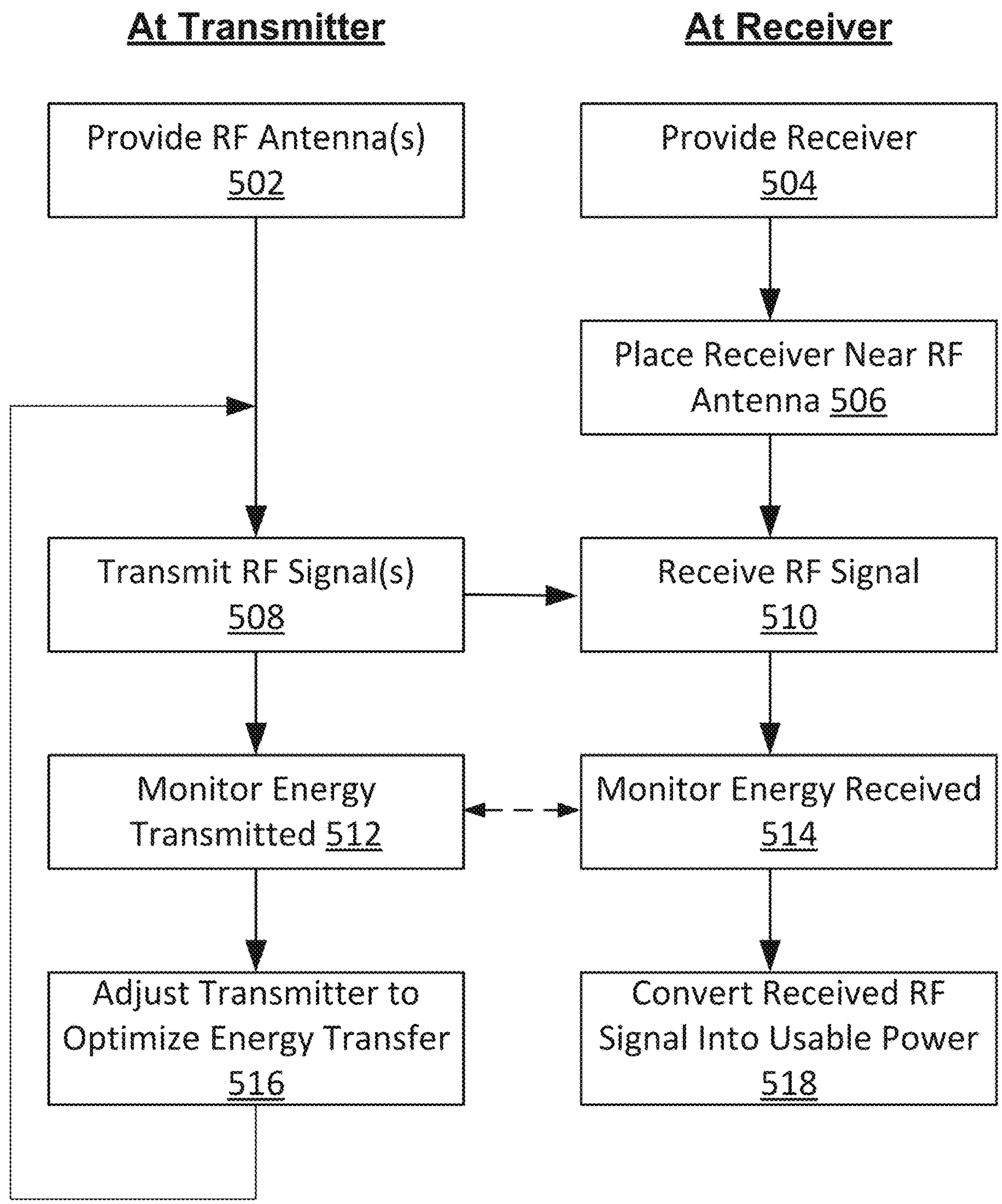
FIG. 5 is a flow chart of a method of charging an electronic device through radio frequency (RF) power transmission.

Turning now to FIG. 5, a flowchart of a method 500 of charging an electronic device through radio frequency (RF) power transmission is provided. Initially, a transmitter is provided 502 that includes at least one RF antenna (e.g., antenna element 120, FIGS. 3B-3D and 4) for transmitting one or more RF signals or waves, i.e., an antenna designed to and capable of transmitting RF electromagnetic waves. In some embodiments, an array of RF antenna elements 120 are arranged adjacent to one another in a single plane, in a stack, or in a combination of thereof, thus forming an RF charging pad 100. In some embodiments, the RF antenna elements 120 each include an antenna input terminal (e.g., the first terminal 123 discussed above in reference to FIG. 4) and an antenna output terminal (e.g., the second terminal 121 discussed above in reference to FIG. 4).

In some embodiments, a receiver (e.g., receiver 104, FIGS. 3A-3D) is also provided 504. The receiver also includes one or more RF antennas for receiving RF signals 310. In some embodiments, the receiver includes at least one rectenna that converts 318 the one or more RF signals into usable power to charge a device that includes the receiver 104 as an internally or externally connected component. In use, the receiver 104 is placed 506 within a near-field radio frequency distance to the at least one antenna. For example, the receiver may be placed on top of the at least one RF antenna or on top of a surface that is adjacent to the at least one RF antenna, such as a surface of a charging pad 100.

One or more RF signals are then transmitted 508 via at the least one RF antenna. The system is then monitored 512/514 to determine the amount of energy that is transferred via the one or more RF signals from the at least one antenna to a RF receiver (as is also discussed above). In some embodiments, this monitoring 512 occurs at the transmitter, while in other embodiments the monitoring 514 occurs at the receiver which sends data back to the transmitter via a back channel (e.g., over a wireless data connection using WIFI or BLUETOOTH). In some embodiments, the transmitter and the receiver exchange messages via the back channel, and these messages may indicate energy transmitted and/or received, in order to inform the adjustments made at step 516.

In some embodiments, a characteristic of the transmitter is adaptively adjusted at step 516 to attempt to optimize the amount of energy that is transferred from the at least one RF antenna to the receiver. In some embodiments, this characteristic is a frequency of the one or more RF signals and/or an impedance of the transmitter. In some embodiments, the impedance of the transmitter is the impedance of the adjustable load. Also in some embodiments, the at least one processor is also configured to control the impedance of the adaptive load. Additional details and examples regarding impedance and frequency adjustments are provided above.

In some embodiments, the transmitter includes a power input configured to be electrically coupled to a power source, and at least one processor (e.g., processor 110, FIGS. 3A-3B) configured to control at least one electrical signal sent to the antenna. In some embodiments, the at least one processor is also configured to control the frequency of the at least one signal sent to the antenna.

In some embodiments, the transmitter further comprises a power amplifier electrically coupled between the power input and the antenna input terminal (e.g., PA 108, FIGS. 3A, 3B, 3D, and 4). Some embodiments also include an adaptive load electrically coupled to the antenna output terminal (e.g., terminal 121, FIGS. 3A-3C and 4). In some embodiments, the at least one processor dynamically adjusts the impedance of the adaptive load based on the monitored amount of energy that is transferred from the at least one antenna to the RF receiver. In some embodiments, the at least one processor simultaneously controls the frequency of the at least one signal sent to the antenna.

In some embodiments, each RF antenna of the transmitter includes: a conductive line forming a meandered line pattern, a first terminal (e.g., terminal 123) at a first end of the conductive line for receiving current that flows through the conductive line at a frequency controlled by one or more processors, and a second terminal (e.g., terminal 121), distinct from the first terminal, at a second end of the conductive line, the second terminal coupled to a component (e.g., adaptive load 106) controlled by the one or more processors and that allows for modifying an impedance value of the conductive line. In some embodiments, the conductive line is disposed on or within a first antenna layer of a multi-layered substrate. Also in some embodiments, a second antenna is disposed on or within a second antenna layer of the multi-layered substrate. Finally, some embodiments also provide a ground plane disposed on or within a ground plane layer of the multi-layered substrate.

In some embodiments, the method described above in reference to FIG. 5 is performed in conjunction with the methods described below in reference to FIGS. 9A-9B, 10, and 11A-11E. For example, the operations of modifying/adjusting impedance values are performed after determining which antenna zones (the "determined antenna zones") to use for transmitting wireless power to a receiver, and then impedance values at the determined antenna zones are adjusted to ensure that a maximum amount of power is transferred wirelessly to the receiver by antennas within the determined antenna zones.

FIGS. 6A-6E are schematics showing various configurations for individual antenna elements within an RF charging pad, in accordance with some embodiments. As shown in FIGS. 6A-6E, an RF charging pad 100 (FIG. 3A) may include antenna elements 120 that are made using different structures.

Figure 6A:
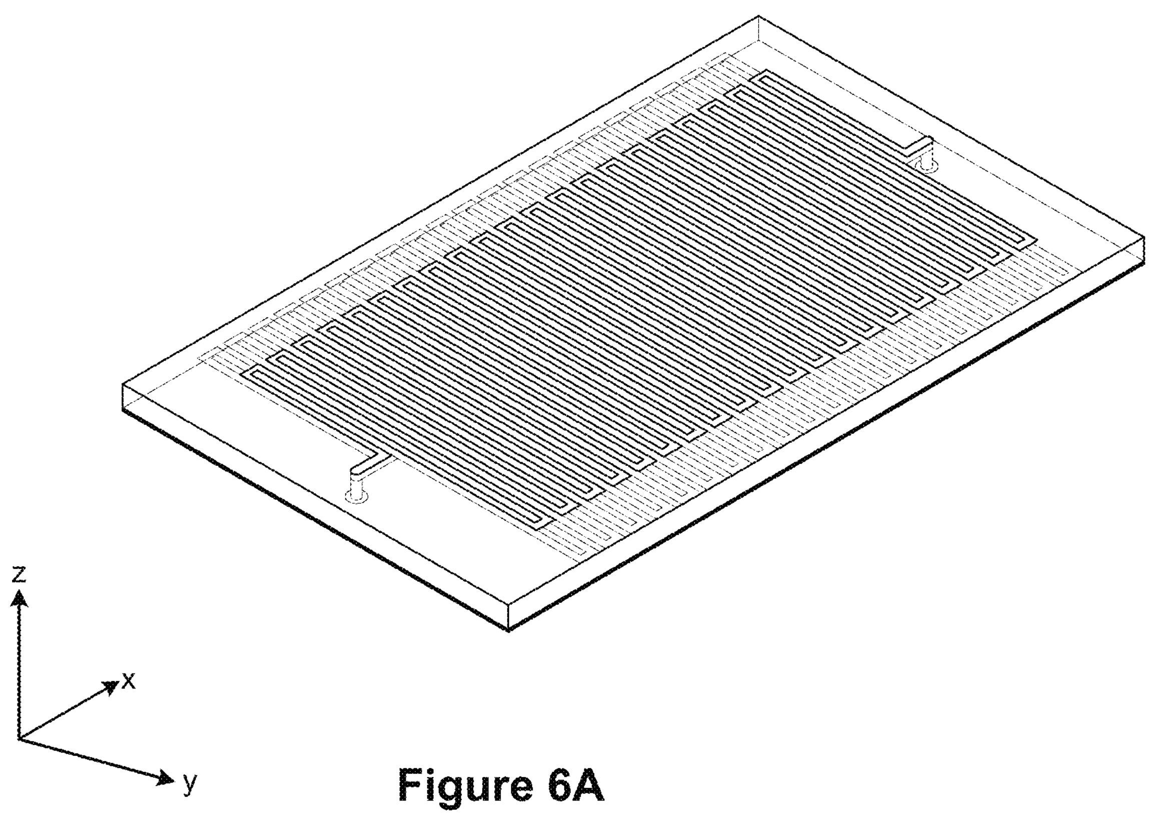
FIGS. 6A-6E are schematics showing various configurations for individual antenna elements within an RF charging pad, in accordance with some embodiments.
Figure 6B:
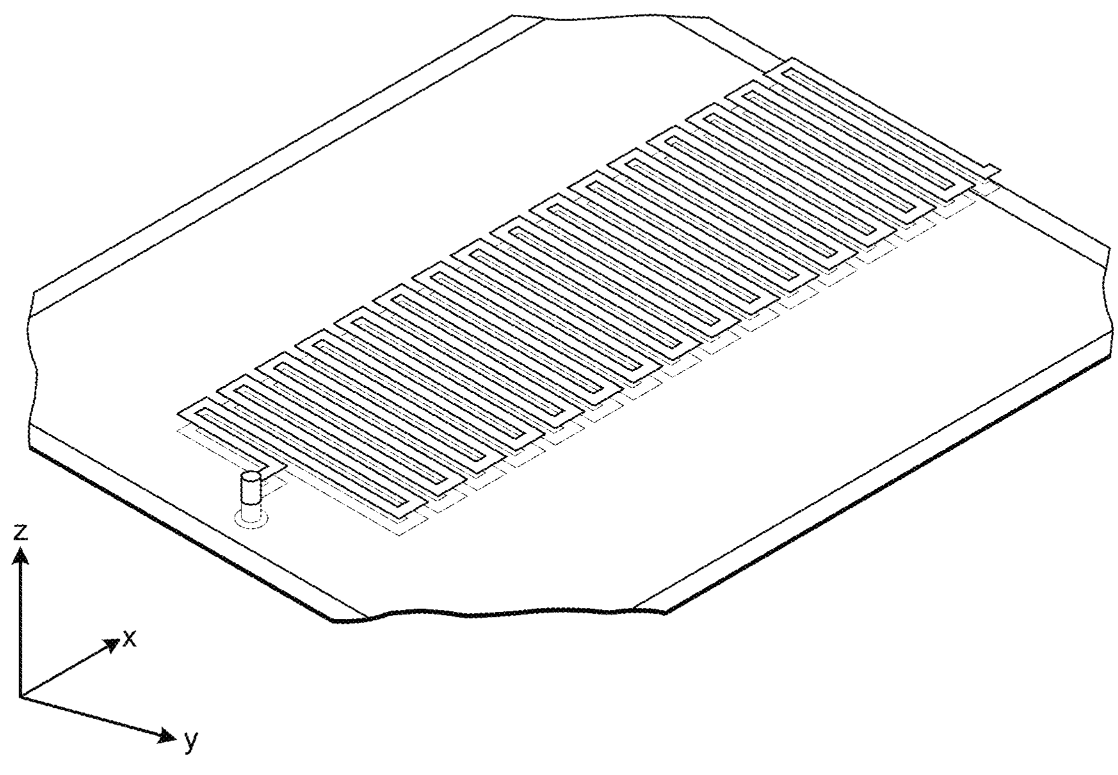

For example, FIGS. 6A-6B show examples of structures for an antenna element 120 that includes multiple layers that each include conductive lines formed into meandered line patterns. The conductive lines at each respective layer may have the same (FIG. 6B) or different (FIG. 6A) widths (or lengths, or trace gauges, or patterns, spaces between each trace, etc.) relative to other conductive lines within a multi-layer antenna element 120. In some embodiments, the meandered line patterns may be designed with variable lengths and/or widths at different locations of the pad 100 (or an individual antenna element 120), and the meandered line patterns may be printed on more than one substrate of an individual antenna element 120 or of the pad 100. These configurations of meandered line patterns allow for more degrees of freedom and, therefore, more complex antenna structures may be built that allow for wider operating bandwidths and/or coupling ranges of individual antenna elements 120 and the RF charging pad 100.

Figure 6C:
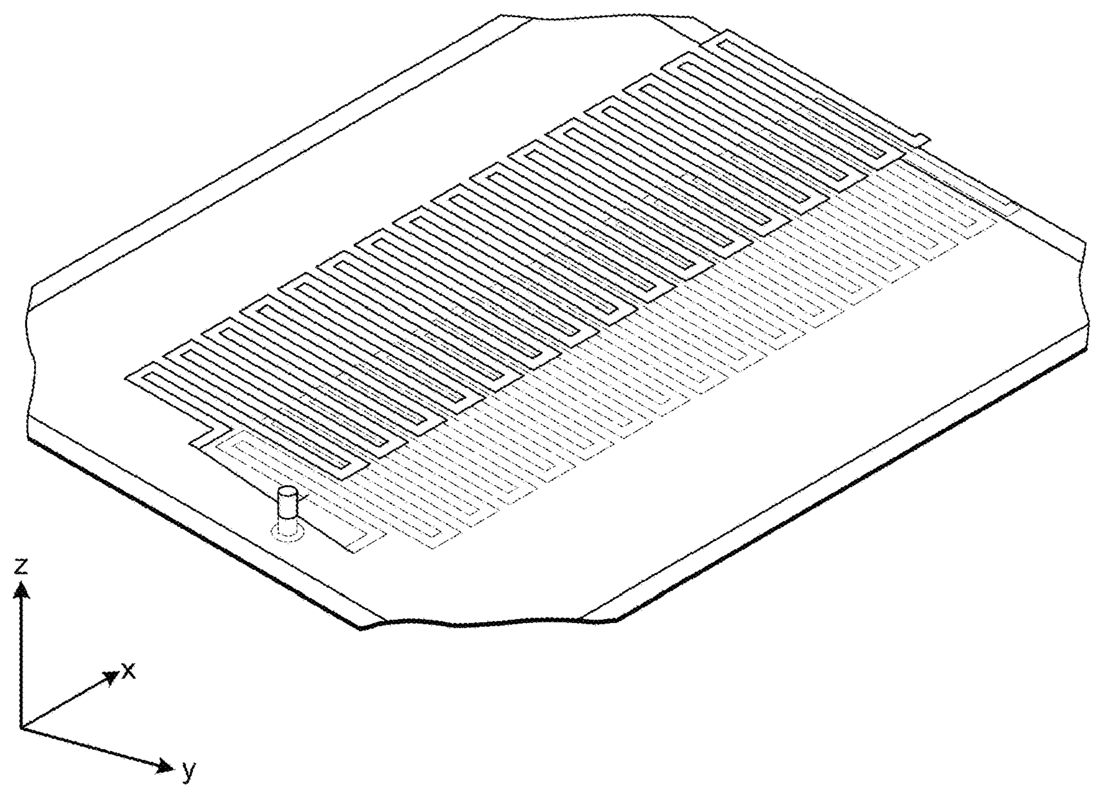
Figure 6D:
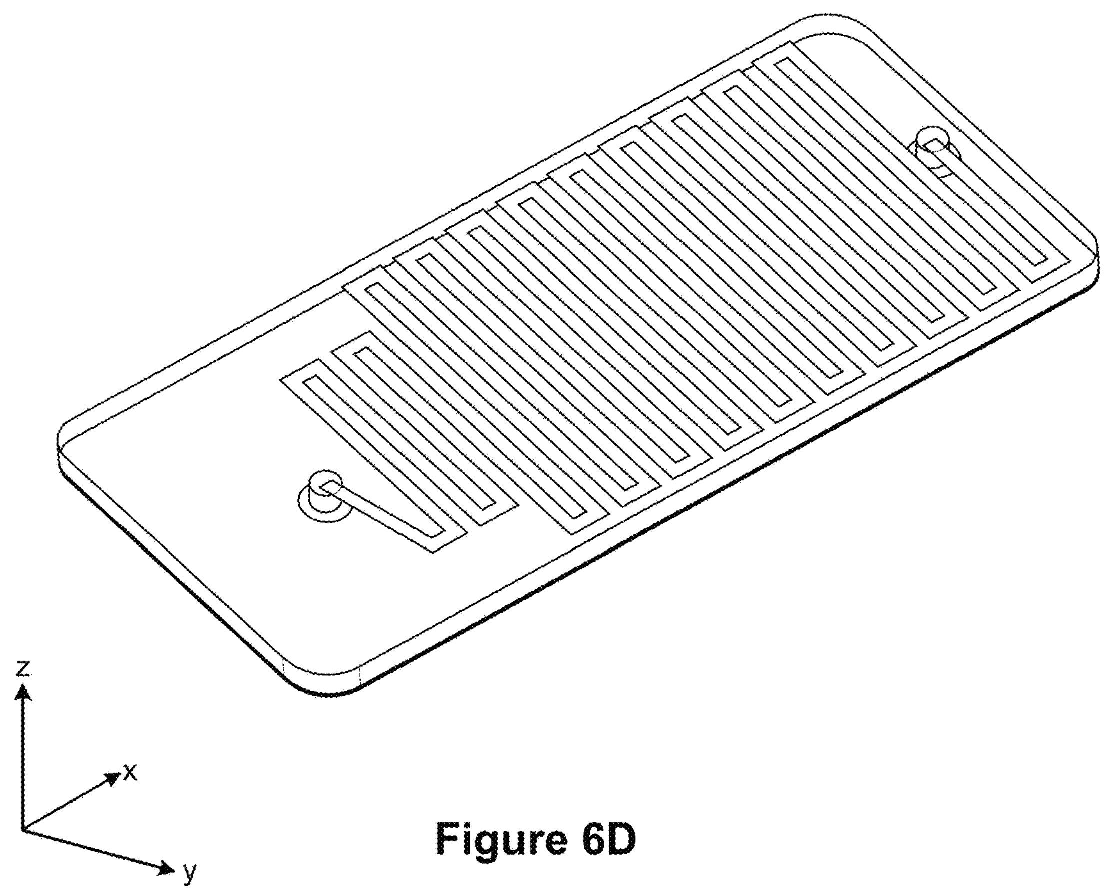
Figure 6E:
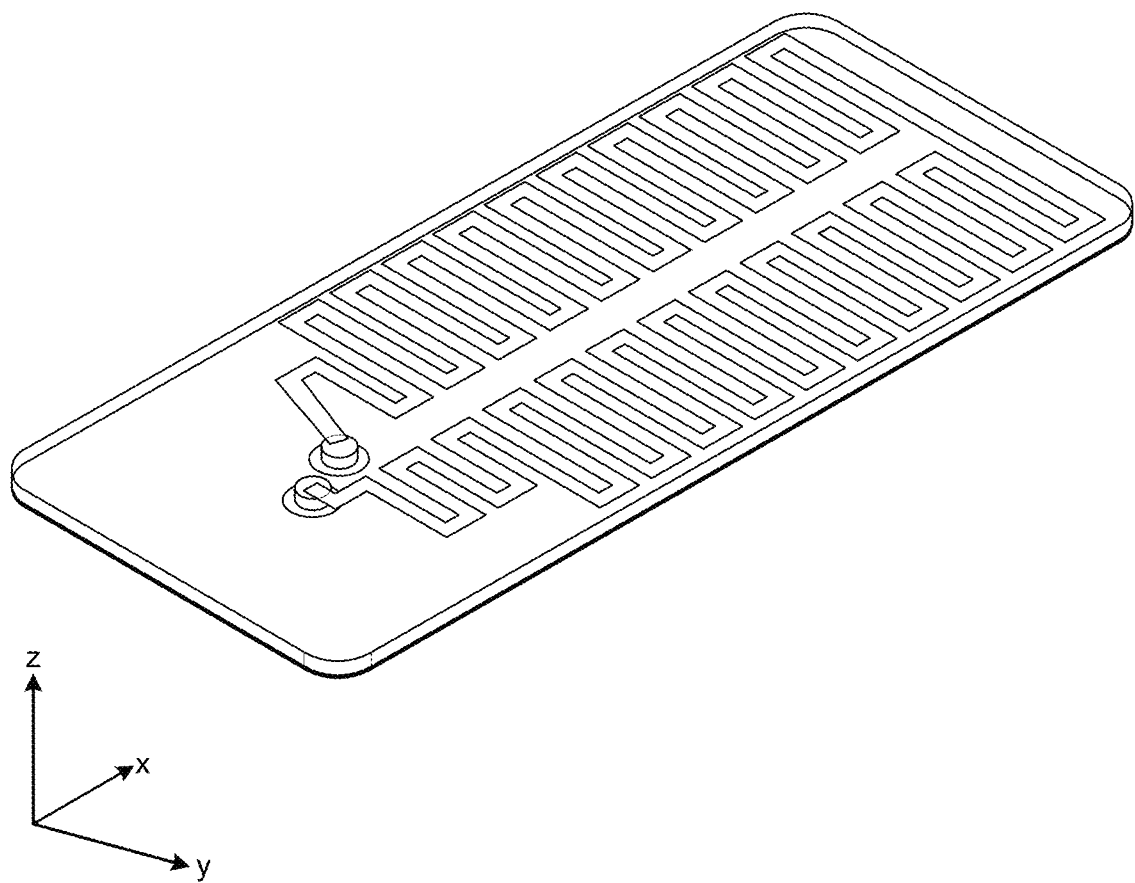

Additional example structures are provided in FIGS. 6C-6E: FIG. 6C shows an example of a structure for an antenna element 120 that includes multiple layers of conductive lines forming meandered line patterns that also have sliding coverage (in some embodiments, respective meandered line patterns may be placed in different substrates with just a portion of a first meandered line pattern of a respective substrate overlapping the a second meandered line pattern of a different substrate (i.e., sliding coverage), and this configuration helps to extend coverage throughout width of the antenna structure); FIG. 6D shows an example of a structure for an antenna element 120 that includes a conductive line having different lengths at each turn within the meandered line pattern (in some embodiments, using different lengths at each turn helps to extend coupling range of the antenna element 120 and/or helps add to the operating bandwidth of the RF charging pad 100); and FIG. 6E shows an example of a structure for an antenna element 120 that includes a conductive line that forms two adjacent meandered line patterns (in some embodiments, having a conductive line that forms two adjacent meandered line patterns helps to extend width of the antenna element 120). All of these examples are non-limiting and any number of combinations and multi-layered structures are possible using the example structures described above.

Figure 7A:
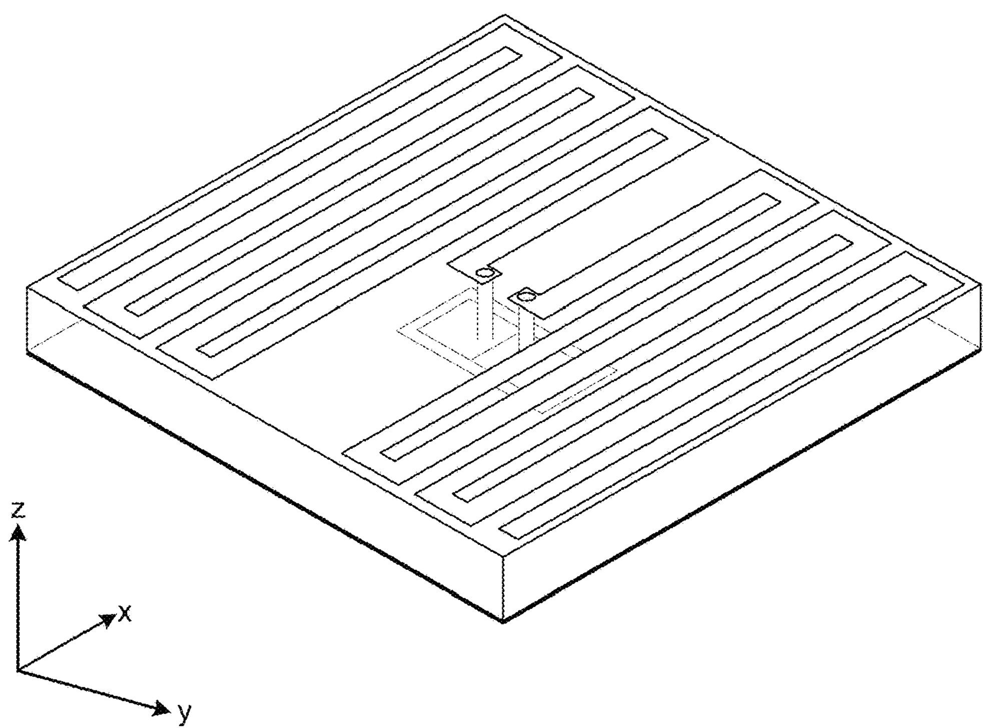
FIGS. 7A-7D are schematics of an antenna element for an RF receiver, in accordance with some embodiments.
Figure 7B:
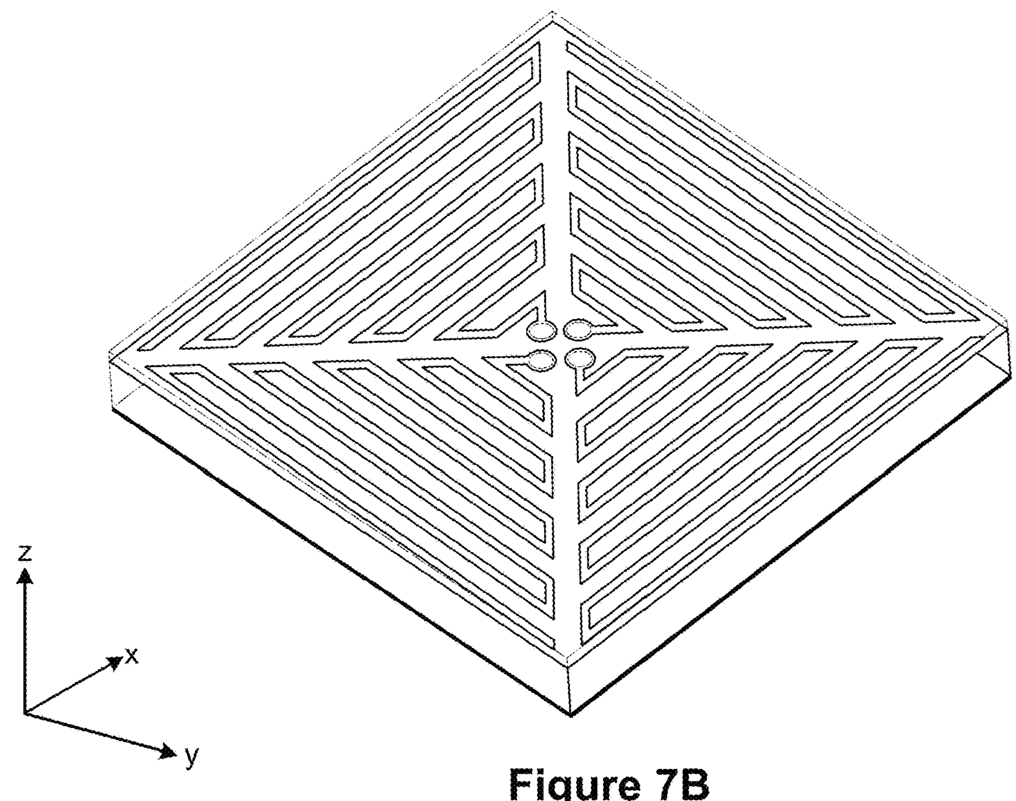
Figure 7C:
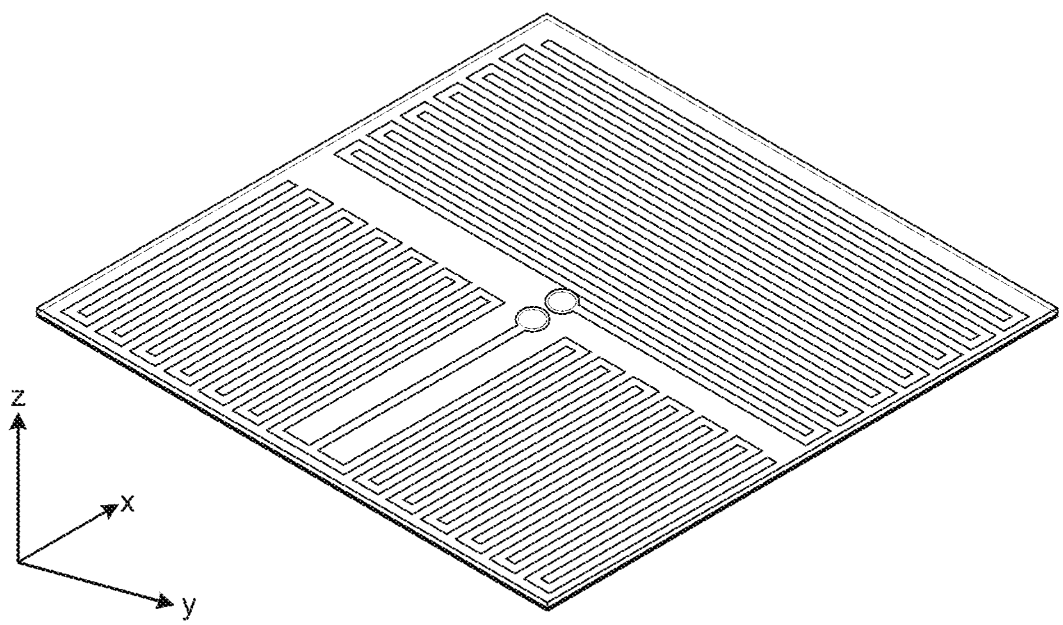
Figure 7D:
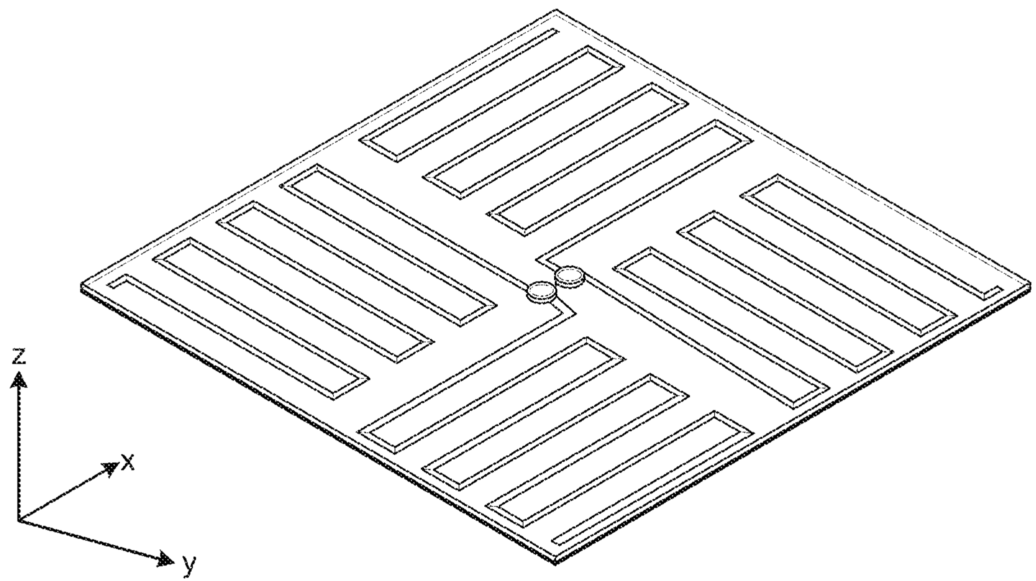

FIGS. 7A-7D are schematics of an antenna element for an RF receiver, in accordance with some embodiments. In particular FIGS. 7A-7D show examples of structures for RF receivers (e.g., receiver 104, FIGS. 3A-3D and 4), including: (i) a receiver with a conductive line that forms meandered line patterns (the conductive line may or may not be backed by solid ground plane or reflector), as shown in FIGS. 7A (single-polarity receiver) and 7B (dual-polarity receiver). FIGS. 7C-7D show additional examples of structures for an RF receiver with dual-polarity and a conductive line that forms a meandered line pattern. Each of the structures shown in FIGS. 7A-7D may be used to provide different coupling ranges, coupling orientations, and/or bandwidth for a respective RF receiver. As a non-limiting example, when the antenna element shown in FIG. 7A is used in a receiver, very small receivers may be designed/built that only couple to the pad 100 in one direction. As another non-limiting example, when the antenna elements shown in FIGS. 7B-7D are used in a receiver, the receiver is then able to couple to the pad 100 in any orientation.

Commonly-owned U.S. patent application Ser. No. 15/269,729 also provides additional examples and descriptions of meandered line patterns for antenna elements (e.g., those shown in FIGS. 2A-2D, 3, 4, 5, 7, 8, and 9A-9B, and described in the specification) and descriptions of the functioning of power transfer systems that include antenna elements with meandered line patterns (e.g., paragraphs [0022]-[0034] and FIGS. 1A-1B), and the disclosure of this commonly-owned application thus supplements the descriptions of antenna elements with meandered line patterns provided herein (for both receivers and transmitters, or a combination thereof).

Figure 8:
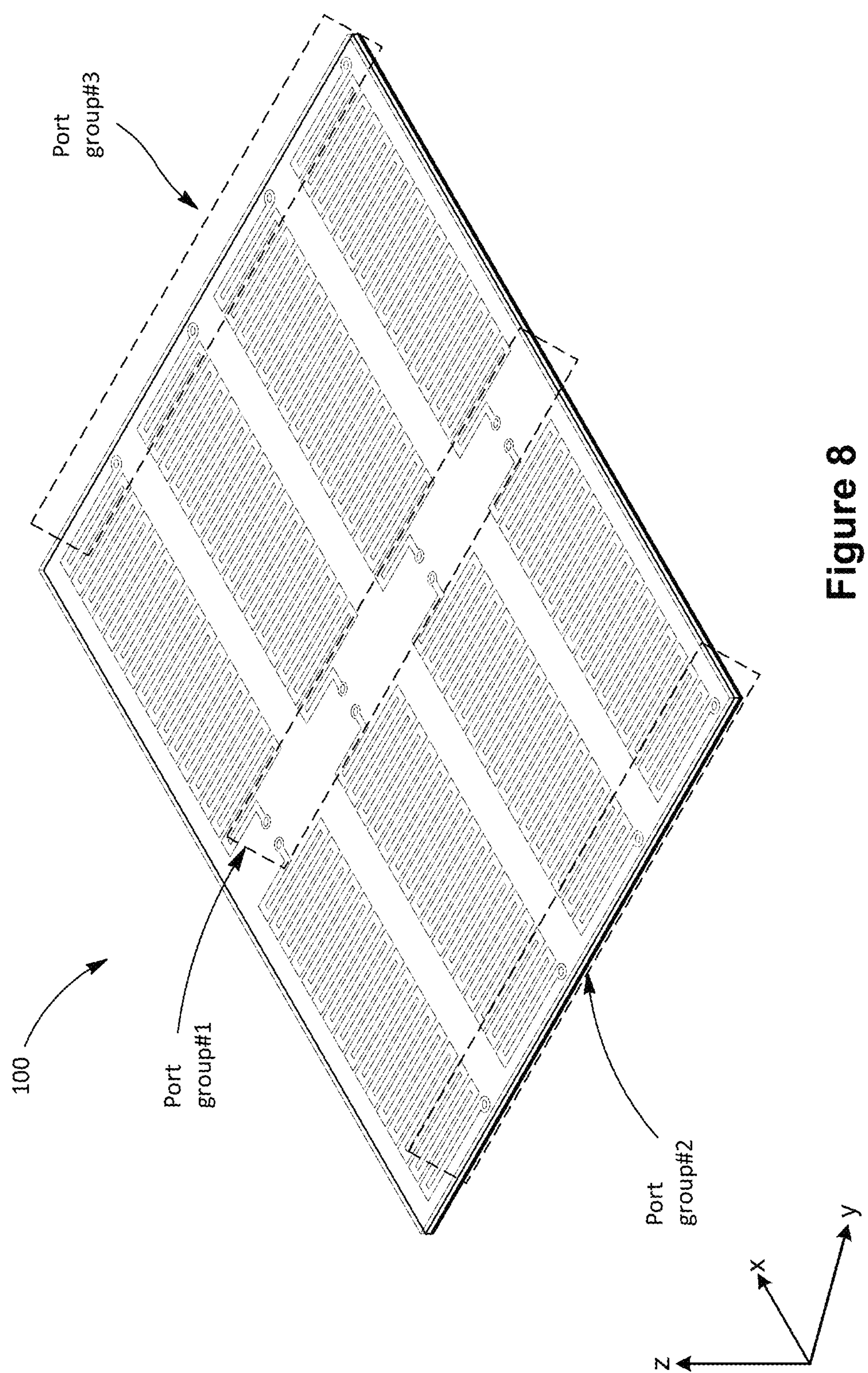
FIG. 8 is a schematic of an RF charging pad with a plurality of transmitting antenna elements (or unit cells), in accordance with some embodiments.

FIG. 8 is a schematic of an RF charging pad with a plurality of transmitting antenna elements (unit cells) that form a larger RF charging/transmitting pad, in accordance with some embodiments. In some embodiments, the RF charging pad 100 is formed as an array of adjacent antenna elements 120 (the distance between cells may be optimized for the best coverage). In some embodiments, when a receiver is placed in an area/gap that is between adjacent antenna elements 120, attempts to optimize energy transfer (e.g., in accordance with the adaptation scheme discussed above in reference to FIG. 3A) may not result in increased energy transfer above an acceptable threshold level (e.g., 75% or more). As such, in these circumstances, adjacent antenna elements may both be configured to transmit RF waves at full power at the same time to transfer additional energy to a receiver that is placed on a surface of the RF charging pad, and at a location that is between adjacent antenna elements 120.

As one possible configuration in accordance with some embodiments, port (or terminal) group #1 (FIG. 8) supplies power, port (or terminal) groups #2 and #3 provide adaptive loads (e.g., an electromechanical relay moving between short-circuit and open-circuit states). As another example of a suitable configuration, port (or terminal) groups #1, #2 and #3 may also be used to supply power via a power amplifier to the charging pad 100 (at the same time or with one group at a time being switched when necessary).

In some embodiments, each transmitting antenna element 120 of the RF charging pad 100 forms a separate antenna zone which is controlled by a feeding (PA) terminal and one or more terminals to support adaptive load(s), as explained in detail above. In some embodiments, feedback from the receiver helps determine the antenna zone on top of which the receiver is placed, and this determination activates that zone (e.g., using the switch 295, FIG. 1C). In circumstances in which the receiver is placed between two or more zones (e.g., at an area/gap that is between adjacent antenna elements 120), additional adjacent zones might be activated to ensure sufficient transfer of energy to the receiver. Additional details regarding determining zones to use for transmitting wireless power to the receiver are provided below in reference to FIGS. 9A-9B, 10, and 11A-11E.

Figure 9A:
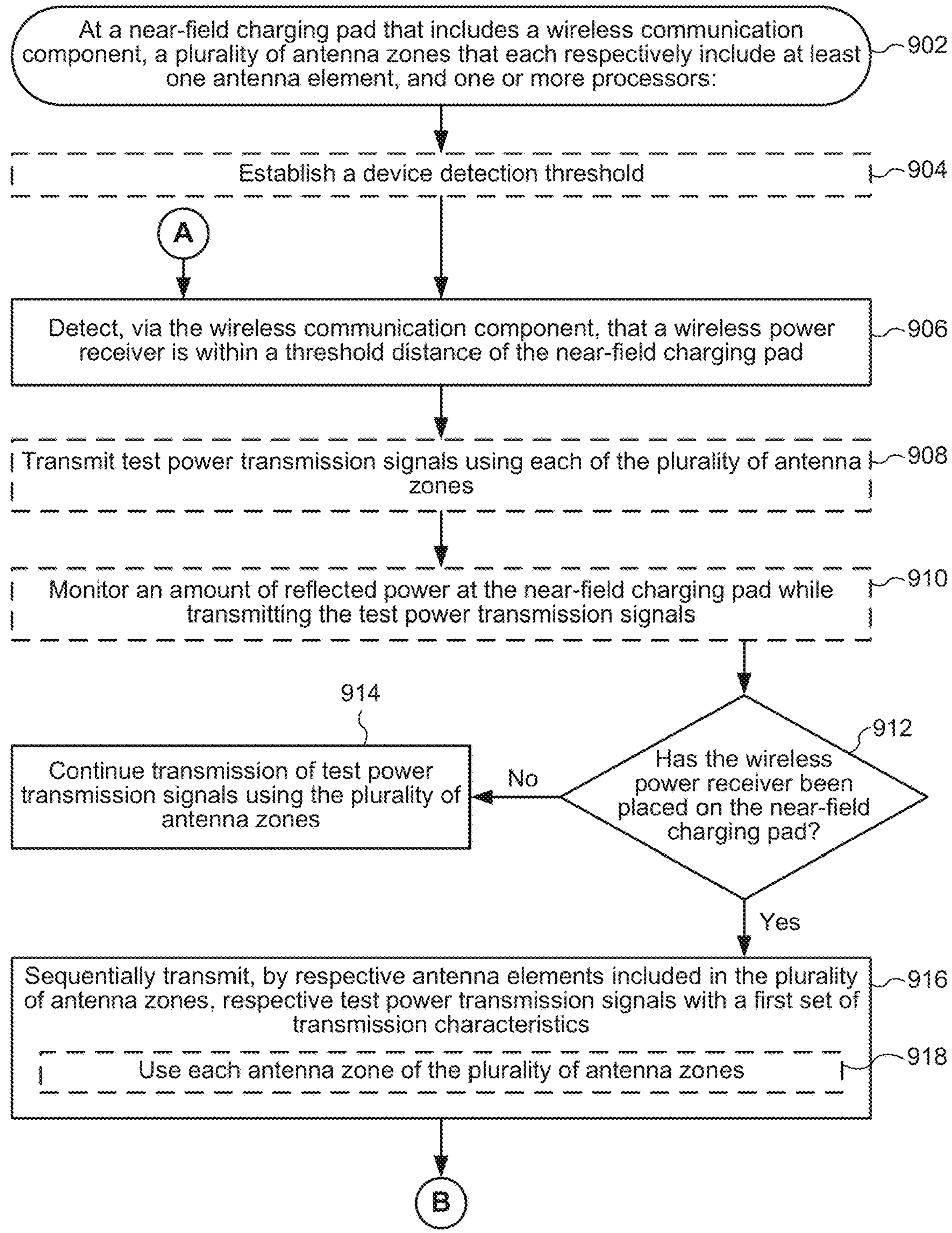
FIGS. 9A-9B are flow diagrams showing a method 900 of selectively activating one or more antenna zones in a near-field charging pad, in accordance with some embodiments.
Figure 9B:
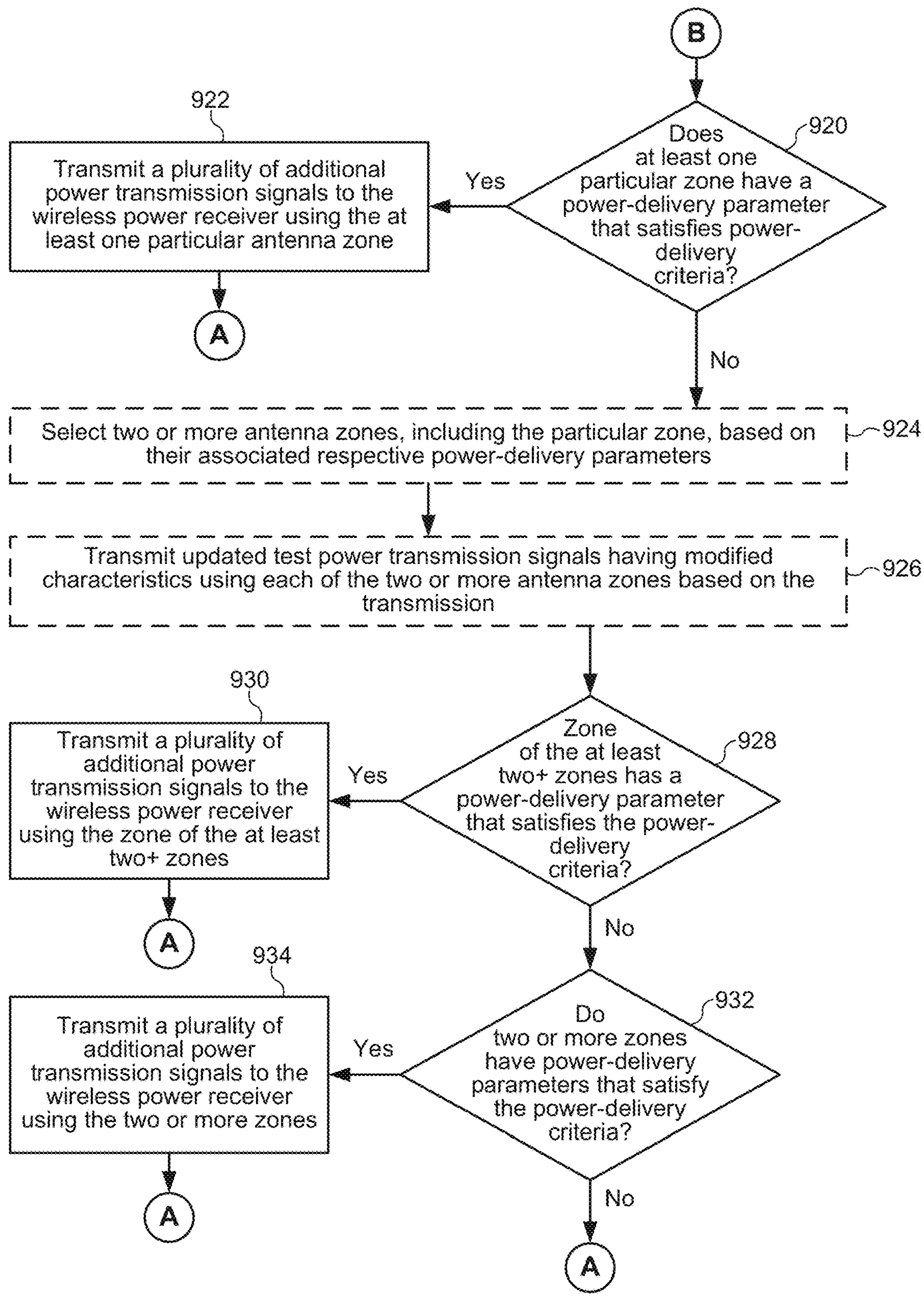

FIGS. 9A-9B are flow diagrams showing a method 900 of selectively activating one or more antenna zones (e.g., activating the antennas associated therewith) in a near-field charging pad, in accordance with some embodiments. Operations of the method 900 are performed by a near-field charging pad (e.g. RF charging pad 100, FIGS. 1B and 2A) or by one or more components thereof (e.g., those described above with reference to FIGS. 1A-1B and 2A). In some embodiments, the method 900 corresponds to instructions stored in a computer memory or computer-readable storage medium (e.g., memory 206 of the RF charging pad 100, FIG. 2A).

The near-field charging pad includes one or more processors (e.g., CPU 202, FIG. 1B), a wireless communication component (e.g., communication component(s) 204, FIGS. 1A and 2A), and a plurality of antenna zones (e.g., antenna zones 290-1 and 290-N, FIG. 1B) that each respectively include at least one antenna element (e.g., one of antennas 210, which may be one of the antennas 120 described in reference to FIGS. 3A-6E) (902). In some embodiments, the near-field charging pad includes distinct antennas (or unit cells including antennas, also referred to herein as antenna elements) that are each included in respective antenna zones. For example, as shown in FIG. 1B, an antenna zone 290-1 includes an antenna 210-A. In another example, as is also shown in FIG. 1B, an antenna zone 290-N includes multiple antennas. The antenna zones may also be referred to as antenna groups, such that the near-field charging pad includes a plurality of antenna zones or groups, and each respective zone/group includes at least one of the distinct antenna elements (e.g., at least one antenna 210). It should be noted that an antenna zone can include any number of antennas, and that the numbers of antennas associated with a particular antenna zone may be modified or adjusted (e.g., the CPU subsystem 170 of RF power transmitter integrated circuit 160 responsible for managing operations of the near-field charging pad 100 dynamically defines each antenna zone at various points in time, as is discussed in more detail below). In some embodiments, each antenna zone includes a same number of antennas.

In some embodiments, the one or more processors are a component of a single integrated circuit (e.g., RF power transmitter integrated circuit 160, FIG. 1B) that is used to control operation of the near-field charging pad. In some embodiments, the one or more processors and/or the wireless communication component of the near-field charging pad is/are external to the near-field charging pad, such as one or more processors of a device in which the near-field charging pad is embedded. In some embodiments, the wireless communication component is a radio transceiver (e.g., a BLUETOOTH radio, WI-FI radio, or the like for exchanging communication signals with wireless power receivers).

In some embodiments, the method includes establishing (904) one or more device detection thresholds during a calibration process for the near-field charging pad. In some instances, the calibration process is performed after manufacturing the near-field charging pad and includes placing devices of various types (e.g., smartphones, tablets, laptops, connected devices, etc.) on the near-field charging pad and then measuring a minimum amount of reflected power detected at an antenna zone while transmitting test power transmission signals to the devices of various types. In some instances, a first device-specific threshold is established at a value corresponding to 5% or less of the minimum amount of reflected power. In some embodiments, a second device-specific threshold is also established so that if no one antenna zone is able to satisfy the first threshold (e.g., because the wireless power receiver is located at a border between antenna zones), then the second, higher threshold may be used to locate more than one antenna zone to use for transmitting power to the wireless power receiver (as discussed in more detail below). In some embodiments, multiple first and second device-specific detection thresholds are established for each type of device of the various types, and these multiple first and second device-specific detection thresholds may be stored in a memory associated with the RF power transmitter integrated circuit 160 (e.g., memory 206, FIG. 2A).

The method 900 also includes detecting (906), via the wireless communication component, that a wireless power receiver is within a threshold distance of the near-field charging pad. In some instances, the detecting may occur after the near-field charging pad is turned on (e.g., powered up). In these instances, the near-field charging pad scans an area around the near-field charging pad (e.g., to scan for wireless power receivers that are located within the threshold distance, e.g., within 1-1.5 meters, away from the NF charging pad 100) to determine whether any wireless power receivers are within the threshold distance of the NF charging pad 100. The near-field charging pad may use the wireless communication component (e.g., communication component(s) 204, FIG. 2A, such as a Bluetooth radio) to conduct the scanning for signals broadcasted by wireless communication components associated with wireless power receivers (e.g., communication component 254, FIG. 2B). In some embodiments, the device detection threshold is selected (from among the multiple first and second device detection threshold discussed above) by the one or more processors after detecting the wireless power receiver within the threshold distance of the near-field charging pad. For example, a wireless communication component of the wireless power receiver is used to provide information to the near-field charging pad that identifies the type of device, such as a BLUETOOTH or BLUETOOTH low energy advertisement signal that includes this information. In some embodiments, to save energy and prolong life of the near-field charging pad and its components, no wireless power is transmitted (and the device detection and antenna selection algorithms discussion herein are not initiated) until a wireless power receiver is detected within the threshold distance of the near-field charging pad.

In some embodiments, the detecting 906 also includes performing an authorization handshake (e.g., using the secure element modules 234 and 282, FIGS. 2A and 2B) to ensure that the wireless power receiver is authorized to receive wirelessly delivered power from the near-field charging pad and the method only proceeds to operation 908 if it is determined that the wireless power receiver is so authorized. In this way, the near-field charging pad ensures that only authorized wireless power receivers are able to receive wirelessly delivered power and that no device is able to leech power that is transmitted by the near-field charging pad.

The method 900 further includes, in response to detecting that the wireless power receiver is within the threshold distance of the near-field charging pad, determining (912) whether the wireless power receiver has been placed on the near-field charging pad. In some embodiments, this is accomplished by transmitting (908) test power transmission signals using each of the plurality of antenna zones and monitoring (910) an amount of reflected power at the near-field charging pad while transmitting the test power transmission signals.

In some embodiments, if the amount of reflected power does not satisfy the device detection threshold (e.g., the amount of reflected power is greater than 20% of power transmitted with the test power transmission signals), then a determination is made that the wireless power receiver has not been placed on the surface of the near-field charging pad (912—No). In accordance with this determination, the near-field charging pad continues to transmit test power transmission signals using each of the plurality of antenna zones at step 914 (i.e., proceed to step 908). In some embodiments, the operations at 908 and 910 are performed until it is determined that the device detection threshold has been satisfied.

In some embodiments, the amount of reflected power is measured at each antenna zone of the plurality of antenna zones (e.g., each antenna zone may be associated with a respective ADC/DAC/Power Detector, such as the one shown in FIG. 1B) while, in other embodiments, the amount of reflected power may be measured using a single component of the RF power transmitter integrated circuit 160 (e.g., the ADC/DAC/Power Detector). When the amount of reflected power satisfies the device detection threshold (912—Yes), the wireless power receiver is determined to have been placed on the near-field charging pad. For example, the amount of reflected power may satisfy the device detection threshold when the amount of reflected power is 20% or less than amount of power transmitted with the test power transmission signals. Such a result indicates that a sufficient amount of the power transmitted with the test power transmission signals was absorbed/captured by the wireless power receiver.

In some embodiments, other types of sensors (e.g., sensors 212, FIG. 2A) are included in or in communication with the near-field charging pad to help determine when the wireless power receiver has been placed on the near-field charging pad. For example, in some embodiments, one or more optical sensors (e.g., when light is blocked from a part of the pad, then this may provide an indication that the wireless power receiver has been placed on the pad), one or more vibration sensors (e.g., when a vibration is detected at the pad, then this may provide an indication that the wireless power receiver has been placed on the pad), one or more strain gauges (e.g., when a strain level at a surface of the pad increases, this may provide an indication that the wireless power receiver has been placed on the surface), one or more thermal sensors (e.g., when a temperature at a surface of the pad increases, this may provide an indication that the wireless power receiver has been placed on the surface), and/or one or more weighing sensors (e.g., when an amount of weight measured on the surface of the pad increases, then this may provide an indication that the wireless power receiver has been placed on the surface) are utilized to help make this determination.

In some embodiments, before transmitting the test power transmission signals, the method includes determining that the wireless power receiver is authorized to receive wirelessly delivered power from the near-field charging pad. For example, as shown in FIGS. 2A-2B, the wireless power receiver 104 and the near-field charging pad 100 may include secure element modules 282 and 234, respectively, which are used to perform this authorization process, thereby ensuring that only authorized receivers are able to receive wirelessly delivered power from the near-field charging pad.

The method 900 further includes, in accordance with determining that the wireless power receiver has been placed on the near-field charging pad, selectively transmitting (916), by respective antenna elements included in the plurality of antenna zones, respective test power transmission signals with a first set of transmission characteristics. In some embodiments, the selectively or sequentially transmitting is performed using each antenna zone of the plurality of antenna zones (918). Selectively or sequentially transmitting refers to a process of selectively activating antenna zones one at a time to cause one or more antennas associated with individual antenna zones to transmit test power transmission signals (e.g., the RF power transmitter integrated circuit 160 provides one or more control signals to the switch 295 to selectively activate different antenna zones).

Referring now to FIG. 9B, the method 900 further includes determining (920) whether a particular power-delivery parameter associated with transmission of a respective test power transmission signal (during the sequential or selective transmission operation at 916 and/or 918) by at least one particular antenna zone of the plurality of antenna zones satisfies power-delivery criteria (e.g., whether the particular power-delivery parameter indicates that more than a threshold amount of power is transferred to the wireless power receiver by the at least one particular antenna zone). In some embodiments, each respective power-delivery parameter corresponds to an amount of power received by the wireless power receiver based on transmission of a respective test power transmission signal by a respective antenna group of the plurality of antenna groups.

Upon determining, by the one or more processors, that the particular power-delivery parameter satisfies the power-delivery criteria (920—Yes), the method further includes transmitting (922) a plurality of additional power transmission signals to the wireless power receiver using the at least one particular antenna zone, where each additional power transmission signal of the plurality is transmitted with a second set of transmission characteristics, distinct from the first set. In some embodiments, the second set of transmission characteristics is determined by adjusting at least one characteristic in the first set of transmission characteristics to increase an amount of power that is transferred by the particular antenna group to the wireless power receiver. Moreover, in some embodiments, the at least one adjusted characteristic is a frequency or impedance value (and the frequency and impedance value may be adjusted using the adaptation scheme discussed above).

The test power transmission signals discussed above are used to help determine which antenna zones to use for delivering wireless power to the wireless power receiver. In some embodiments, these test power transmission signals are not used by the wireless power receiver to provide power or charge to the wireless power receiver, or a device associated therewith. Instead, the plurality of additional power transmission signals is used to provide power or charge to the wireless power receiver. In this way, the near-field charging pad is able to preserve resources during a device detection stage (e.g., while transmitting the test power transmission signals) until a suitable antenna zone is located for transmitting the plurality of additional power transmission signals. As such, the method 900 is able to locate a position of the wireless power receiver using test signals (i.e., the test power transmission signals with the first set of transmission characteristics) and then transmit using antenna from an antenna zone that is best-suited to provide power transmission signals given the position of the wireless power receiver on the near-field charging pad. As discussed in more detail below with reference to FIG. 10, this process may include a coarse search for antenna zones (e.g., the coarse search may include the operations 908-918) and a finer search for antenna zones (e.g., the finer search may include operations 920-934).

In some embodiments, a power control process (FIG. 11E) is also used to help optimize a level of power delivered to the wireless power receiver using the selected antenna zones (e.g., power control may be performed after operations 922, 930, or 934 to tune transmission of wireless power using the antenna zones that were selected during the method 900). As a part of the power control process, the near-field charging pad may, while transmitting the additional plurality of power transmission signals, adjust at least one characteristic in the second set of transmission characteristics based on information, received from the wireless power receiver, which is used to determine a level of power that is wirelessly delivered to the wireless power receiver by the near-field charging pad.

Returning back to operation 920, in response to determining that none of the power-delivery parameters associated with transmission of the test power transmission signals during the sequential or selective transmission operation(s) at 916 (and optionally 918) satisfy the power-delivery criteria (920—No), the method 900 further includes selecting (924) two or more antenna zones (also referred to inter-changeably herein as two+ antenna zones) based on their associated respective power-delivery parameters. This may arise when the wireless power receiver is not centered over any particular antenna zone (e.g., the receiver may be over more than one antenna zone). For example, the two or more antenna zones that transferred the highest amount of power to the wireless power receiver during the sequential or selective transmission operation at 916 (and optionally 918) based on their respective power-delivery parameters are selected at operation 924. In this way, in some embodiments, a finer search for the most efficient antenna zone is started by selecting the two or more antenna zones that most efficiently transmitted power to the wireless power receiver during the operations at 916/918 based on their respective association with power-delivery parameters that is higher than the power-delivery parameters for other antenna zones. In these embodiments, a respective power-delivery parameter may be monitored (in conjunction with operations 916/918) for each antenna zone and these power-delivery parameters are then compared to determine which of the plurality of antenna zones to select as the two or more antenna zones to use for transmission of wireless power.

After selecting the two or more antenna zones, the method further includes: (i) updating the test power transmission signals by modifying at least one characteristic of the test power transmission signals (e.g., frequency, impedance, amplitude, phase, gain, etc.), based on the previous transmissions (e.g., based on feedback received from the wireless power receiver regarding a level of power receive by the wireless power receiver or based on an amount of reflected power measured at each antenna group after the transmission), and (ii) transmitting (926) the updated test power transmission signals using each of the two or more antenna zones (e.g., the RF power transmitter integrated circuit 160 may provide one or more control signals to the switch 295 to activate the two or more antenna zones).

The method 900 further includes determining (928) whether a particular power-delivery parameter associated with transmission of an updated respective test power transmission signal by a zone of the two or more antenna zones satisfies power-delivery criteria. In response to determining that the particular power-delivery parameter associated with transmission of the updated respective test power transmission signal by the zone of the two or more antenna zones satisfies the power-delivery criteria (928—Yes), the method 900 further includes transmitting (930) a plurality of additional power transmission signals to the wireless power receiver using the zone of the two or more antenna zones, where each additional power transmission signal of the plurality is transmitted with a second set of transmission characteristics, distinct from the first set (e.g., the RF power transmitter integrated circuit 160 may provide a control signal to the switch 295). The plurality of additional power transmission signals is used to wirelessly deliver power to the wireless power receiver (or an electronic device coupled with the wireless power receiver).

In some embodiments, the determination that the particular power-delivery parameter satisfies the power-delivery criteria at operations 920 and 928 may include determining that respective power-delivery parameters (associated with the at least one particular zone and/or the zone of the two or more antenna zones) indicates that a first threshold amount of power is transferred to the wireless power receiver. If such a determination is made at operation 928, this indicates that the zone is the only antenna zone of the two or more antenna zones having a respective power-delivery parameter that indicates that the first threshold amount of power is transferred to the wireless power receiver by the zone in conjunction with operation 926.

In some embodiments, the first threshold amount of power corresponds to an amount of power received by the wireless power receiver (in some circumstances, the first threshold amount of power could alternatively correspond to an amount of reflected power detected at the near-field charging pad). As discussed above, in some embodiments, a calibration process is performed after manufacturing the near-field charging pad and includes placing devices of various types (e.g., smartphones, tablets, laptops, connected devices, etc., that are each coupled with wireless power receivers) on the near-field charging pad and then measuring a maximum amount of power received at the receiver (or device coupled thereto) after transmission of the test signal by an antenna group to the devices of various types. In some instances, the first threshold is established at a value corresponding to a percentage of the maximum amount of received power (e.g., approximately 85% or more of power transmitted by a particular antenna zone is received by the receiver).

As explained above, during embodiments of the calibration process, a second threshold is also established so that if no one antenna zone is able to satisfy the first threshold (e.g., because the wireless power receiver may be located at a border between antenna groups) then the second threshold may be utilized to locate more than one antenna zone to transmit wireless power to the wireless power receiver (as discussed below). This second threshold may be another percentage of the maximum amount of reflected power that is measured during the calibration process (e.g., 65%). In some embodiments, the first and second thresholds are determined as respective device-specific first and second thresholds for each of the devices undergoing the calibration process.

In some embodiments, the method 900 includes determining (928—No) that (i) no antenna zone of the two or more antenna zones is transferring the first threshold amount of power to the wireless power receiver and (ii) an additional power-delivery parameter associated with an additional antenna zone of the two or more antenna zones satisfies the power-delivery criteria. For example, a respective power-delivery parameter indicates that a first amount of power transferred to the wireless power receiver by the zone of the two or more zones is above a second threshold amount of power and below the first threshold amount of power, and the additional power-delivery parameter also indicates that a second amount of power transferred to the wireless power receiver by the additional antenna zone is above the second threshold amount of power and below the first threshold amount of power. In other words, if no antenna zone of the two or more antenna zones is able to transfer enough power to the wireless power receiver to satisfy the first threshold amount of power, then the method proceeds to determine whether two of the antenna groups transferred enough power to the wireless power receiver to satisfy a second, lower threshold amount of power. For example, the wireless power receiver may be located at a border between two antenna groups, so no one antenna group is able to satisfy the first threshold, but these two antenna groups may be able to each individually satisfy the second threshold amount of power.

Upon determining, by the one or more processors of the near-field charging pad, that the power-delivery parameters associated with transmission of the updated test power transmission signals by the two or more antennas zones satisfy the power-delivery criteria (932—Yes), the method further includes transmitting (934) a plurality of additional power transmission signals to the wireless power receiver using the two or more antenna zones. Such a situation may arise when the wireless power receiver is placed between two adjacent antenna zones. In some embodiments, the two or more antenna zones each simultaneously transmit the additional plurality of power transmission signals to provide power to the wireless power receiver.

As is also shown in FIG. 9B, if the two or more zones do not have power-delivery parameters that satisfy the power-delivery criteria (932—No), then the method 900 returns to operation 906 to start searching for the receiver (or a different receiver again), as no antenna zones were located that could efficiently transfer wireless power to the receiver. In some embodiments, the method 900 may alternatively return to operation 924 to begin transmitting test power transmission signals with different characteristics to determine if those characteristics are able to then allow the two or more antenna zones to deliver enough wireless power to the receiver to satisfy the power-delivery criteria. In some embodiments, the method 900 returns to operation 924 a predetermined number of times (e.g., 2) and, if the two or more zones still do not have power-delivery parameters that satisfy the power-delivery criteria, then the method at that point returns to operation 906 to begin searching for new receivers.

In some embodiments, after the method 900 successfully locates antenna zones to use for wirelessly delivering power to the receiver (e.g., at operations 922, 930, and 934) then the method 900 returns to operation 906 to being search for new receivers. The near-field charging pad, in some embodiments, is capable of simultaneously delivering wireless power to multiple receivers at any particular point in time and, therefore, iterating through the method 900 again allows the near-field charging pad to appropriately determine which antenna zones to use for transmission of wireless power to each of these multiple receivers.

In some embodiments, information used to determine respective power-delivery parameters for each of the antenna zones of the near-field charging pad is provided to the near-field charging pad by the wireless power receiver via the wireless communication component of the near-field charging pad (e.g., the receiver transmits information that is used to determine an amount of power received by the receiver from the test power transmission signals discussed above). In some embodiments, this information is sent via a connection between the wireless communication component of the near-field charging pad and the wireless power receiver, and the connection is established upon determining that the wireless power receiver has been placed on the near-field charging pad.

Additionally, in some embodiments, the near-field charging pad dynamically creates or defines antenna zones. For example, with reference to FIG. 1B, the near-field charging pad may define a first antenna zone 290-1 to include a single antenna 210-A and may define another antenna zone 290-N to include more than one antenna 210. In some embodiments, at various phases of the method 900 discussed above, antenna zones may be redefined. For example, in accordance with the determination that the two or more antenna zones do not have power-delivery parameters that satisfy the power-delivery criteria (932-No), the near-field charging pad may redefine the antenna zones to each include multiple antennas (instead of having each antenna zone include a single antenna). In this way, the method 900 is able to dynamically define antenna zones to help ensure that an appropriate antenna zone is located that may be used to transmit wireless power to a receiver that has been placed on the near-field charging pad.

Figure 10:
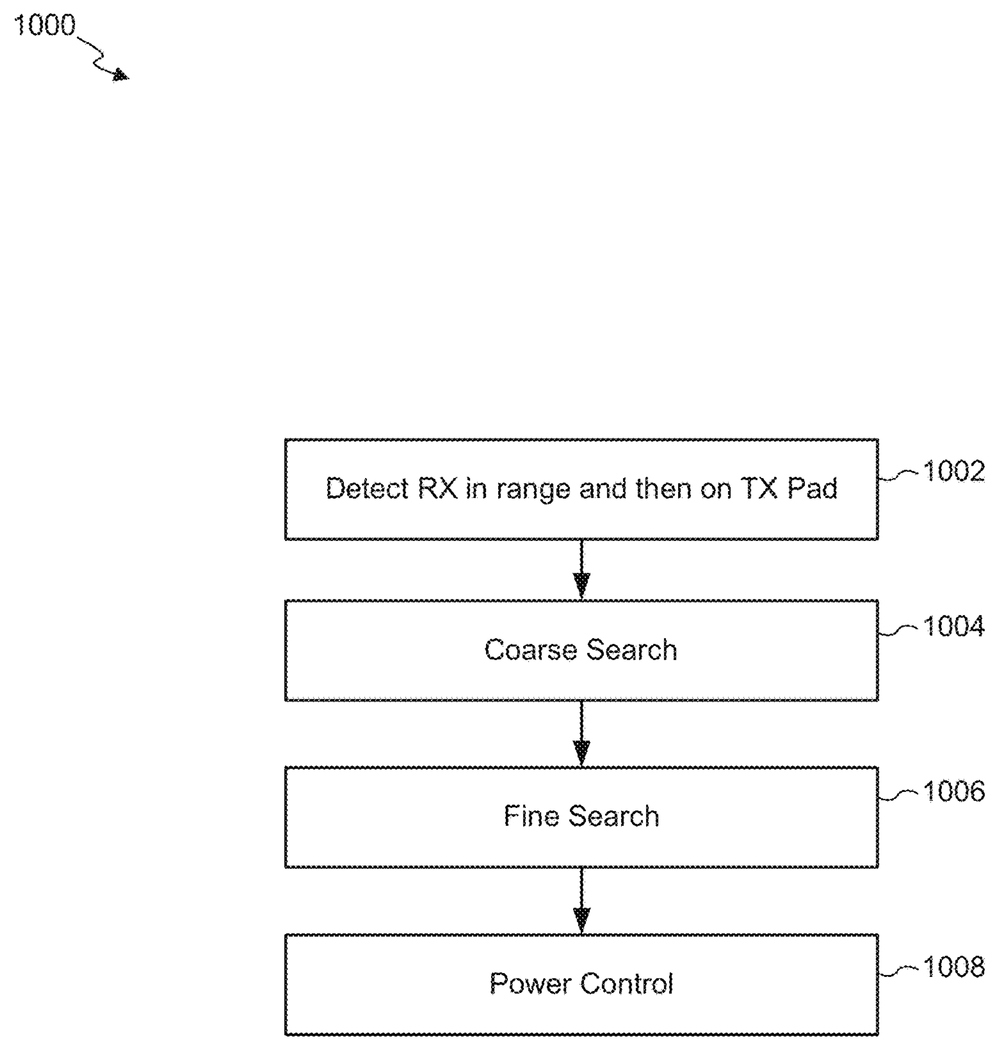
FIG. 10 is an overview showing a process of selectively activating one or more antenna zones in a near-field charging pad, in accordance with some embodiments.

FIG. 10 is an overview showing a process 1000 of selectively activating one or more antenna groups in a near-field charging pad, in accordance with some embodiments. Some of the operations in process 1000 correspond to or supplement the operations describe above in reference to method 900 of FIGS. 9A-9B. As shown in FIG. 10, the process 1000 begins with a near-field charging pad (e.g., RF charging pad 100, FIGS. 1A-1B and 2A) detecting (1002) a wireless power receiver (e.g., wireless power receiver 104, FIG. 12B) in range and subsequently on the near-field charging pad (operation 1002 corresponds to operations 906 to 912—Yes in FIG. 9A). The process 1000 further includes performing (1004) a coarse search, performing (1006) a fine search, and executing (1008) a power control routine. Each step in the process 1000 is described in further detail below with reference to FIGS. 11A-11E. It should be noted that the process 1000, in some embodiments, begins with the near-field charging pad detecting (1002) a wireless power receiver on the near-field charging pad and subsequently in range of the near-field charging pad.

Figure 11A:
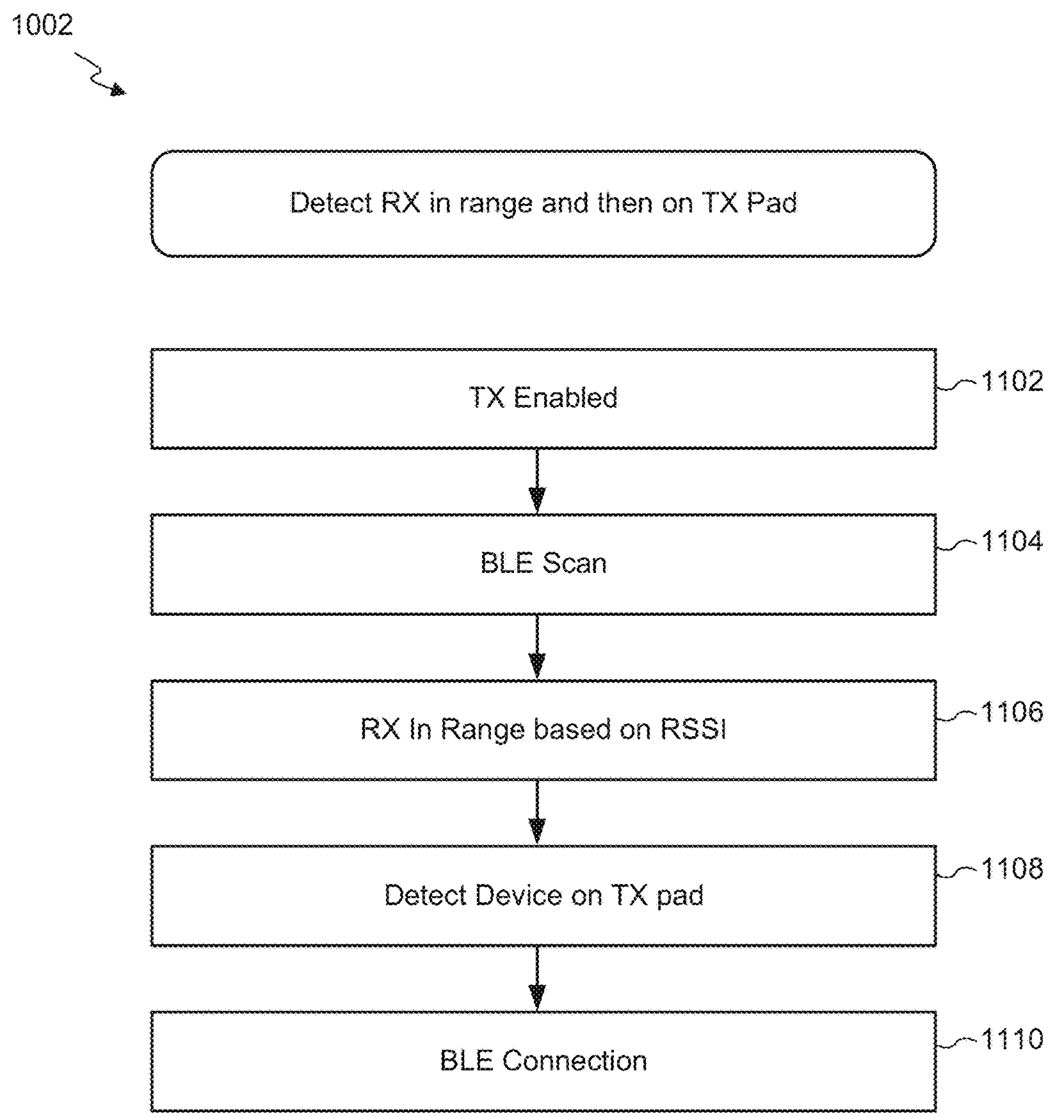
FIGS. 11A-11E are flow diagrams showing various aspects of selectively activating one or more antenna zones in a near-field charging pad, in accordance with some embodiments.

FIG. 11A is a flowchart detailing a process 1002 for detecting a wireless power receiver in range and subsequently on the near-field charging pad (or in some embodiments, on the near-field charging pad and subsequently in range of the near-field charging pad). The process 1002 includes enabling the near-field charging pad (1102), i.e., powering on the near-field charging pad. Thereafter, the near-field charging pad scans (1104) for wireless power receivers and detects (1106) a wireless power receiver in range based, at least in part, on a received signal strength indicator (RSSI). To obtain the RSSI, the near-field charging pad may use a wireless communication component (e.g., communication component(s) 204, FIG. 2A, such as a Bluetooth radio) to scan for signals broadcasted by wireless communication components associated with wireless power receivers (e.g., a Bluetooth advertisement signal). Detecting a wireless power receiver in range of the near-field charging pad is discussed in further detail above with reference to operation 906 of the method 900.

Next, the near-field charging pad detects (1108) a wireless power receiver on the near-field charging pad. In some embodiments, the near-field charging pad establishes that the wireless power receiver is on the near-field charging pad using the processes discussed above in reference to operations 908-914 until it is determined that the wireless power receiver has been placed on the near-field charging pad. In some embodiments, operation (1108) occurs before operation (1102).

Continuing, the near-field charging pad establishes (1110) a communication channel with the wireless power receiver in response to detecting the wireless power receiver on the near-field charging pad.

Figure 11B:
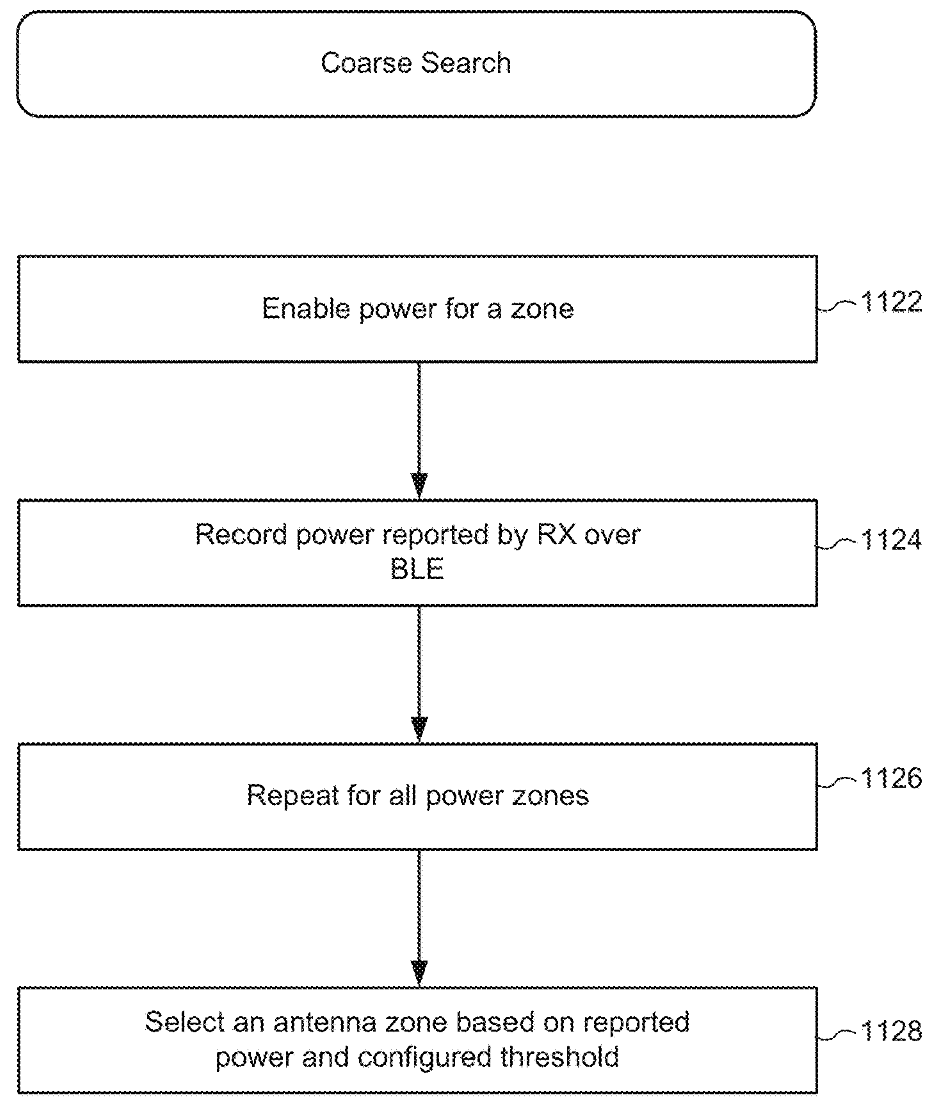

Turning now to FIG. 11B, the method proceeds to process 1004 in which the near-field charging pad performs a coarse search (1004). In performing the coarse search 1004, the near-field charging pad begins by enabling (1122) power for an antenna zone (e.g., antenna zone 290-1, FIG. 1B). In some embodiments, enabling power for the antenna zone includes transmitting, by an antenna element included in the antenna zone (e.g., after the RF power transmitter integrated circuit 160 provides one or more control signals to the switch 295 to activate the antenna zone), test power transmission signals with a first set of transmission characteristics (e.g., phase, gain, direction, amplitude, polarization, and/or frequency). Transmitting test power transmission signals is discussed in further detail above with reference to steps 916-918 of the method 900.

Continuing with the coarse search 1004, the near-field charging pad records (1124) an amount of power received by the wireless power receiver (the "reported power"). In some embodiments, the reported power is communicated to the near-field charging pad by the wireless power receiver via the communication channel that was established at operation 1110.

The near-field charging pad repeats (1126) steps (1122) and (1124) above for all antenna zones that have been defined for the near-field charging pad (e.g., RF power transmitter integrated circuit 160 provides one or more control signals to the switch 295 to selectively activate all the antenna zones). Thereafter, in some embodiments, the near-field charging pad selects (1128) a set of antenna zones based on the reported power (e.g., 2 or 3 zones, or some greater or lesser number, depending on the circumstances) and a configured threshold (e.g., power-delivery criteria). For ease of discussion, each antenna zone in the set includes a single antenna 210 (e.g., antenna zone 290-1, FIG. 1B). However, it should be understood that instead of selecting a set of antenna zones, the near-field charging pad could also select a single antenna zone that includes multiple antennas 210. For example, as shown in FIG. 1B, the antenna zone 290-N includes multiple antennas 210. In addition, each antenna zone in the set could also include multiple antennas, depending on the circumstances.

Figure 11C:
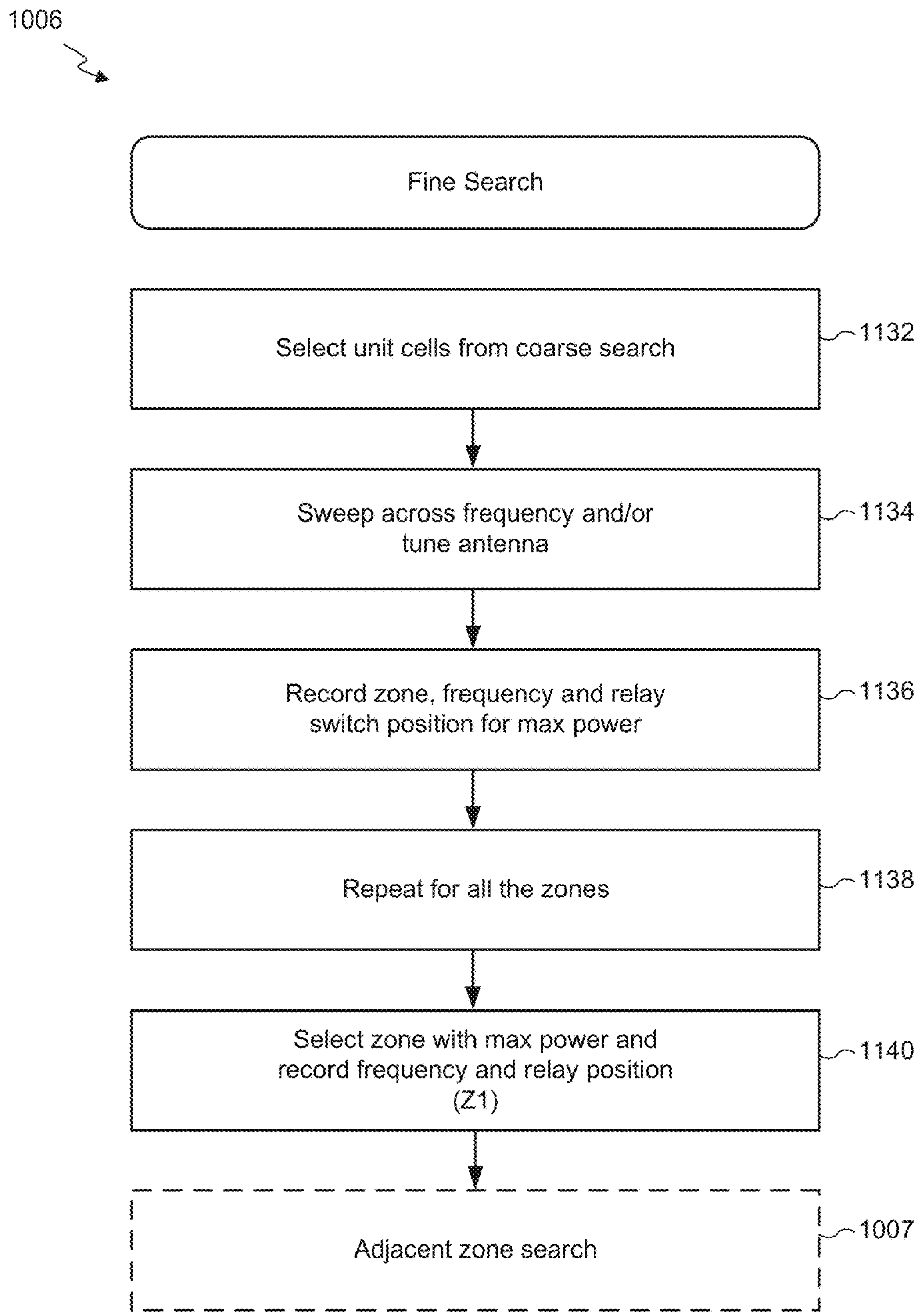

Turning now to FIG. 11C, after selecting the set of antenna zones based on the reported power, the near-field charging pad performs the fine search process (1006). In some embodiments, the fine search 1006 is used to determine which antenna zone(s) is/are best suited to wirelessly delivery power to the wireless power receiver, based on a location of the wireless power receiver on the near-field charging pad. In performing the fine search (1006), the near-field charging pad selects (1132) at least one antenna zone from the set of antenna zones selected using the coarse search, and for the at least one antenna zone, the near-field charging pad sweeps (1134) across available frequencies and/or impedances (i.e., tunes transmission of power transmission signals by the at least one antenna zone). Thereafter, the near-field charging pad records (1136) those characteristics that result in maximizing an amount of received power reported by the wireless power receiver. In some embodiments, operations 1134 and 1136 are repeated for each antenna zone in the set of antenna zones (1138) and the near-field charging pad selects (1140) an antenna zone (Z1) that delivers a maximum amount of power to the wireless power receiver. In addition, the near-field charging pad also records the frequency (and other transmission characteristics) and a relay position by antenna zone Z1 to achieve the delivery of the maximum amount of power to the wireless power receiver.

Figure 11D:
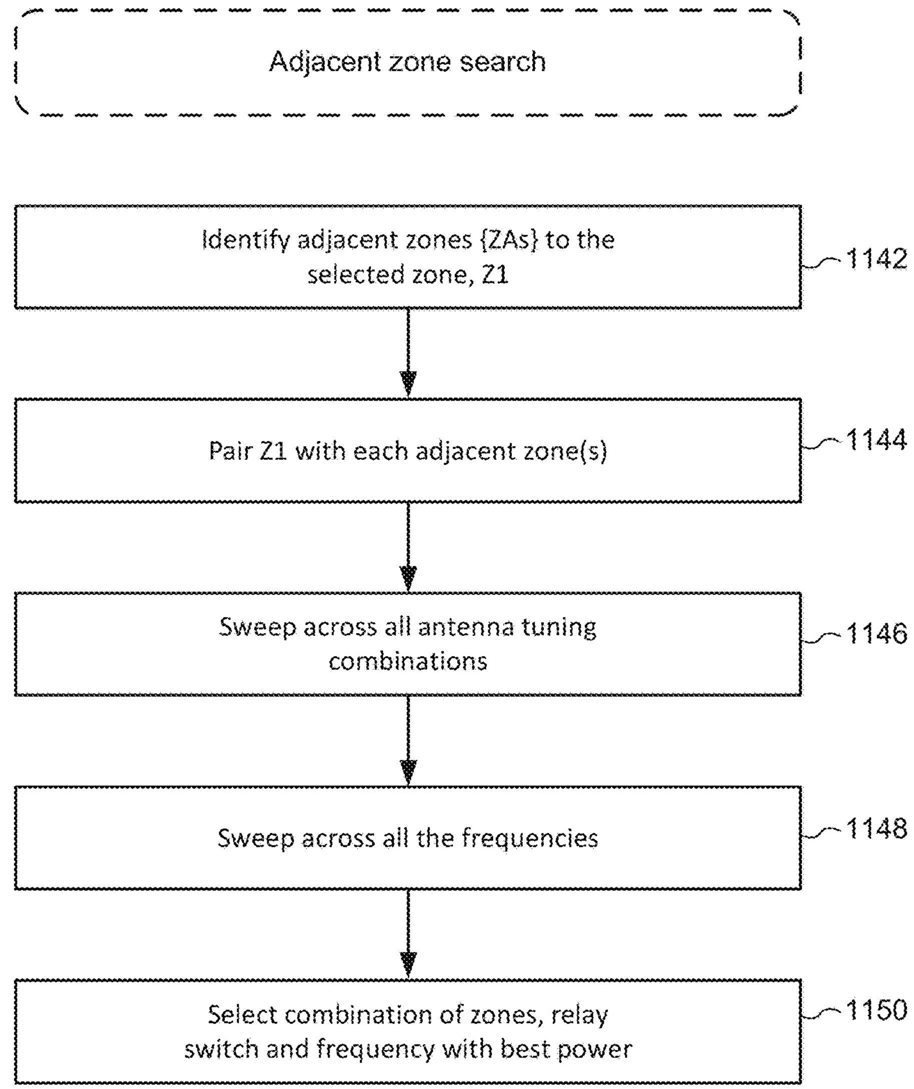

In some circumstances or situations, the amount of power delivered to the wireless power receiver by the antenna zone Z1 does not meet a threshold amount of power. In these circumstances or situations, the near-field charging pad performs an adjacent zone search (1007), which is illustrated in FIG. 11D. In some embodiments, the adjacent zone search 1007 is used to identify one or more adjacent zones to the selected antenna zone Z1 that may be activated (e.g., the RF power transmitter integrated circuit 160 provides one or more control signals to the switch 295) in order to increase an amount of power delivered to the wireless power receiver. For example, this may occur when the wireless power receiver is located at a border between adjacent antenna zones of the near-field charging pad (e.g., located at an intersection between two antenna zones, three antenna zones, or four antenna zones). In performing the adjacent zone search 1007, the near-field charging pad identifies (1142) adjacent antenna zones (ZAs) to the selected antenna zone Z1. In some embodiments, identifying adjacent zones (ZAs) includes identifying up to five adjacent zones.

Next, the near-field charging pad pairs (1144) the selected antenna zone Z1 with each identified adjacent zone and sweeps (1146) across all antenna tuning combinations and sweeps (1148) across all available frequencies (and perhaps other transmission characteristics). Thereafter, the near-field charging pad selects (1150) a combination of antenna zones from among the adjacent zones (ZAs). For example, the near-field charging pad may determine that the selected antenna zone Z1 deliver a higher amount of power to the wireless power receiver than either of these antenna zones is individually able to deliver to the wireless power receiver. In another example, the near-field charging pad may determine that the selected antenna zone Z1 and two (or three) other adjacent zones deliver a maximum amount of power to the wireless power receiver. When selecting the desired combination of antenna zones, the near-field charging pad records the transmission characteristics used to produce the maximum amount of power delivered to the wireless power receiver. Performing the fine search and the adjacent zone search are also discussed in more detail above with reference to steps 924-932 of the method 900.

Figure 11E:
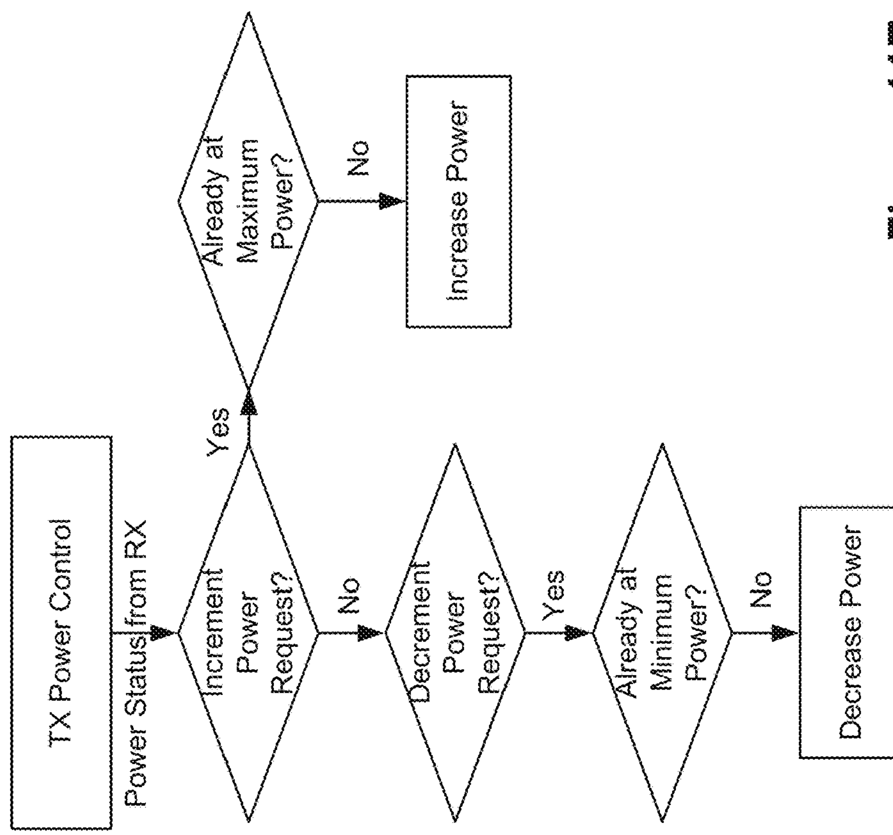
Figure 11E:
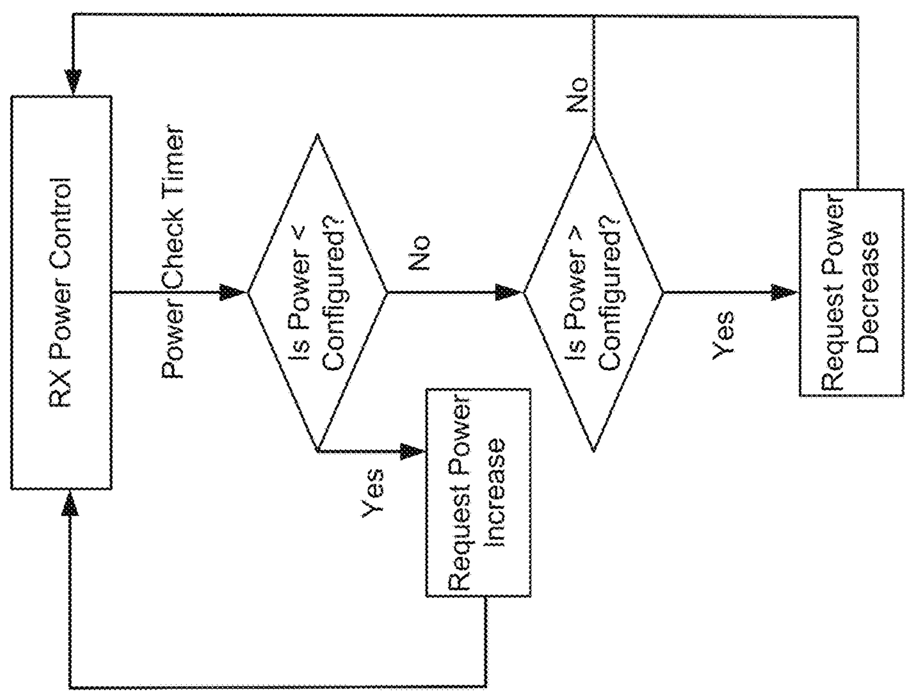

After performing the fine search 1006 (and the adjacent zone search 1007 if needed), the near-field charging pad executes (1008) a power control routine, an example of which is illustrated in FIG. 11E. In some embodiments, the power control routine allows both the wireless power receiver and the near-field charging pad to continually monitor an amount of power being delivered to the wireless power receiver. In this way, adjustments to the wireless power transmission can be made based on feedback received from the wireless power receiver. For example, if the delivered power is below a configured threshold, then the wireless power receiver may request a power increase from the near-field charging pad. FIG. 11E illustrates various operations that may be used to allow the receiver to request an increase or a decrease in an amount of wireless power delivered to the receiver, and also illustrates a process executed by the near-field charging pad to determine when to increase or decrease the amount of wireless power delivered to the receiver in response to the receiver's requests for increases or decreases in the amount of wireless power delivered.

Figure 12:
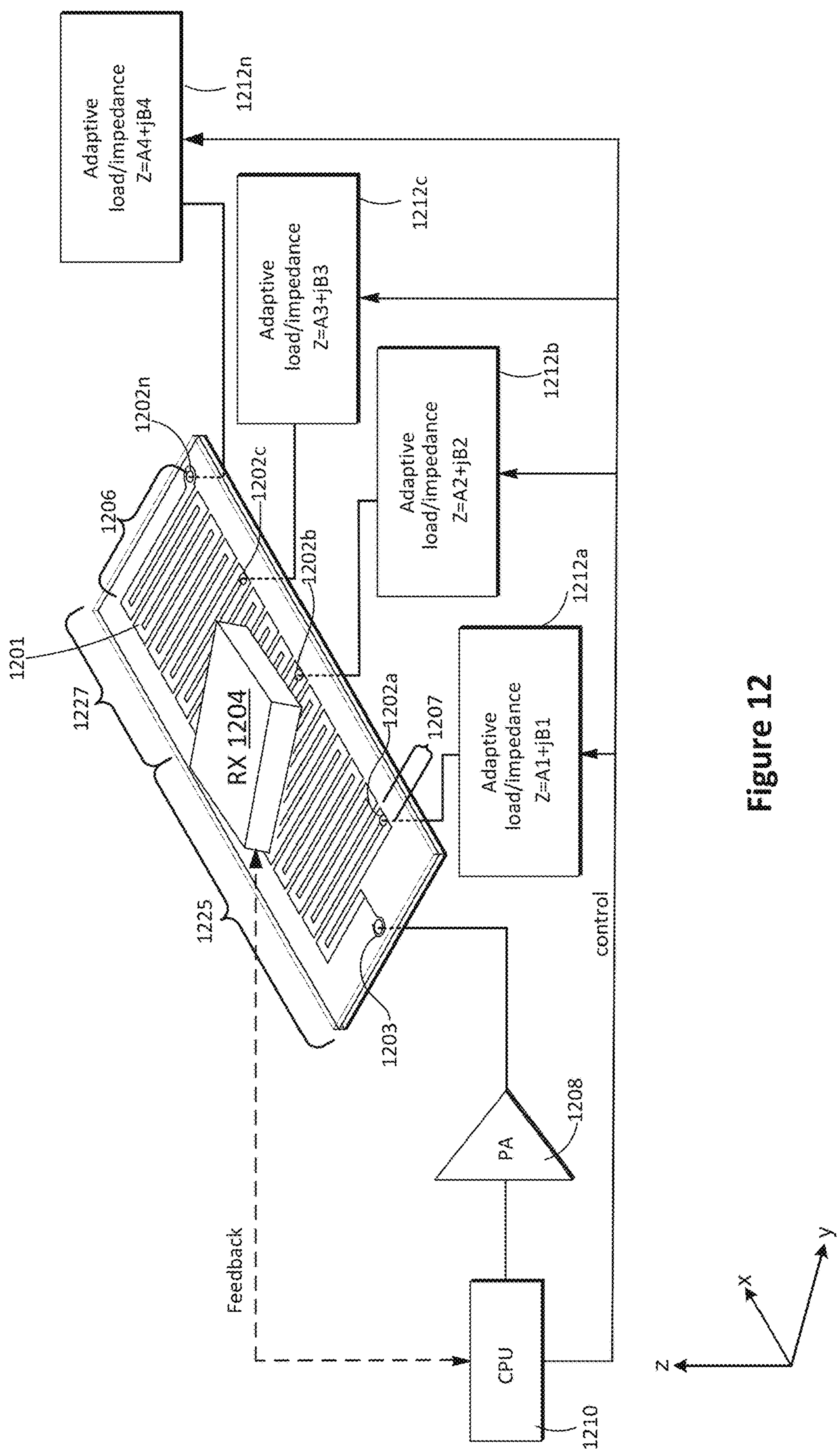
FIG. 12 is a schematic of a transmitting antenna element with a plurality of adaptive loads of an RF charging pad, in accordance with some embodiments.

The antenna elements 120 described above (e.g., in reference to FIG. 1B) may also be configured to have multiple adaptive load terminals (e.g., multiple adaptive load terminals 121) that are coupled to at different positions along a respective antenna element 120. An example of an antenna element 120 with multiple adaptive load terminals is provided below in reference to FIG. 12. FIG. 12 is a schematic showing a transmitting antenna element (unit cell) with a plurality of adaptive loads (which may be a part of an array of such antennas, as described above in reference to FIGS. 3-8) of an RF charging pad, in accordance with some embodiments. In some embodiments, the RF charging pad 1200 includes one or more antenna elements 1201 (which may be any of the antenna elements as shown in FIGS. 3B, 4, 6A-6E, 7A-7D, and 8). Each antenna element 1201 is powered/fed by a respective power amplifier (PA) switch circuit 1208 (which may be a respective one of the PA switch circuits 103 of FIG. 3A) that may be connected to a respective power amplifier 1208 or a source of power at a first end of the antenna element 1201.

In some embodiments, the input circuit that includes the power amplifier 1208 may additionally include a device that can change frequencies of the input signal or a device that can operate at multiple frequencies at the same time, such as an oscillator or a frequency modulator.

In some embodiments, each antenna element 1201 of the RF charging pad 1200 includes a plurality of respective adaptive load terminals 1202, for example, 1202*a*, 1202*b*, 1202*c*, . . . 1202*n*, at a plurality of positions within a respective antenna element 1201. In some embodiments, the antenna element 1201 includes a conductive line forming a meandered line pattern (as discussed above in reference to FIGS. 3, 4, and 6-8). In some embodiments, each adaptive load terminals of the plurality of adaptive load terminals 1202 for the antenna element 1201 is located at different positions on the conductive meandered line of the antenna element 1201 as shown in FIG. 12.

In some embodiments, a meandered line antenna element 1201 includes a conductive line with multiple turns in one plane. In some embodiments, the multiple turns may be square turns as shown for the antenna element 1201 in FIG. 12. In some embodiments, the multiple turns may be round-edged turns. The conductive line may also have segments of varying widths, for example, a segment 1206 having a first width, and short-length segment 1207 that has a second width that is less than the first width. In some embodiments, at least one of the adaptive load terminals 1202*a* is positioned at one of the short-length segments (e.g., short-length segment 1207) and another adaptive load terminal is positioned anywhere at one of the segments 1206 having the first width. In some embodiments, at least one of the adaptive load terminals 1202 is positioned or connected anywhere on a width segment, for example, at the middle of a width segment of the meandered line antenna element 1201. In some embodiments, the last adaptive load terminal 1202*n* is positioned at a second end of the conductive line (opposite to a first end at the input terminal 1203 of the antenna element 1201 described above in reference to FIGS. 3, 4, and 6-8). In some embodiments, in certain design and optimization, an adaptive load terminal is not necessarily positioned at a second end of the meandered line antenna element 1201 but can be positioned at any location of the antenna element 1201.

In some embodiments, the RF charging pad 1200 also includes (or is in communication with) a central processing unit 1210 (also referred to here as processor 1210). In some embodiments, the processor 1210 is configured to control RF signal frequencies and to control impedance values at each of the adaptive load terminals 1202, e.g., by communicating with a plurality of the load picks or adaptive loads 1212, for example, 1212*a*, 1212*b*, 1212*c*, . . . 1212*n*, for each of the adaptive load terminals 1202 (as discussed above in reference to load pick or adaptive load 106 in FIGS. 3A and 3B).

In some embodiments, an electronic device (e.g., a device that includes a receiver 1204 as an internally or externally connected component, such as a remote that is placed on top of a charging pad 1200 that may be integrated within a housing of a streaming media device or a projector) and uses energy transferred from one or more RF antenna elements 1201 of the charging pad 1200 to the receiver 1204 to charge a battery and/or to directly power the electronic device.

In some embodiments, the adaptive load terminals 1202 at a particular zone or selected positions of the antenna element 1201 (e.g., a zone on the antenna element 1201 located underneath a position at which an electronic device (with an internally or externally connected RF receiver 1204) to be charged is placed on the charging pad) are optimized in order to maximize power received by the receiver 1204. For example, the CPU 1210 upon receiving an indication that an electronic device with an internally or externally connected RF receiver 1204 has been placed on the pad 1200 in a particular zone on the antenna element 1201 may adapt the plurality of adaptive loads 1212, for example, adaptive loads 1212*a*, 1212*b*, 1212*c*, . . . 1212*n*, that are respectively coupled to the adaptive terminals 1202, in order to maximize power transferred to the RF receiver 1204. Adapting the set of adaptive loads 1212 may include the CPU 1210 commanding one or more of the adaptive loads to try various impedance values for one or more of the adaptive load terminals 1202 that are coupled to different positions of the antenna element 1201. Additional details regarding adapting adaptive loads were provided above, and, for the sake of brevity, are not repeated here.

The effective impedance value ($Z_{effective}$) at a particular position/portion of the conductive line of the antenna element 1201 is affected by a number of variables and may be manipulated by adjusting configurations of the adaptive load terminals 1212 that are coupled to various positions on the antenna element 1201. In some embodiments, an effective impedance value ($Z_{effective}$), starting from a point that divides sections 1225 (which starts at the terminal 1203 of the antenna element 1201 and extends to an edge of the receiver 1204) and 1227 (which is formed by the rest of the transmitting antenna element 1201 and the terminal 1202*n*) and ending at the TX antenna 1201's connection to the adaptive load 1212*n* (e.g., terminal 1202*n*) will change based on location of the receiver 1204 on the TX antenna 1201 and based on a set of selected loads provided by adaptive loads 1212 at various positions within section 1227. In some embodiments, the selected loads are optimized by the adaptive loads 1212 (in conjunction with the processor 1210) to tune $Z_{effective}$ in such a way that the energy transferred between terminal 1203 and the receiver 1204 reaches a maximum (e.g., 75% or more of energy transmitted by antenna elements of the pad 1200 is received by the RF receiver 1204, such as 98%), while energy transfer may also stay at a minimum from terminal 1203 to terminal 1202*n* (e.g., less than 25% of energy transmitted by antenna elements of the pad 1200 is not received by the RF receiver 1204 and ends up reaching terminals positioned within section 1227 or ends up being reflected back, including as little as 2%).

In some embodiments, a selected several adaptive loads 1212 of the plurality of adaptive loads 1212 are used (by the processor 1210) on the antenna element 1201 to adjust the impedance and/or frequency of the antenna element 1201. In one example, with reference to FIG. 12, only adaptive load terminals 1202*a* and 1202*c* are connected at a particular point in time to adaptive loads 1212*a* and 1212*c* respectively, while adaptive load terminals 1202*b* and 1202*n* are disconnected at the particular point in time. In another example, with reference to FIG. 12, only adaptive load terminals 1202*a* and 1202*n* are connected at a particular point in time to adaptive loads 1212*a* and 1212*n*, respectively, while adaptive load terminals 1202*b* and 1202*c* are disconnected at the particular point in time. In some embodiments, all of the adaptive load terminals 1202 are connected at a particular point in time to their respective adaptive loads 1212. In some embodiments, none of the adaptive load terminals 1202 are connected at a particular point in time to their respective adaptive loads 1212. In some embodiments, the impedance value of each of the adaptive loads 1212 connected to a selected adaptive load terminal 1212 is adjusted individually to optimize the energy transfer.

In embodiments in which a meandered line antenna has been optimized for the multi-band operation, the multiple adaptive load configuration within a single antenna element also enables a broader frequency band adjustment compared with a single adaptive load configuration within a single antenna element as described in FIG. 3B above. The multiple adaptive load configuration within a single antenna element further enhances multiple frequency band operation on a single antenna element. For example, a single antenna element 1201 with multiple adaptive load terminals is capable of operating at a wider frequency band than a corresponding antenna element that is configured with one adaptive load terminal.

In some embodiments, adapting the set of adaptive loads 1212 also or alternatively includes the CPU 1210 causing the set of antenna elements to transmit RF signals at various frequencies until a frequency is found at which a maximum amount of energy is transferred to the RF receiver 1204. In some embodiments, for example, one of the antenna elements transmits RF signals at a first frequency, and another one of the antenna elements transmits RF signals at a second frequency that is different from the first frequency. In some embodiments, adjusting the impedance value and/or the frequencies at which the set of antenna elements transmits causes changes to the amount of energy transferred to the RF receiver 1204. In this way, the amount of energy transferred to the RF receiver 1204 that is maximized (e.g., to transfer at least 75% of the energy transmitted by antenna elements of the pad 1200 to the receiver 1204, and in some embodiments, adjusting the impedance value and/frequencies may allow up to 98% of the energy transmitted to be received by the receiver 1204) may be received at any particular point on the pad 1200 at which the RF receiver 1204 might be placed.

In some embodiments, the CPU 1210 determines that a maximum amount of energy is being transferred to the RF receiver 1204 when the amount of energy transferred to the RF receiver 1204 crosses a predetermined threshold (e.g., 75% or more of transmitted energy is received, such as up to 98%) or by testing transmissions with a number of impedance and/or frequency values and then selecting the combination of impedance and frequency that results in maximum energy being transferred to the RF receiver 1204 (also as described in reference to the adaptation scheme in FIGS. 3A-3D above). In some embodiments, processor 1210 is connected to the receiver 1204 through a feedback loop (e.g. by exchanging messages using a wireless communication protocol, such as BLUETOOTH low energy (BLE), WIFI, ZIGBEE, infrared beam, near-field transmission, etc., to exchange messages). In some embodiments, the adaptation scheme is employed to test various combinations of impedance values of the adaptive impedance loads 1212 and RF frequencies, in order to maximize energy transferred to an RF receiver 1204. In such embodiments, each of the adaptive load 1212 is configured to adjust the impedance value along a range of values, such as between 0 and infinity. In some embodiments, the adaptation scheme is employed when one or more RF receivers are placed on top of one of the antenna element 1201.

In some embodiments, an adaptation scheme is employed to adaptively adjust the impedance values and/or frequencies of the RF signal(s) emitted from the RF antenna(s) 1201 of the charging pad 1200, in order to determine which combinations of frequency and impedance result in maximum energy transfer to the RF receiver 1204. For example, the processor 1210 that is connected to the charging pad 1200 tries different frequencies (i.e., in the allowed operating frequency range or ranges) by using different selected sets of adaptive loads 1212 at different locations of the antenna element 1201, e.g. enabling or disabling certain adaptive loads 1212, to attempt to adaptively optimize for better performance. For example, a simple optimization either opens/disconnects or closes/shorts each load terminal to ground (in embodiments in which a relay is used to switch between these states), and may also cause RF antenna element 1201 to transmit at various frequencies. In some embodiments, for each combination of relay state (open or shorted) and frequency, the energy transferred to the receiver 1204 is monitored and compared to energy transferred when using other combinations. The combination that results in maximum energy transfer to the receiver 1204 is selected and used to continue to transmitting the one or more RF signals using one or more antenna elements 1201 to the receiver 1204.

In some embodiments, the single antenna element 1201 with multiple adaptive loads 1212 of the pad 1200 may be configured to operate in two or more distinct frequency bands (such as the ISM bands described above), e.g., a first frequency band with a center frequency of 915 MHz and a second frequency band with a center frequency of 5.8 GHz. In these embodiments, employing the adaptation scheme may include transmitting RF signals and then adjusting the frequency at first predetermined increments until a first threshold value is reached for the first frequency band and then adjusting the frequency at second predetermined increments (which may or may not be the same as the first predetermined increments) until a second threshold value is reached for the second frequency band. In some embodiments, a single antenna element can operate at multiple different frequencies within one or more frequency bands. For example, the single antenna element 1201 may be configured to transmit at 902 MHz, 915 MHz, 928 MHZ (in the first frequency band) and then at 5.795 GHz, 5.8 GHz, and 5.805 GHz (in the second frequency band). The single antenna element 1201 can operate at more than one frequency bands as a multi-band antenna. A transmitter with at least one antenna element 1201 can be used as a multi-band transmitter.

In some embodiments, multiple antenna elements 1201 each with multiple adaptive loads 1212 may be configured within a particular transmission pad to allow the particular transmission pad to operate in two or more distinct frequency bands respectively at the same time. For example, a first antenna element 1201 of the particular transmission pad operates at a first frequency or frequency band, a second antenna element 1201 of the particular transmission pad operates at a second frequency or frequency band, and a third antenna element 1201 of the particular transmission pad operates at a third frequency or frequency band, and a fourth antenna element 1201 of the particular transmission pad operates at a fourth frequency or frequency band, and the four frequency bands are distinct from each other. In this way, the particular transmission pad is configured to operate at multiple different frequency bands.

In some embodiments, the transmitter described herein can transmit wireless power in one frequency or frequency band, and transmit and exchange data with a receiver in another frequency or frequency band.

Different antenna elements operating at different frequencies can maximize energy transfer efficiency when a smaller device is charged with higher frequencies and a larger device is charged with lower frequencies on the same charging pad. For example, devices that require a higher amount of power, such as mobile phones, may also have more space to include larger antennas, thus making a lower frequency of 900 MHz a suitable frequency band. As a comparison, a smaller device, such as an earbud, may require a small amount of power and may also have less space available for longer antennas, thus making a higher frequency of 2.4 or 5.8 GHz a suitable frequency band. This configuration enables more flexibility in the types and sizes of antennas that are included in receiving devices.

Figure 13:
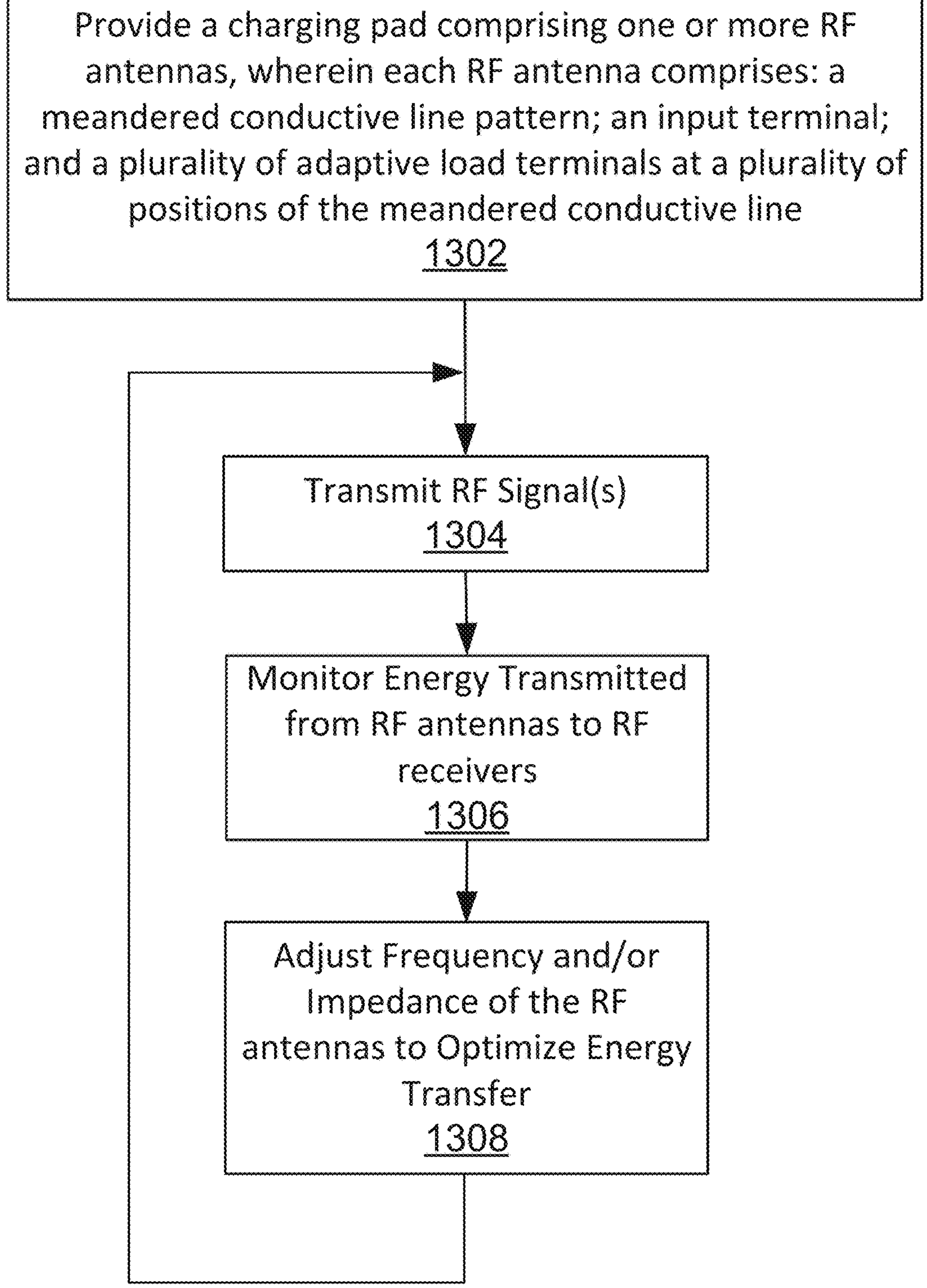
FIG. 13 is a flow chart of a method of charging an electronic device through radio frequency (RF) power transmission by using at least one RF antenna with a plurality of adaptive loads, in accordance with some embodiments.
Figure 14A:
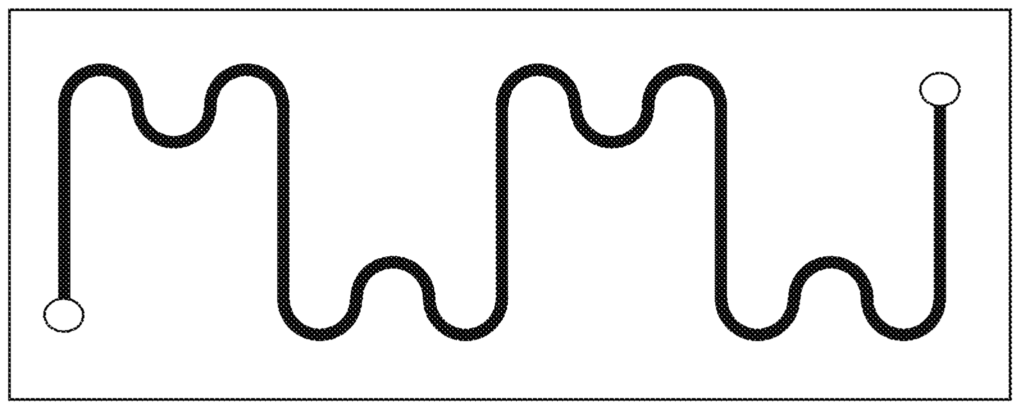
FIGS. 14A-14D are schematics showing various configurations for individual antenna elements that can operate at multiple frequencies or frequency bands within an RF charging pad, in accordance with some embodiments.
Figure 14B:
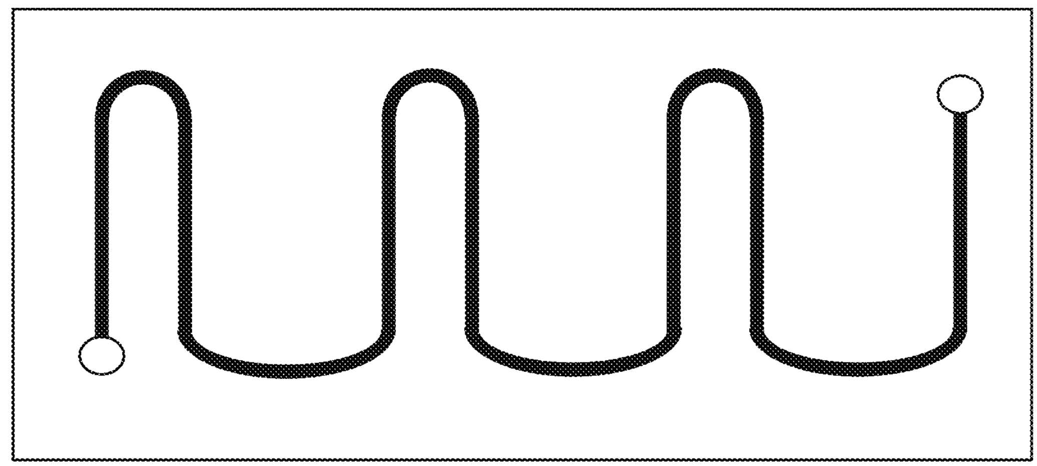
Figure 14C:
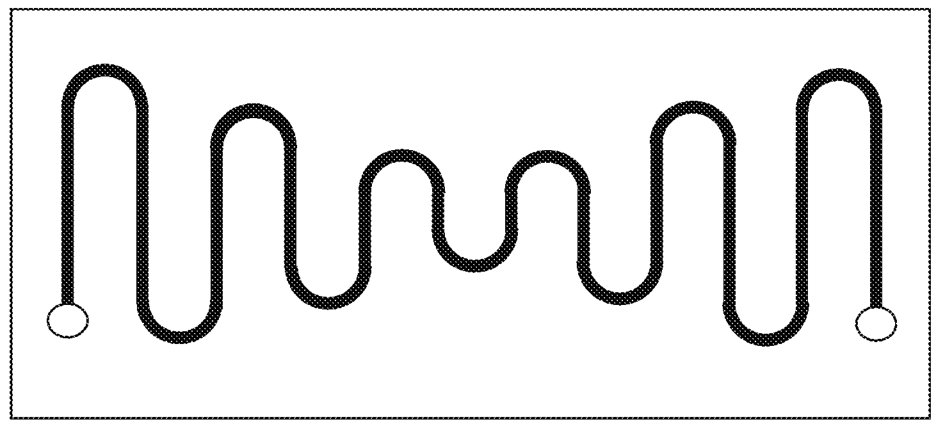
Figure 14D:
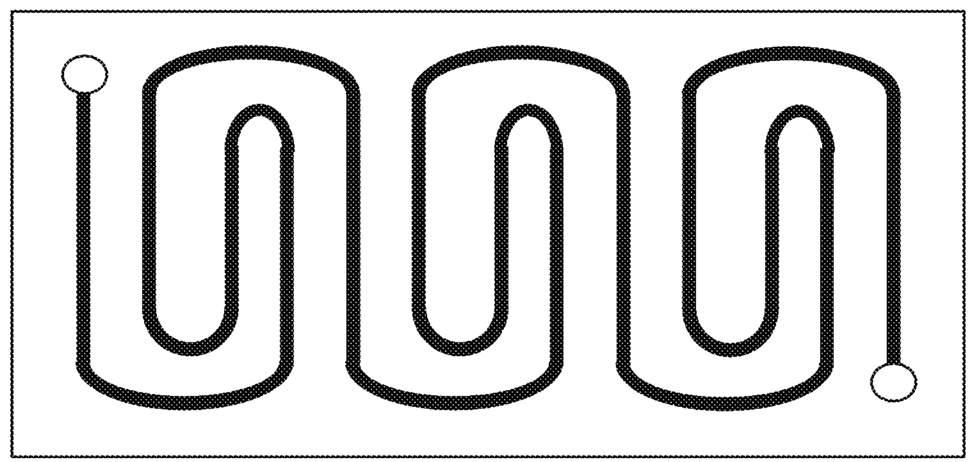

Turning now to FIG. 13, in accordance with some embodiments, a flow chart of a method 1300 of charging an electronic device through radio frequency (RF) power transmission by using at least one RF antenna with a plurality of adaptive loads is provided. Initially, a charging pad including a transmitter is provided in step 1302 that includes at least one RF antenna (e.g., antenna element 1201, as described with respect to FIG. 12 above which further includes FIGS. 3-8) for transmitting one or more RF signals or waves, i.e., an antenna designed to and capable of transmitting RF electromagnetic waves. In some embodiments, an array of RF antenna elements 1201 are arranged adjacent to one another in a single plane, in a stack, or in a combination of thereof, thus forming an RF charging pad 1200 (as described in reference to FIGS. 6A-6E, 7A-7D and 8). In some embodiments, the RF antenna elements 1201 each include an antenna input terminal (e.g., the first terminal 1203 discussed above in reference to FIG. 12) and a plurality of antenna output terminals (e.g., the plurality of adaptive load terminals 1202 discussed above in reference to FIG. 12). In some embodiments, the antenna element 1201 includes a conductive line that forms a meandered line arrangement (as shown in FIGS. 3-4, and 6-12). The plurality of adaptive load terminals 1202 are positioned at different locations of the conductive line of the antenna element 1201.

In some embodiments, the transmitter further comprises a power amplifier electrically coupled between the power input and the antenna input terminal (e.g., PA 1208 in FIG. 12). Some embodiments also include respective adaptive loads 1212*a*, 1212*b*, 1212*c*, . . . 1212*n* electrically coupled to the plurality of antenna output terminals (e.g., adaptive load terminals 1202 in FIG. 12). In some embodiments, the transmitter includes a power input configured to be electrically coupled to a power source, and at least one processor (e.g., processor 1210 in FIG. 12, and processor 110 in FIGS. 3A-3B) configured to control at least one electrical signal sent to the antenna. In some embodiments, the at least one processor is also configured to control the frequency and/or amplitude of the at least one signal sent to the antenna.

In some embodiments, each RF antenna of the transmitter includes: a conductive line forming a meandered line pattern, a first terminal (e.g., terminal 1203) at a first end of the conductive line for receiving current that flows through the conductive line at a frequency controlled by one or more processors, and a plurality of adaptive load terminals (e.g., terminals 1202), distinct from the first terminal, at a plurality of positions of the conductive line, the plurality of adaptive load terminals coupled to a respective component (e.g., adaptive loads 1212 in FIG. 12) controlled by the one or more processors and that allows for modifying an impedance value of the conductive line. In some embodiments, the conductive line is disposed on or within a first antenna layer of a multi-layered substrate. Also in some embodiments, a second antenna is disposed on or within a second antenna layer of the multi-layered substrate. Finally, some embodiments also provide a ground plane disposed on or within a ground plane layer of the multi-layered substrate.

In some embodiments, a receiver (e.g., receiver 1204 in reference to FIG. 12) is also provided (also as described in reference to FIG. 3). The receiver also includes one or more RF antennas for receiving RF signals. In some embodiments, the receiver includes at least one rectenna that converts the one or more RF signals into usable power to charge a device that includes the receiver 1204 as an internally or externally connected component (see also steps 504, 506, 510, 514 and 518 in reference to FIG. 5). In use, the receiver 1204 is placed within a near-field radio frequency distance to the at least one antenna of the transmitter or the charging pad. For example, the receiver may be placed on top of the at least one RF antenna 1201 or on top of a surface that is adjacent to the at least one RF antenna 1201, such as a surface of a charging pad 1200.

In step 1304, one or more RF signals are then transmitted via at the least one RF antenna 1201.

The system is then monitored in step 1306 to determine the amount of energy that is transferred via the one or more RF signals from the at least one antenna 1201 to one or more RF receivers (as is also discussed above). In some embodiments, this monitoring 1306 occurs at the transmitter, while in other embodiments the monitoring 1306 occurs at the receiver which sends data back to the transmitter via a back channel (e.g., over a wireless data connection using WIFI or BLUETOOTH). In some embodiments, the transmitter and the receiver exchange messages via the back channel, and these messages may indicate energy transmitted and/or received, in order to inform the adjustments made at step 1308.

In some embodiments, in step 1308, a characteristic of the transmitter is adaptively adjusted to attempt to optimize the amount of energy that is transferred from the at least one RF antenna 1201 to the receiver. In some embodiments, this characteristic is a frequency of the one or more RF signals and/or an impedance of the transmitter. In some embodiments, the impedance of the transmitter is the impedance of the adjustable loads. Also in some embodiments, the at least one processor is also configured to control the impedance of the selected set of the plurality of adaptive loads 1212. Additional details and examples regarding impedance and frequency adjustments are provided above.

In some embodiments, the at least one processor (e.g. CPU 1210 in FIG. 12) dynamically adjusts the impedance of the adaptive load based on the monitored amount of energy that is transferred from the at least one antenna 1201 to the RF receiver. In some embodiments, the at least one processor simultaneously controls the frequency of the at least one signal sent to the antenna.

In some embodiments, the single antenna element 1201 with multiple adaptive loads 1212 of the pad 1200 may be dynamically adjusted by the one or more processors to operate in two or more distinct frequency bands (such as the ISM bands described above) at the same time or at different times, e.g., a first frequency band with a center frequency of 915 MHz and a second frequency band with a center frequency of 5.8 GHz. In these embodiments, employing the adaptation scheme may include transmitting RF signals and then adjusting the frequency at first predetermined increments until a first threshold value is reached for the first frequency band and then adjusting the frequency at second predetermined increments (which may or may not be the same as the first predetermined increments) until a second threshold value is reached for the second frequency band. For example, the single antenna element 1201 may be configured to transmit at 902 MHz, 915 MHz, 928 MHZ (in the first frequency band) and then at 5.795 GHz, 5.8 GHz, and 5.805 GHz (in the second frequency band). The single antenna element 1201 can operate at more than one frequency bands as a multi-band antenna. A transmitter with at least one antenna element 1201 can be used as a multi-band transmitter.

In some embodiments, a charging pad or transmitter may include one or more of the antenna element 1201 with a plurality of adaptive loads as described in FIG. 12 and one or more antenna element 120 with one adaptive load as described in FIG. 3A-3D.

FIGS. 14A-14D are schematics showing various configurations for individual antenna elements that can operate at multiple frequencies or frequency bands within an RF charging pad, in accordance with some embodiments. As shown in FIGS. 14A-14D, an RF charging pad 100 (FIGS. 3A-3B) or an RF charging pad 1200 (FIG. 12) may include antenna elements 120 (FIG. 3B) or 1201 (FIG. 12) that configured to have conductive line elements that have varying physical dimensions.

For example, FIGS. 14A-14D show examples of structures for an antenna element that each include a conductive line formed into different meandered line patterns at different portions of the element. The conductive lines at different portions or positions of the element may have different geometric dimensions (such as widths, or lengths, or trace gauges, or patterns, spaces between each trace, etc.) relative to other conductive lines within an antenna element. In some embodiments, the meandered line patterns may be designed with variable lengths and/or widths at different locations of the pad (or an individual antenna element). These configurations of meandered line patterns allow for more degrees of freedom and, therefore, more complex antenna structures may be built that allow for wider operating bandwidths and/or coupling ranges of individual antenna elements and the RF charging pad.

In some embodiments, the antennas elements 120 and 1201 described herein may have any of the shapes illustrated in FIGS. 14A-14D. In some embodiments, each of the antenna elements shown in FIGS. 14A-14D has an input terminal (123 in FIG. 1B or 1203 in FIG. 12) at one end of the conductive line and at least one adaptive load terminals (121 in FIG. 1B or 1202*a-n* in FIG. 12) with adaptive loads (106 in FIG. 1B or 1212*a-n* in FIG. 12) as described above at another end or a plurality of positions of the conductive line.

In some embodiments, each of the antenna elements shown in FIGS. 14A-14D can operate at two or more different frequencies or two or more different frequency bands. For example, a single antenna element can operate at a first frequency band with a center frequency of 915 MHz at a first point in time and a second frequency band with a center frequency of 5.8 GHz at a second point in time, depending on which frequency is provided at an input terminal of each of the antenna elements. Moreover, the shapes of the meandered line patterns shown in FIGS. 14A-14D are optimized to allow the antenna elements to operate efficiently at multiple different frequencies.

In some embodiments, each of the antenna elements shown in FIGS. 14A-14D can operate at two or more different frequencies or two or more different frequency bands at the same time when the input terminal is supplied with more than two distinct frequencies that can be superimposed. For example, a single antenna element can operate at a first frequency band with a center frequency of 915 MHz and a second frequency band with a center frequency of 5.8 GHz at the same time when both frequency bands with a first center frequency of 915 MHz and a second center frequency of 5.8 GHz are supplied at the input terminal of the conductive line. In yet another example, a single antenna element can operate at multiple different frequencies within one or more frequency bands.

In some embodiments, the operating frequencies of the antenna elements can be adaptively adjusted by one or more processors (110 in FIGS. 3A-3B or 1210 in FIG. 12) as described above according to the receiver antenna dimension, frequency, or the receiver loads and the adaptive loads on the charging pad.

In some embodiments, each of the antenna elements shown in FIGS. 14A-14D with different meandered patterns at different portions of the conductive line can operate more efficiently at multiple frequencies compared with the more symmetrical meandered line structures (For example, FIG. 3B, 4, 6A-6B, or 8). For example, energy transfer efficiency at different operating frequencies of the antenna elements shown in FIGS. 14A-14D with different meandered patterns at different portions of the conductive line can be improved by about at least 5%, and in some instance at least 60%, more than the more symmetrical meandered line structure elements. For example, the more symmetrical meandered line structure antenna element may be able to transfer no more than 60% of transmitted energy to a receiving device while operating at a new frequency other than a frequency for which the more symmetrical meandered line structure antenna element has been designed (e.g., if the more symmetrical meandered line structure antenna element is designed to operate at 900 MHz, if it then transmits a signal having a frequency of 5.8 GHz it may only be able to achieve an energy transfer efficiency of 60%). In contrast, the antenna element with different meandered patterns (e.g., those shown in FIGS. 14A-14D) may be able to achieve an energy transfer efficiency of 80% or more while operating at various frequencies. In this way, the designs for antenna elements shown in FIGS. 14A-14D ensure that a single antenna element is able to achieve a more efficient operation at various different frequencies.

Figure 15:
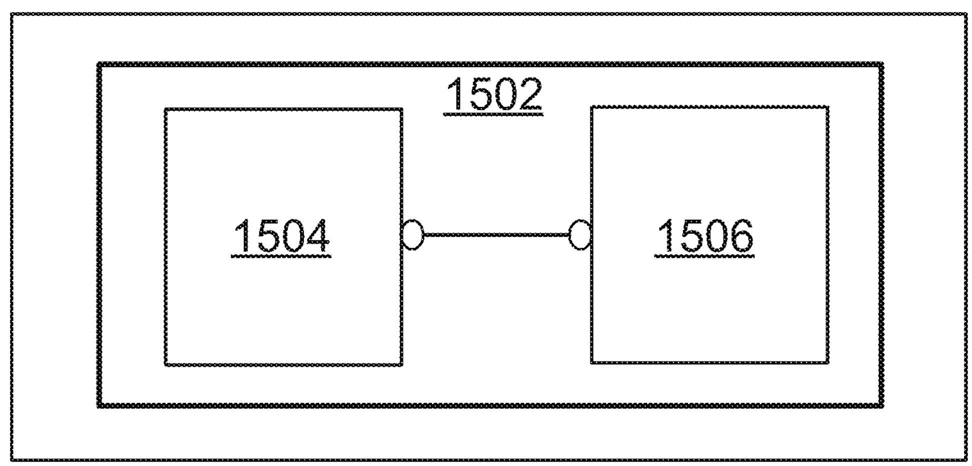
FIG. 15 is schematic showing an example configuration for an individual antenna element that can operate at multiple frequencies or frequency bands by adjusting the length of the antenna element, in accordance with some embodiments.

FIG. 15 is schematic showing an example configuration for an individual antenna element that can operate at multiple frequencies or frequency bands by adjusting the length of the antenna element, in accordance with some embodiments.

In some embodiments as shown in FIG. 15, at least one transmitting antenna element 1502 (as described in FIGS. 3-8 and 13-14) of the one or more transmitting antenna elements of an RF charging pad 1500 has a first conductive segment 1504 (a first portion of a meandered conductive line, such as any of those described above for antenna elements 120 and 1201) and a second conductive segment 1506 (a second portion of the meandered conductive line, such as any of those described above for antenna elements 120 and 1201). In some embodiments, the first conductive segment includes an input terminal (123 in FIG. 3B or 1203 in FIG. 12). In some embodiments, the at least one transmitting antenna element 1502 is configured to operate at a first frequency (e.g., 2.4 GHz) while the first conductive segment 1504 is not coupled with the second conductive segment 1506. In some embodiments, the at least one transmitting antenna element 1502 is configured to operate at a second frequency (e.g., 900 MHz) which is different from the first frequency while the first conductive segment is coupled with the second conductive segment.

In some embodiments, one or more processors (110 in FIGS. 3A-3B or 1210 in FIG. 12) are configured to cause coupling of the first segment with the second segment in conjunction with instructing a feeding element (as described as 108 in FIGS. 3A-3B and 1208 in FIG. 12) to generate current with a second frequency (e.g., 900 MHz) that is distinct from the first frequency (e.g., 2.4 GHz), thereby allowing the antenna element 1502 to more efficiently operate at the second frequency. The one or more processor may also be configured to cause de-coupling of the second conductive segment from the first conductive segment in conjunction with instructing the feeding element to generate current with the first frequency instead of the second frequency, thereby allowing the antenna element 1502 to more efficiently operate at the first frequency again. In some embodiments, the one or more processors are configured to determine whether to causing the coupling (or de-coupling) of these conductive segments based on information received from a receiver (e.g., RX 104 or 1204) that identifies a frequency at which the receiver is configured to operate (e.g., for larger devices with longer receiving antennas, this frequency may be 900 MHz, while for smaller devices with small receiving antennas, this frequency may be 2.4 GHz).

In some embodiments, the coupling described here in FIG. 15 can be implemented by directly connecting two different segments of a single antenna element 1502 while bypassing the conductive line located in-between the two connection points or the two different segments. In some embodiments, coupling can be implemented between more than two different segments of the antenna element 1502. The coupling of the different portions or segments of a single meandered line antenna element 1502 can effectively change the size or length of the conductive line of the antenna element 1502, and therefore enable the single antenna element 1502 to operate at different frequencies. The single antenna element 1502 may also operate at more than one frequency bands as a multi-band antenna.

All of these examples are non-limiting and any number of combinations and multi-layered structures are possible using the example structures described above.

Further embodiments also include various subsets of the above embodiments including embodiments in FIGS. 1-15 combined or otherwise re-arranged in various embodiments, as one of skill in the art will readily appreciate while reading this disclosure.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A circuit for managing operations of a wireless-power-transmitting device that is capable of operating in multiple radio-frequency (RF) bands, the circuit comprising:
- an interface to couple with a power amplifier;
- an encryption block configured to ensure that only authorized wireless-power-receiving devices are able to receive wirelessly-delivered power;
- a processing subsystem configured to:
  - determine, using the encryption block, that first and second wireless-power-receiving devices are authorized to receive wirelessly-delivered power, wherein:
    - the first wireless-power-receiving device is configured to receive RF wireless-power signals transmitted using a first frequency, and
    - the second wireless-power-receiving device is configured to receive RF wireless-power signals transmitted using a second frequency distinct from the first frequency; and
  - after determining that the first and second wireless-power-receiving devices are authorized to receive wirelessly-delivered power, provide, via the interface:
    - an input signal to the power amplifier to be amplified such that, when it is provided to a first antenna, the first antenna is caused to transmit an RF wireless-power signal using the first frequency, and
    - another input signal to the power amplifier to be amplified such that, when it is provided to a second antenna, the second antenna is caused to transmit another RF wireless-power signal using the second frequency,
- wherein the processing subsystem, the interface, and the encryption block are on a single integrated circuit.

2. The circuit of claim 1, further comprising:
- a waveform generator;
- an RF oscillator; and
- an RF converter, wherein,
- the waveform generator uses the RF oscillator and the RF converter to generate at least one of the input signals provided to the power amplifier.

3. The circuit of claim 1, wherein:
- the single integrated circuit includes a DC-DC converter used in conjunction with generating each of the input signals provided to the power amplifier.

4. The circuit of claim 1, wherein:
- the first and second antennas are configured to transmit RF wireless-power signals at the first frequency and the second frequency, respectively, during an overlapping period of time.

5. The circuit of claim 1, wherein:

the first antenna is configured to transmit the RF signal at the first frequency at a first set of points in time, the second antenna is configured to transmit the RF signal at the second frequency at a second set of points in time, distinct from the first set of points in time, and the first set of points in time and the second set of points in time are selected such that a continuous charge is provided to the first and second wireless-power-receiving devices.

6. The circuit of claim 1, wherein the encryption block is configured to separately authenticate (i) the first wireless-power-receiving device for receiving RF wireless-power signals transmitted using the first frequency, and (ii) the second wireless-power-receiving device for receiving RF wireless-power signals transmitted using the second frequency.

7. The circuit of claim 6, wherein the encryption block is also configured to secure data-communication exchanges with the first and second wireless-power-receiving devices.

8. The circuit of claim 1, wherein the processing subsystem is configured to receive an indication of output power provided by the power amplifier to a respective antenna of the first and second antennas.

9. The circuit of claim 1, wherein the interface is a first interface, and the circuit further comprises:

a second interface, distinct from the first interface, to couple with an external wireless data-communication component that is configured to use a communication protocol to communicate with the first and second wireless-power-receiving devices.

10. The circuit of claim 9, wherein one or both the first interface and the second interface are digital interfaces.

11. The circuit of claim 1, wherein the input signal is a first input signal, and the other input signal is a second input signal, and the processing subsystem is further configured to:

determine, using information from the encryption block, that third and fourth wireless-power-receiving devices are authorized to receive wirelessly-delivered power, wherein:

the third wireless-power-receiving device is configured to receive RF wireless-power signals transmitted using a third frequency distinct from the first frequency and the second frequency, and the fourth wireless-power-receiving device is configured to receive RF wireless-power signals transmitted using a fourth frequency distinct from the first frequency, the second frequency, and the third frequency; and after determining that the third and fourth wireless-power-receiving devices are authorized to receive wirelessly-delivered power, provide, via the interface:

a third input signal to the power amplifier to be amplified such that, when it is provided to a third antenna, causes the third antenna to transmit an RF wireless-power signal using the third frequency, and a fourth input signal to the power amplifier to be amplified such that, when it is provided to a fourth antenna, causes the fourth antenna to transmit an RF wireless-power signal using the fourth frequency.

12. The circuit of claim 1, further comprising:

a beamforming circuit configured to provide phase-shifted signals to the power amplifier to ensure that the input signals, provided to the power amplifier via the interface, are transmitted to the first and second wireless-power-receiving devices with appropriate phase characteristics.

13. The circuit of claim 12, wherein the processing subsystem is further configured to:

determine whether at least one of the first and second wireless-power-receiving devices requires phase-shifted RF wireless-power signals to be provided by at least one of the first and second antennas; and in accordance with determining that no phase-shifted RF wireless-power signals are required, causing the input signals to bypass the beamforming circuit while providing the input signals via the interface to the power amplifier.

14. The circuit of claim 1, wherein the first antenna and the second antenna are a same multi-band antenna.

15. The circuit of claim 14, wherein:

the same multi-band antenna is a meandered line antenna that includes multiple conductive segments.

16. The circuit of claim 15, wherein the meandered line antenna is configured to:

operate in a single frequency band when a first conductive segment of the multiple conductive segments is not coupled to a second conductive segment of the multiple conductive segments, and operate in two distinct frequency bands when the first conductive segment is coupled to the second conductive segment.

17. The circuit of claim 1, wherein the first antenna and the second antenna are distinct and separate antennas.

18. A radio-frequency (RF) power transmitter comprising:

a first antenna;

a second antenna;

at least one power amplifier coupled to the first and second antennas; and a single integrated circuit for managing operations of a wireless power-transmitting device that is capable of operating in multiple RF bands, the single integrated circuit comprising:

an interface to couple with the at least one power amplifier;

an encryption block configured to ensure that only authorized wireless-power-receiving devices are able to receive wirelessly-delivered power;

a processing subsystem configured to:

determine, using the encryption block, that first and second wireless-power-receiving devices are authorized to receive wirelessly-delivered power, wherein:

the first wireless-power-receiving device is configured to receive RF wireless-power signals transmitted using a first frequency, and the second wireless-power-receiving device is configured to receive RF wireless-power signals transmitted using a second frequency distinct from the first frequency; and after determining that the first and second wireless-power-receiving device are authorized to receive wirelessly-delivered power, provide, via the interface:

an input signal to the power amplifier to be amplified such that, when it is provided to the first antenna, the first antenna is caused to transmit an RF wireless-power signal using the first frequency, and another input signal to the power amplifier to be amplified such that, when it is provided to the second antenna, the second antenna is caused to transmit another RF wireless-power signal using the second frequency, wherein the processing subsystem, the interface, and the encryption block are on the single integrated circuit.

19. The radio-frequency (RF) power transmitter of claim 18, further comprising:

a waveform generator;

an RF oscillator; and an RF converter, wherein, the waveform generator uses the RF oscillator and the RF converter to generate at least one of the input signals provided to the power amplifier.

20. A non-transitory computer-readable storage medium, comprising instructions, which, when executed at a computing device comprising memory and one or more processors, cause a single integrated circuit, that includes a processing subsystem, an interface, and an encryption block, to:

couple, through the interface of the single integrated circuit, with a power amplifier;

ensure, via the encryption block, that only authorized receivers are able to receive wirelessly-delivered power;

cause the processing subsystem to execute functions to:

determine, using the encryption block, that first and second wireless-power-receiving devices are authorized to receive wirelessly-delivered power, wherein:

the first wireless-power-receiving device is configured to receive RF wireless-power signals transmitted using a first frequency, and the second wireless-power-receiving device is configured to receive RF wireless-power signals transmitted using a second frequency distinct from the first frequency; and after determining that the first and second wireless-power-receiving devices are authorized to receive wirelessly-delivered power, provide, via the interface:

an input signal to the power amplifier to be amplified such that, when it is provided to a first antenna, the first antenna is caused to transmit an RF wireless-power signals using the first frequency, and another input signal to the power amplifier to be amplified such that, when it is provided to a second antenna, the second antenna is caused to transmit another RF wireless-power signals using the second frequency, wherein the processing subsystem, the interface, and the encryption block are on the single integrated circuit.

21. The radio-frequency (RF) power transmitter of claim 18, wherein:

the single integrated circuit includes a DC-DC converter used in conjunction with generating each of the input signals provided to the power amplifier.

22. The radio-frequency (RF) power transmitter of claim 18, wherein:

the first and second antennas are configured to transmit RF wireless-power signals at the first frequency and the second frequency, respectively, during an overlapping period of time.

23. The radio-frequency (RF) power transmitter of claim 18, wherein:

the first antenna is configured to transmit the RF signal at the first frequency at a first set of points in time, the second antenna is configured to transmit the RF signal at the second frequency at a second set of points in time, distinct from the first set of points in time, and the first set of points in time and the second set of points in time are selected such that a continuous charge is provided to the first and second wireless-power-receiving devices.

24. The radio-frequency (RF) power transmitter of claim 18, wherein the encryption block is configured to separately authenticate (i) the first wireless-power-receiving device for receiving RF wireless-power signals transmitted using the first frequency, and (ii) the second wireless-power-receiving device for receiving RF wireless-power signals transmitted using the second frequency.

25. The radio-frequency (RF) power transmitter of claim 24, wherein the encryption block is also configured to secure data-communication exchanges with the first and second wireless-power-receiving devices.

26. The radio-frequency (RF) power transmitter of claim 18, wherein the processing subsystem is configured to receive an indication of output power provided by the power amplifier to a respective antenna of the first and second antennas.

27. The radio-frequency (RF) power transmitter of claim 18, wherein the interface is a first interface, and the single integrated circuit further comprises:

a second interface, distinct from the first interface, to couple with an external wireless data-communication component that is configured to use a communication protocol to communicate with the first and second wireless-power-receiving devices.

28. The radio-frequency (RF) power transmitter of claim 27, wherein one or both the first interface and the second interface are digital interfaces.

29. The radio-frequency (RF) power transmitter of claim 18, wherein the input signal is a first input signal, and the other input signal is a second input signal, and the processing subsystem is further configured to:

determine, using information from the encryption block, that third and fourth wireless-power-receiving devices are authorized to receive wirelessly-delivered power, wherein:

the third wireless-power-receiving device is configured to receive RF wireless-power signals transmitted using a third frequency distinct from the first frequency and the second frequency, and the fourth wireless-power-receiving device is configured to receive RF wireless-power signals transmitted using a fourth frequency distinct from the first frequency, the second frequency, and the third frequency; and after determining that the third and fourth wireless-power-receiving devices are authorized to receive wirelessly-delivered power, provide, via the interface:

a third input signal to the power amplifier to be amplified such that, when it is provided to a third antenna, causes the third antenna to transmit an RF wireless-power signal using the third frequency, and a fourth input signal to the power amplifier to be amplified such that, when it is provided to a fourth antenna, causes the fourth antenna to transmit an RF wireless-power signal using the fourth frequency.

30. The radio-frequency (RF) power transmitter of claim 18, further comprising:

a beamforming circuit configured to provide phase-shifted signals to the power amplifier to ensure that the input signals, provided to the power amplifier via the interface, are transmitted to the first and second wireless-power-receiving devices with appropriate phase characteristics.

31. The radio-frequency (RF) power transmitter of claim 30, wherein the processing subsystem is further configured to:

determine whether at least one of the first and second wireless-power-receiving devices requires phase-shifted RF wireless-power signals to be provided by at least one of the first and second antennas; and in accordance with determining that no phase-shifted RF wireless-power signals are required, cause the input signals to bypass the beamforming circuit while providing the input signals via the interface to the power amplifier.

32. The radio-frequency (RF) power transmitter of claim 18, wherein the first antenna and the second antenna are a same multi-band antenna.

33. The radio-frequency (RF) power transmitter of claim 32, wherein:

the same multi-band antenna is a meandered line antenna that includes multiple conductive segments.

34. The radio-frequency (RF) power transmitter of claim 33, wherein the meandered line antenna is configured to:

operate in a single frequency band when a first conductive segment of the multiple conductive segments is not coupled to a second conductive segment of the multiple conductive segments, and operate in two distinct frequency bands when the first conductive segment is coupled to the second conductive segment.

35. The radio-frequency (RF) power transmitter of claim 18, wherein the first antenna and the second antenna are distinct and separate antennas.

36. The non-transitory computer-readable storage medium of claim 20, wherein the instructions, when executed by the computing device, further cause the single integrated circuit to:

cause a waveform generator of a radio frequency (RF) power transmitter to use an RF oscillator of the RF power transmitter and an RF converter of the RF power transmitter to generate at least one input signal provided to the power amplifier.

37. The non-transitory computer-readable storage medium of claim 20, wherein:

the single integrated circuit includes a DC-DC converter used in conjunction with generating each of the input signals provided to the power amplifier.

38. The non-transitory computer-readable storage medium of claim 20, wherein:

the first and second antennas are configured to transmit RF wireless-power signals at the first frequency and the second frequency, respectively, during an overlapping period of time.

39. The non-transitory computer-readable storage medium of claim 20, wherein:

the first antenna is configured to transmit the RF signal at the first frequency at a first set of points in time, the second antenna is configured to transmit the RF signal at the second frequency at a second set of points in time, distinct from the first set of points in time, and the first set of points in time and the second set of points in time are selected such that a continuous charge is provided to the first and second wireless-power-receiving devices.

40. The non-transitory computer-readable storage medium of claim 20, wherein the encryption block is configured to separately authenticate (i) the first wireless-power-receiving device for receiving RF wireless-power signals transmitted using the first frequency, and (ii) the second wireless-power-receiving device for receiving RF wireless-power signals transmitted using the second frequency.

41. The non-transitory computer-readable storage medium of claim 40, wherein the encryption block is also configured to secure data-communication exchanges with the first and second wireless-power-receiving devices.

42. The non-transitory computer-readable storage medium of claim 20, wherein the processing subsystem is configured to receive an indication of output power provided by the power amplifier to a respective antenna of the first and second antennas.

43. The non-transitory computer-readable storage medium of claim 20, wherein the interface is a first interface, and the single integrated circuit further comprises:

a second interface, distinct from the first interface, to couple with an external wireless data-communication component that is configured to use a communication protocol to communicate with the first and second wireless-power-receiving devices.

44. The non-transitory computer-readable storage medium of claim 43, wherein one or both the first interface and the second interface are digital interfaces.

45. The non-transitory computer-readable storage medium of claim 20, wherein the input signal is a first input signal, and the other input signal is a second input signal, and the instructions, when executed by the computing device, further cause the single integrated circuit to:

determine, using information from the encryption block, that third and fourth wireless-power-receiving devices are authorized to receive wirelessly-delivered power, wherein:

the third wireless-power-receiving device is configured to receive RF wireless-power signals transmitted using a third frequency distinct from the first frequency and the second frequency, and the fourth wireless-power-receiving device is configured to receive RF wireless-power signals transmitted using a fourth frequency distinct from the first frequency, the second frequency, and the third frequency; and after determining that the third and fourth wireless-power-receiving devices are authorized to receive wirelessly-delivered power, provide, via the interface:

a third input signal to the power amplifier to be amplified such that, when it is provided to a third antenna, causes the third antenna to transmit an RF wireless-power signal using the third frequency, and a fourth input signal to the power amplifier to be amplified such that, when it is provided to a fourth antenna, causes the fourth antenna to transmit an RF wireless-power signal using the fourth frequency.

46. The non-transitory computer-readable storage medium of claim 20, wherein the instructions, when executed by the computing device, further cause the single integrated circuit to:

configuring a beamforming circuit to provide phase-shifted signals to the power amplifier to ensure that the input signals, provided to the power amplifier via the interface, are transmitted to the first and second wireless-power-receiving devices with appropriate phase characteristics.

47. The non-transitory computer-readable storage medium of claim 46, wherein the instructions, when executed by the computing device, further cause the single integrated circuit to:

determine whether at least one of the first and second wireless-power-receiving devices requires phase-shifted RF wireless-power signals to be provided by at least one of the first and second antennas; and in accordance with determining that no phase-shifted RF wireless-power signals are required, cause the input signals to bypass the beamforming circuit while providing the input signals via the interface to the power amplifier.

48. The non-transitory computer-readable storage medium of claim 20, wherein the first antenna and the second antenna are a same multi-band antenna.

49. The non-transitory computer-readable storage medium of claim 48, wherein:

the same multi-band antenna is a meandered line antenna that includes multiple conductive segments.

50. The non-transitory computer-readable storage medium of claim 49, wherein the meandered line antenna is configured to:

operate in a single frequency band when a first conductive segment of the multiple conductive segments is not coupled to a second conductive segment of the multiple conductive segments, and operate in two distinct frequency bands when the first conductive segment is coupled to the second conductive segment.

51. The non-transitory computer-readable storage medium of claim 20, wherein the first antenna and the second antenna are distinct and separate antennas.

* * * * *